May 2, 1961 H. D. HUSKEY 2,982,472

BINARY DIGITAL COMPUTER WITH MAGNETIC DRUM STORAGE

Filed May 2, 1955 10 Sheets-Sheet 1

INVENTOR

Harry D. Huskey

BY Mead, Browne, Schuyler & Beveridge

ATTORNEYS

BINARY DIGITAL COMPUTER WITH MAGNETIC DRUM STORAGE

Filed May 2, 1955 10 Sheets-Sheet 2

INVENTOR
Harry D. Huskey

BY Mead, Browne, Schuyler & Beveridge
ATTORNEYS

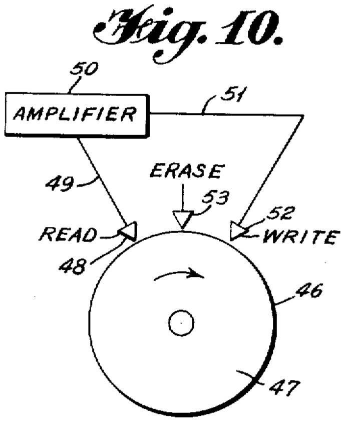
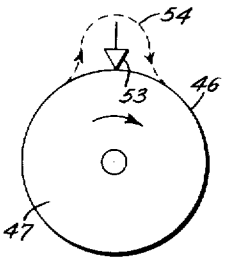
Fig. 11.
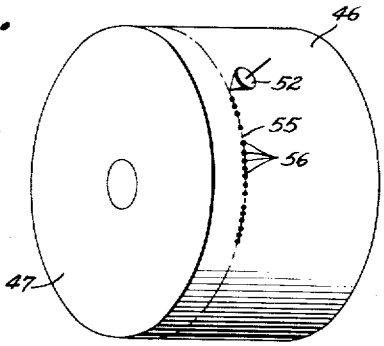
Fig. 12.
Fig. 13.
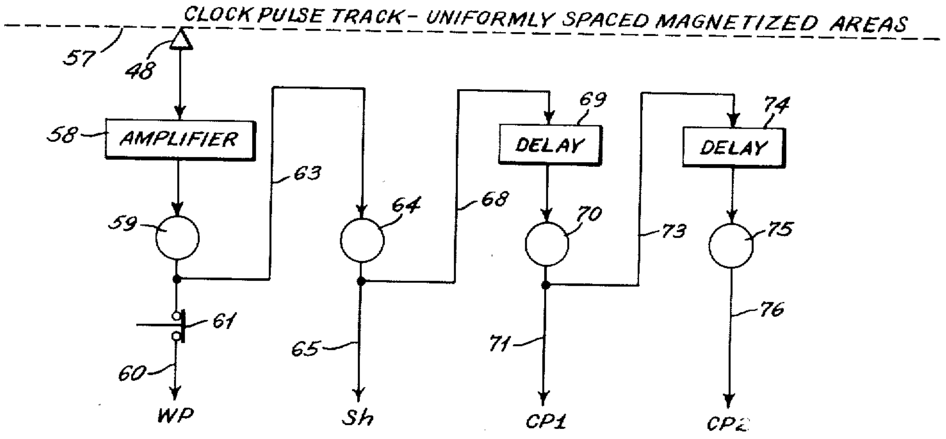
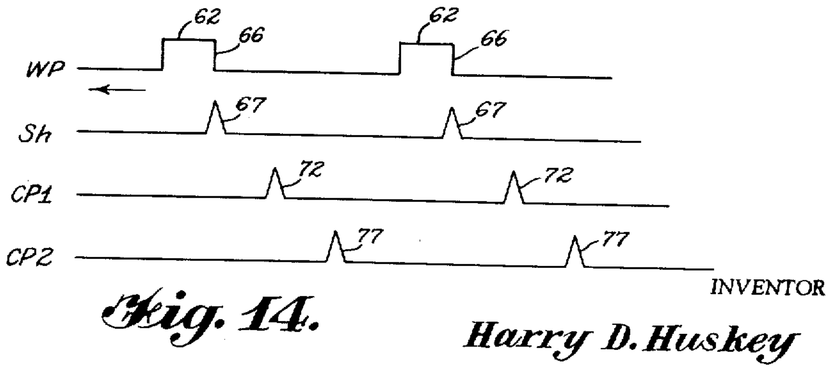
Fig. 14.
INVENTOR
Harry D. Huskey
BY Mead, Brown, Schuyler & Beveridge
ATTORNEYS INVENTOR
Harry D. Huskey
BY Mead, Browne, Schuyler & Beveridge
ATTORNEYS INVENTOR
Harry D. Huskey
BY Mead, Browne, Schuyler & Beveridge
ATTORNEYS

| OPERATION | STATE OF FLIP-FLOP-161 | STATE OF FLIP-FLOP-162 |
|---|---|---|
| TRANSFER UNCHANGED | SET | SET |
| TRANSFER ABSOLUTE VALUE | SET | RESET |
| ADD | RESET | SET |
| SUBTRACT | RESET | RESET |

INVENTOR
Harry D. Huskey
BY Mead, Brown, Schuyler & Beveridge
ATTORNEYS

INVENTOR
Harry D. Huskey
BY Mead, Browne, Schuyler & Beveridge
ATTORNEYS

BINARY DIGITAL COMPUTER WITH MAGNETIC DRUM STORAGE
Filed May 2, 1955 10 Sheets-Sheet 8
Fig. 23.
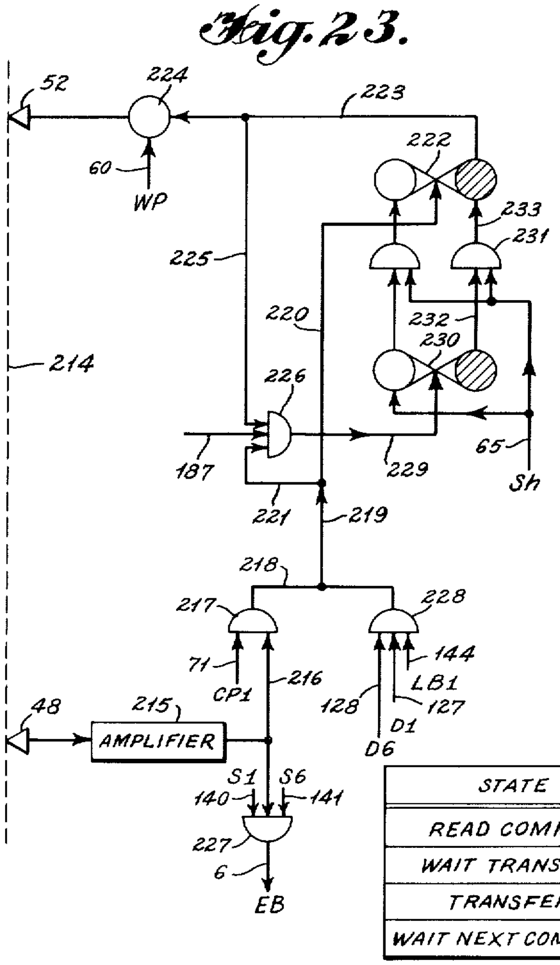
Fig. 24.
| LINE 214 | LB1-144 | CARRY | WRITE HEAD | NEW CARRY |
|---|---|---|---|---|
| 1 | 1 | 1 | 1 | 1 |
| 0 | 1 | 1 | 0 | 1 |
| 1 | 0 | 1 | 0 | 1 |
| 0 | 0 | 1 | 1 | 0 |
| 1 | 1 | 0 | 0 | 1 |
| 0 | 1 | 0 | 1 | 0 |
| 1 | 0 | 0 | 1 | 0 |
| 0 | 0 | 0 | 0 | 0 |
| 234 | 235 | 236 | 237 | 238 |
Fig. 26.
| STATE | FLIP-FLOP 247 | FLIP-FLOP 248 |
|---|---|---|
| READ COMMAND | SET | SET |
| WAIT TRANSFER | RESET | RESET |
| TRANSFER | RESET | SET |
| WAIT NEXT COMMAND | SET | RESET |
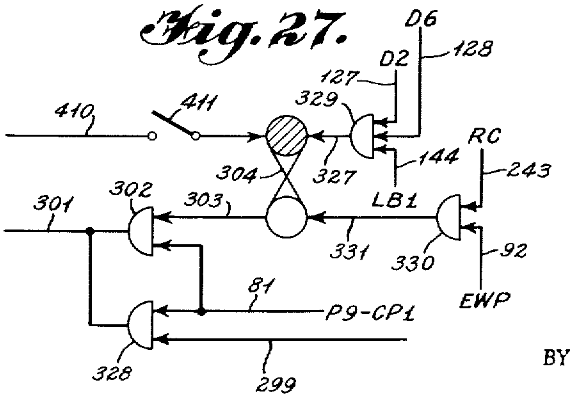
Fig. 27.
INVENTOR
Harry D. Huskey
BY Mead, Browne, Schuyler & Beveridge
ATTORNEYS May 2, 1961 H. D. HUSKEY 2,982,472

BINARY DIGITAL COMPUTER WITH MAGNETIC DRUM STORAGE

Filed May 2, 1955 10 Sheets-Sheet 9

INVENTOR

Harry D. Huskey

BY Mead, Browne, Schuyler & Beveridge

ATTORNEYS

INVENTOR
Harry D. Huskey
BY Mead, Browne, Schuyler & Beveridge
ATTORNEYS

United States Patent Office 2,982,472
Patented May 2, 1961

2,982,472

BINARY DIGITAL COMPUTER WITH MAGNETIC DRUM STORAGE

Harry D. Huskey, 2655 Buena Vista Way, Berkeley 8, Calif.

Filed May 2, 1955, Ser. No. 505,186
14 Claims. (Cl. 235—167)

This invention relates to methods and apparatus for computing and more particularly to methods and apparatus for high speed general purpose computing.

Continuing developments in science, business planning, and technology generally have increased tremendously the magnitude of problems requiring computation for solution. Despite the fact that mathematical formulas may be available whereby such problems can be solved, the calculations involved in reaching a solution may be so extensive as to render the solution a practical impossibility if attempted manually, even with the aid of mechanical calculators now known. For example, some problems can require periods of time measured in years for a person to solve the problems manually even with the aid of a mechanical calculating machine operated by the person as he proceeds with the calculations. To meet this situation, the art to which this invention relates has developed high speed electronic computers capable of accepting information representing the problem to be solved and the instructions for solving the problem and then performing the required calculations in but a minute fraction of the time that it would take to perform the calculations manually, even with the aid of mechanical calculating equipment now known.

Methods and apparatus for computing have therefore progressed to the point where it is now possible to solve problems requiring extensive calculations or computation quickly enough so that the solutions can be obtained within practical time limits. Examples of problems whose solution becomes practicable by such methods and apparatus include problems in the field of science generally, problems concerning military weapons such as determining missile trajectory, and such problems in mathematics as the preparation of extensive mathematical tables. Other examples of problems whose solution becomes practicable by such methods and apparatus are found in the business world and include such problems as production planning and control where many thousands of components may have to be assembled in a finished product, payroll problems where many and varied deductions may have to be applied to thousands of different employees, insurance policy transactions requiring a large number of arithmetic and printing operations, and problems in the accounting field generally where extensive entries and calculations are needed according to the technique being employed. By utilizing high speed electronic computers, it is possible to complete the required calculations for problems such as those mentioned above so quickly that a particular problem may be solved in a matter of minutes as compared to days, months, or even years if performed manually, even with the aid of mechanical calculators. High speed electronic computers have thus become a valuable tool for both governmental and private business activities.

While high speed electronic computers are known generally, those available prior to the present invention tend to be extremely complex and extremely costly. For example, a general purpose digital electronic computer of the type known to the art at present can occupy a fair sized room, or even rooms, and will have thousands of electronic tubes and more thousands of other electrical components which make up the computer. Obviously, the manufacturing of such a computer is a time consuming and costly matter and, obviously also, such a computer is a costly piece of equipment to purchase. Computers of this type are therefore beyond the practical means of many potential users who could otherwise benefit from them. While there are also available so-called small general purpose computers, those available prior to the present invention tend to suffer the objection that they do not have the capacity to solve many problems which general purpose computers are supposed to be capable of solving. In other words, these so-called small general purpose computers sacrifice general problem solving ability for cost.

The present invention is therefore directed squarely at the problem of providing a small high speed general purpose electronic computer which will perform a great variety of computations thus giving it a wide range of utility as a machine aid to computation. Primarily because of its size, a computer constructed in accordance with the teaching of the present invention is relatively inexpensive compared generally to high speed general purpose electronic computers available prior to the present invention. Being relatively inexpensive, a computer constructed in accordance with the teaching of the present invention has the great practical advantage that it brings apparatus of this type within the economic reach of potential users of such equipment who cannot afford the more costly equipment heretofore needed for general computation purposes. It is therefore an object of the present invention to provide new and improved apparatus for high speed general purpose computing whereby such computing may be accomplished relatively inexpensively as compared generally to methods and apparatus available prior to the present invention.

It is another object of the present invention to provide such apparatus whereby an extremely flexible computer command structure is provided.

It is still another object of the present invention to provide such apparatus giving high arithmetic speed as compared to comparable methods and apparatus known prior to the present invention.

It is a further object of the present invention to provide such apparatus whereby the signs of numbers being processed may be inspected and the number complemented if required while the number is being transferred from a source to a destination.

It is a still further object of the present invention to provide such a computer of small physical size and increased reliability as compared generally to high speed general purpose computers available prior to the present invention.

Briefly described, a preferred practice according to the teaching of the present invention comprises converting data to be processed into sequential bits of yes or no information according to the binary number system. Where the data being processed is a number, the first bit of information denotes the sign of the number, i.e. whether the number is positive or negative. The sequential bits of information are preferably recorded or stored in a delay line type of memory and each group of bits of information representing a word (such as a command or a number) may recirculate from and back into the memory always maintaining the same sequence of the yes or no bits making up the group. Instructions (commands) for accomplishing a given series of calculations, for example, and the numbers or other data involved in the calculations may be stored in the memory.

A group of sequential bits of yes or no information representing a command contains bits determining the source or location in the memory from which another group of sequential bits of information is to be obtained; contains bits determining the destination or location in the memory to which said other group of bits is to be sent; contains bits determining when the transfer is to take place; contains bits determining whether said other group of bits is to be transferred unchanged, is to be transferred absolute value, or is to be complemented; and contains bits determining which group of bits representing a command is to be read as the next command. A command word according to the teaching of the present invention therefore performs many functions. It may be described as a two address type of command, i.e. it determines both source and destination and it not only determines the time for the transfer to take place from one address to the other address but it also, in effect, links the next command to it. A preferred practice of the present invention therefore includes the rapid execution of a plurality of commands.

High arithmetic speed is facilitated by performing any required modification of a group of sequential bits of information representing a number while, in response to a command, said group is being transferred from a source to a destination. The first bit of information in the group being transferred is inspected to determine if it is a yes bit or a no bit. Then, depending upon whether the command being obeyed specifies an addition or a subtraction, for example, and depending upon the sign of the number (the first bit of information), the number may be complemented. As an example, if the command is addition and the number is negative, the first yes bit of information represents the sign and is passed unchanged. No bits of information following the sign bit are passed unchanged up to and including the first yes bit of information which follows the sign bit. Thereafter, all yes bits of information are changed to no bits and all no bits to yes bits. In this way, modification of a group of bits of information being transferred actually takes place in transit.

In combining two groups of bits of information of the same length wherein each group represents a number, the first bits of information in the groups, i.e. the sign bits, are combined first and any resulting carry bit is suppressed so that it is not added to the sum obtained by combining the two second bits of the groups. The combining continues, respective bit with respective bit for the two groups of bits until the last bit of one group is combined with the last bit of the other group. Any resulting carry is then combined with the sum obtained as a result of combining the sign bits of the two groups but, again, any further carry to the sum obtained by combining the second bits of the respective groups is suppressed. The practice of the present invention therefore provides for end around carry coupled with carry suppression.

A preferred embodiment of apparatus according to the teaching of the present invention comprises a magnetic drum type of memory having a plurality of lines or tracks each capable of storing up to 128 words. Each word preferably consists of 25 bits of yes or no information. A magnetic induction reading head, erase head, and writing head are so associated with the magnetic drum that as each word is read from the drum it is in effect lifted off of the drum and then subsequently written back into the drum in the sequence in which it was read. Pulse gates, coincidence gates, and or gates are provided in various circuit arrangements which may include one or more electronic flip-flop devices. Such circuitry enables repeated recirculation of words from a line of the memory back to the same line of the memory; enables simultaneous recirculation and transfer of the word to another line of the memory; and enables simultaneous blocking of such recirculation while transferring another word in place of said word.

A sign inspection circuit is provided through which all data being transferred from one part of the memory to another part of the memory, or to the arithmetic circuits, passes. Depending upon the command being executed, the sign inspection circuit may or may not modify the data being transferred and if it does modify the data, such modification occurs as the data passes through the sign inspection circuit. Two arithmetic circuits are provided, one handling single length words (25 bits of information long) and the other handling double length words (50 bits of information long). A multiplication circuit forms part of the arithmetic circuit which handles the double length words. Input-output circuitry is also associated with the double word length arithmetic circuitry and the multiplication circuitry whereby it is possible to utilize certain flip-flops for a plurality of functions depending upon whether addition, subtraction, multiplication, input, or output is being accomplished.

Other objects and advantages of the present invention will become more apparent from the following detailed description taken in conjunction with the attached drawings in which:

Fig. 10 is a schematic showing of a preferred form of a memory and means for recirculating information from and back into the memory according to a preferred practice of the present invention;

Fig. 11 is a schematic showing similar to that of Fig. 10 and indicates the path of travel of data going from the memory back to the memory;

Fig. 12 is another schematic showing of a preferred type of memory showing how data is recorded on the surface of the memory;

Fig. 13 is a circuit diagram of a timing part of a preferred form of apparatus according to the teaching of the present invention;

Fig. 14 shows various types of electrical pulses, and their time relation, obtained by means of the circuitry shown in Fig. 13;

Fig. 23 is a circuit diagram showing an accumulator part of a preferred form of apparatus according to the teaching of the present invention;

Fig. 24 is a truth table illustrating the operation of the circuit shown in Fig. 23;

Fig. 26 is a table showing the states of certain flip-flops shown in Fig. 25 for different command operations;

Fig. 27 is a circuit diagram showing, in isolated relation, the discriminator part of the circuitry shown in Fig. 25.

Figure 1:
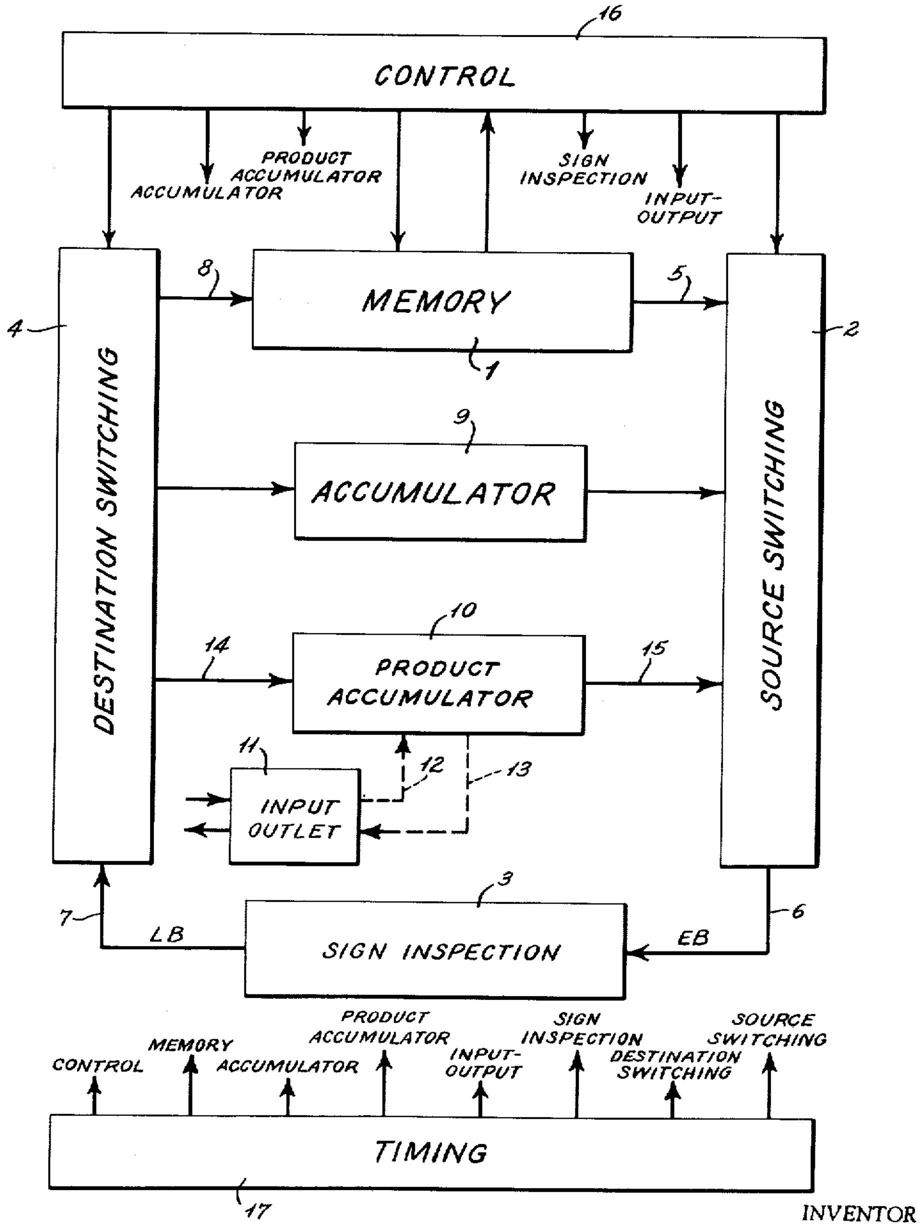
Fig. 1 is a block diagram showing the relation of and indicating the direction of data transfer for the principal parts making up a preferred embodiment of apparatus according to the teaching of the present invention.

In order to facilitate an understanding of methods and apparatus according to the teaching of the present invention, the following detailed description is presented under applicable headings the first of which follows immediately.

GENERAL STRUCTURE

As has been mentioned above, high speed general purpose computers available prior to the present invention are generally quite massive pieces of apparatus. Typical examples require a fair sized room to house the apparatus and they include thousands of electronic tubes and more thousands of other electrical circuit components. In contrast, a preferred embodiment of apparatus constructed in accordance with the teaching of the present invention may be housed in a cabinet which may be compared in size with an office file cabinet rather than an entire room. The number of electronic tubes involved is less than one thousand instead of being in the thousands and the number of other electrical circuit components is correspondingly reduced. By using printed circuit techniques, plug-in units, and the like, the entire apparatus is extremely compact as compared to the usual apparatus for high speed general purpose computing available prior to the present invention.

It is thus apparent that apparatus constructed in accordance with the teaching of the present invention can be appreciably lower in cost than larger types of general purpose computing apparatus known in the art prior to the present invention. While the larger apparatus admittedly has greater data processing capacity, it will be evident from the detailed description which follows that apparatus according to the present invention has extreme flexibility giving it proportionately much greater data processing capacity than would be expected for its size. In other words, while the size of a preferred embodiment of apparatus according to the teaching of the present invention is appreciably less than typical apparatus available prior to the present invention, the data processing capacity of my apparatus is by no means reduced in the same proportion.

Since apparatus according to the teaching of the present invention is a general purpose electronic digital computer, the data processed by the apparatus is preferably in the form of sequential bits of yes or no information according to the binary number system. In the memory, the sequential bits of information are stored as sequential small discrete areas magnetized according to the particular yes, no pattern of the group of bits of information representing a particular portion of data such as, for example, a number which is to be added to, subtracted from, etc. another number. In transferring data represented by a group of sequential bits of yes or no information, a yet bit is generally represented by an electrical pulse appearing timewise in the digit position occupied by the yes bit while a no bit is represented by the lack of an electrical pulse appearing in the digit position occupied by the no bit.

It is to be understood that when it is stated that data passes from one part of the apparatus to another part, suitable electrical power supply means are provided to cause the described transfer to take place when it is supposed to take place. Also, when it is stated that information or data is stored in the memory, which is described in greater detail hereinafter, it is to be understood that the memory is suitably mounted so that the described storage may take place. In short, such things as power supply for the apparatus, the actual physical mounting of electrical circuit components and the like are not described in detail since it will be understood by those skilled in the art that the various parts can be located readily and power supplied thereto to cause them to operate as described.

The major blocks or parts making up a preferred embodiment of apparatus according to the teaching of the present invention are shown in Fig. 1. Referring to Fig. 1, it will be noted that block 1 designates the memory or information storage part of the apparatus, block 2 designates a source switching part of the apparatus, block 3 designates a sign inspection part of the apparatus, and block 4 designates a destination switching part of the apparatus. Upon examining the arrows shown on leads 5–8, it is apparent that information may pass from the memory or information storage medium 1, via the source switching part 2, the sign inspection part 3, and the destination switching part 4, back to the memory. This is a basic information transfer pattern in the sense that information transferring from one part of the memory to another part of the memory goes through the sign inspection part 3 in the course of the transfer. As is brought out more fully hereinafter, the sign inspection part 3 performs its function of inspecting the information and modifying it if required without interrupting transfer. This obviously speeds up the transfer time.

Referring back to Fig. 1, it will be noted that lead 6 bears the letter designation EB and lead 7 bears the letter designation LB. These letters stand for "Early Bus" and "Late Bus" respectively. The significance of the Early Bus designation is that data fed therethrough may be said to be source data while data fed through the Late Bus may be said to be destination data.

Again referring to Fig. 1, it will be noted that block 9 designates an accumulator or adder part of the apparatus, block 10 designates a product accumulator which is another adder part of the apparatus also utilized in the arithmetic process of multiplication, and block 11 designates an input-output part of the apparatus whereby data to be processed may be fed into the apparatus and the processed data taken from the apparatus. Both the accumulator and the product accumulator are shown as being connected so that data from either of them passes to the source switching part 2, through the Early Bus 6, through the sign inspection part 3, and then through the Late Bus 7 to the destination switching part 4. The data may then return to either the accumulator 9 or the product accumulator 10, or it may go to the memory 1 depending upon the instruction (command) being executed. It is significant to note that for the transfer just described, the transferring data always goes through the sign inspection part 3 of the apparatus.

The input-output part of the apparatus designated by block 11 is shown as being connected to the product accumulator 10 by dotted lines 12 and 13. The dotted lines indicate that input data may proceed from the input-output part of the apparatus to the product accumulator and, correspondingly, output data may proceed from the product accumulator to the input-output part of the apparatus. Of course, the input-output part 11 of the apparatus is utilized only during actual input of data to or output of data from the product accumulator. As indicated by the arrows associated with block 11, input data will come from a suitable external source, not shown, which feeds into the input-output part of the apparatus. Likewise, output data feeds from the input-output part of the apparatus to a suitable output data receiving device, not shown.

Again referring to Fig. 1, it will be noted that the large upper block 16 designates the control part of the apparatus while the large lower block 17 designates the timing part of the apparatus. As indicated by its name, the control part of the apparatus is in effect the nerve system of the apparatus in that it controls when and where data transfer takes place in the apparatus. Control part 16 therefore connects to all of the other parts of the apparatus as shown by the lines leading to the memory and the source and destination switching parts, and as further shown by the short lines indicated as going to other designated parts of the apparatus, the actual connecting lines being omitted in these instances to avoid confusing Fig. 1 unnecessarily. The only part of the apparatus shown in Fig. 1 to which the control part does not connect is the timing part designated by block 17.

The timing part 17 of the apparatus is, in effect, the pulse or heart beat of the apparatus. It synchronizes the operation of the other parts designated by blocks in Fig. 1 so that when a given transfer of data is to take place, such a transfer will take place at exactly the right time. This is obviously necessary in an apparatus which, for example, must combine or add together data in an arithmetic type of operation to provide a desired correct answer. If the data is in electrical pulse form then a pulse being combined with another pulse must be in exact step or else the proper combination of the pulses will not be effected. Since the timing part of the apparatus is the synchronizing part, it connects to all of the other parts of the apparatus designated by the blocks shown in Fig. 1. This is shown by the short lines extending from the timing part 16 and indicated as going to other designated parts of the apparatus.

In summary, as regards the general structure of a prefered embodiment of apparatus constructed in accordance with the teaching of the present invention, data may be transferred from the memory, accumulator, or product accumulator to the memory, accumulator, or product accumulator via the source switching part, Early Bus, sign inspection part, Late Bus, and destination switching part of the apparatus. Input from a suitable external source, not shown, goes via the input-output part of the apparatus to the product accumulator. Output goes from the product accumulator to a suitable external destination, not shown, via the input-output part of the apparatus. The control part of the apparatus controls all data processing operations including data transfer and the like while the timing part of the apparatus insures that all parts of the apparatus operate in proper synchronism.

ELECTRONIC COMPONENTS AND TERMINOLOGY

Certain electronic components forming part of a preferred embodiment of apparatus according to the teaching of the present invention are utilized in substantially all of the parts making up the entire apparatus described above in relation to Fig. 1. Therefore, in order to facilitate further detailed description of the various parts of the apparatus designated by the blocks shown in Fig. 1, such electronic components are described in detail in this particular part of the over-all detailed description thereby making it unnecessary to repeat such detailed description in connection with further description of each major part or block making up the complete apparatus. The electronic components which are selected for description in this part of the detailed description may be regarded as basic units common to substantially all parts making up the preferred embodiment of the apparatus.

*Flipflop.*—Since, digital computation is utilized in the practice of the present invention and the apparatus operates in the binary number system, it is necessary to provide a bistable device which is capable of storing a yes or no bit of information. A bistable device is of course one which has two stable states and is capable of being changed in state from one to the other of the states and vice versa. For high speed operation, where the data being processed is represented by electrical pulse train patterns, this means that the bistable device must be capable of changing states substantially instantaneously as required.

Figure 2:
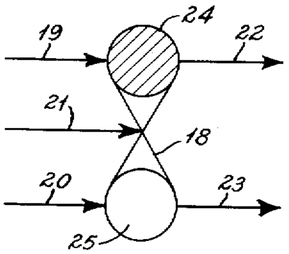
Fig. 2 shows a preferred form of electronic bistable device forming a part of apparatus according to the teaching of the present invention.

Such a bistable device is commonly referred to in the art as a flipflop. Fig. 2 shows a typical representation of a flipflop, the latter being indicated generally by the reference numeral 18. It will be noted that there are three input leads 19–21 and two output leads 22 and 23 associated with flipflop 18. The upper half 24 of the flipflop is shown as shaded while the lower half 25 is shown unshaded. As shown, the flipflop can be assumed to represent a no bit of information. It is further assumed that an output lead from the shaded half of the flipflop is low whereas an output lead from the unshaded half of the flipflop is high. Therefore, as shown in Fig. 2, output lead 22 is assumed to be low and output lead 23 is assumed to be high. When the flipflop changes state, lead 22 goes high and lead 23 goes low. The terms high and low refer to the electrical potential relation of the output leads and are commonly used in the sense described by those skilled in the art.

If it be assumed that the state of the flipflop shown in Fig. 2 is such that output lead 23 is high, then an input signal occurring on lead 19 will change the state of the flipflop so that output lead 22 becomes high and lead 23 becomes low. Once changed, the flipflop can be reset by a signal on input lead 20. As the flipflop is shown in Fig. 2, a signal on input lead 20 is ineffective to change the state of the flipflop since the side to which the signal is applied is already high.

Lead 21 is shown as being connected to the crisscross lines at the middle of the flipflop shown in Fig. 2. The significance of this type of input is that it will change the state of the flipflop no matter what its previous state was. Thus, while a signal on input lead 20 is ineffective to change the state of the flipflop as it is shown in Fig. 2, a signal on lead 21 will change the state. The utility of a type of input capable of changing the state of the flipflop no matter what its previous state was becomes more apparent in the description of the operation of parts of the complete apparatus given hereinafter. It is to be understood, of course, that the signals referred to as being applied to the flipflop via leads 19–21 are electrical pulses of very short duration.

It is apparent that the flipflop is in itself a simple memory capable of remembering a single fact. In other words, if a single pulse is fed into the flipflop on one of the input leads, 18 for example, the flipflop can change state and will remember that it has changed state if another signal is sent on the same lead. Conversely, if it has changed state and an input signal is fed into it on another lead, it will remember that it has changed state so that the new input is effective to reset it to its former state. The terms set and reset are commonly utilized in describing the condition of a flipflop. Thus, as shown in Fig. 2, the flipflop is reset and it is set by a signal on either lead 19 or lead 21.

Figure 3:
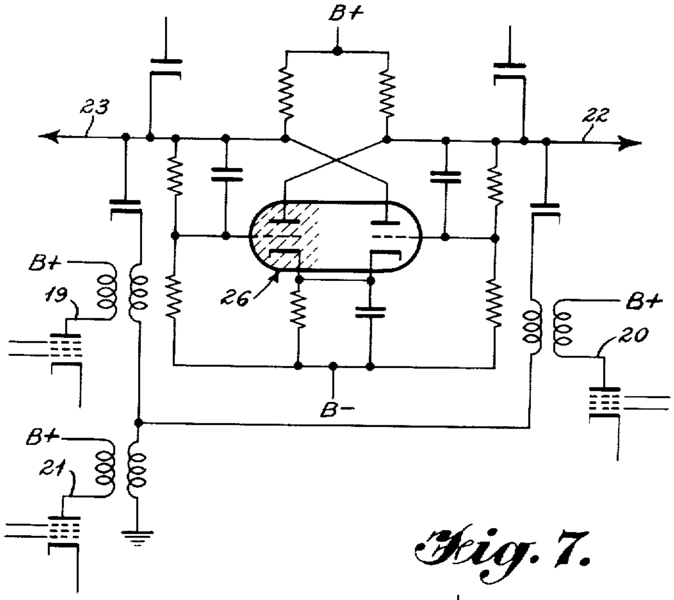
Fig. 3 is a circuit diagram of the electronic device shown in Fig. 2.

Fig. 3 shows a typical circuit for the flipflop 18 shown in Fig. 2. This figure shows a double triode 26 with the left portion shown shaded to indicate that this particular portion of the triode is conducting. This corresponds to the shaded representation 24 for the upper part of flipflop 18 of Fig. 2. With the left portion of triode 26 conducting, it is apparent that output lead 23 is high in potential as compared to output lead 22. It is further apparent that a pulse or signal of proper polarity appearing on lead 19, for example, will cause the grid of the left portion of double triode 26 to change potential. Such change in potential can cause the flipflop to change state so that the right hand portion of double triode 26 becomes conducting and the left hand portion becomes non-conducting. Output lead 22 is then high instead of output lead 23. A signal of proper polarity appearing on lead 21 results in a signal which is applied substantially equally to the clamping crystal diodes on both sides of the flipflop. Due to the non-linear resistance characteristic of the crystal diodes, the signal has little effect on the potential of lead 22 since this lead is assumed to be substantially negative. However, the crystal diode which connects to lead 23 will conduct and the end result is therefore like the case described with respect to a signal appearing on lead 19, namely, the grid of the left portion of double triode 26 is driven negative and the flipflop changes state. A signal of proper polarity appearing on lead 21 is therefore effective to change the state of the flipflop irrespective of its existing state. As may be observed from Fig. 3, output leads 22 and 23 are each connected between a pair of clamping crystal diodes so that the output potential can swing only a certain amount. Further description of the circuitry shown in Fig. 3 is deemed unnecessary since it is typical for an electronic flipflop and is readily understood by those skilled in the art.

Figure 4:
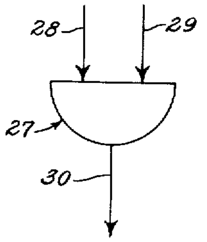
Fig. 4 shows a coincidence (and) gate used in a preferred form of apparatus according to the teaching of the present invention.

*Coincidence (and) gates.*—In transferring data in electrical pulse form from one part of the apparatus to another part, it is frequently necessary to condition the transfer at a particular point or points on whether two or more signals or pulses coincide. This is accomplished by utilizing so-called coincidence gates, often referred to as "and" gates. Fig. 4 shows such a gate. Referring to this figure, the coincidence gate is designated generally by the reference numeral 27. Two input leads 28 and 29 feed into the gate and a single output lead 30 leads from the gate. The character of the gate is such that output lead 30 will not be energized, or go high, unless both input leads 28 and 29 are energized, or are both high.

Figure 5:
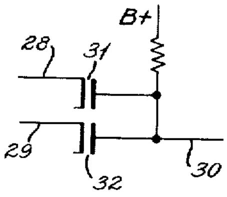
Fig. 5 is a circuit diagram of the gate shown in Fig. 4.

A simplified representation of typical circuitry for coincidence gate 27 is shown in Fig. 5. As will be evident to those skilled in the art, this is a typical coincidence gate of the diode type wherein output lead 30 will be high only if both input leads 28 and 29 are high. Thus, due to the non-linear characteristics of diodes 31 and 32, if either lead 28 or 29 is at a sufficiently minus voltage then output lead 30 will be at this minus voltage also. However, if both leads 28 and 29 are sufficiently positive, or sufficiently relatively positive, then output lead 30 will be correspondingly different in potential and will be high. Further detailed description of this particular circuit and the coincidence gate in general is deemed unnecessary since it is believed to be evident to those skilled in the art.

*Or gates.*—Just as it is frequently necessary to condition transfer of data on the coincidence of certain signals or pulses, it is also frequently necessary to transfer data if any one or more than one of two or more input leads happens to be sufficiently high in potential. This type of gate is commonly referred to in the art as an "or" gate. Such a gate is designated generally by the reference numeral 33 in Fig. 6 and a typical circuit for the gate 33 is shown in the right hand portion of Fig. 7.

Figure 6:
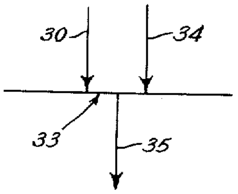
Fig. 6 shows an or gate.

Referring to Fig. 6, one of the input leads is shown as being lead 30 of the coincidence gate of Fig. 4 and the other input lead is designated by the reference numeral 34. If either of these input leads 30 or 34 is high then output lead 35 will be high. While only two or gate input leads 30 and 34 are shown in Fig. 6 any practicable number can be employed and output lead 35 will be high if one of the input leads is high.

Figure 7:
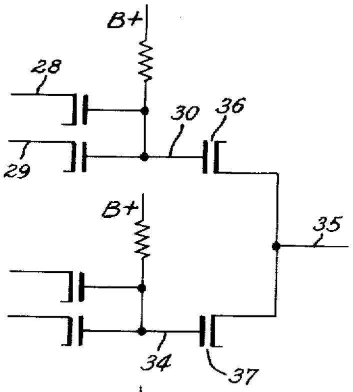
Fig. 7 is a circuit diagram including the gate shown in Fig. 6.

Referring to the circuit shown in Fig. 7, it is noted that leads 30 and 34 feed to diodes 36 and 37 respectively.

Therefore, if either lead 30 or 34 (or both) is high, then the anode of the corresponding diode will be high and the diode characteristic is such that it will conduct and cause output lead 35 to be high. It is apparent that, in the circuitry shown in Fig. 7, the or gate input leads 30 and 34 are the output leads of two coincidence gates of similar circuit arrangement.

*Pulse gates.*—Pulse gates, as employed in a preferred embodiment of apparatus according to the teaching of the present invention, are devices capable of accepting input signals from one or more sources and producing or passing an output pulse of extremely short duration so that very fine synchronization of operations performed by the apparatus may be achieved. For example, as is brought out more fully hereinafter, a pulse gate may have to supply a signal during a minute fraction of time which occurs between other time fractions and the signal must be of such short duration that it can be sandwiched in between the other times without affecting signals which may occur at the other times. Coincidence (and) gates and or gates of the types described above operate relatively slowly as compared to pulse gates and hence the latter perform the important function of enabling precise timing to be accomplished for control purposes.

Figure 9:
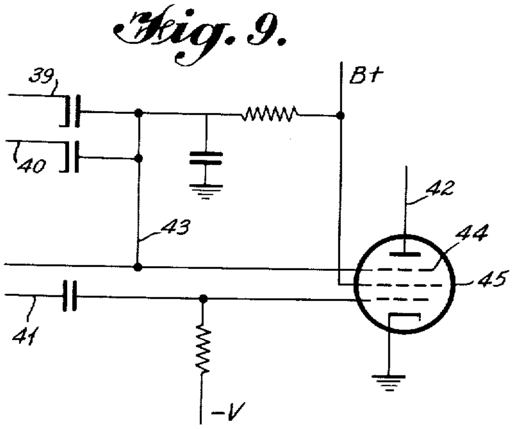
Fig. 9 is a circuit diagram of the pulse gate shown in Fig. 8.
Figure 8:
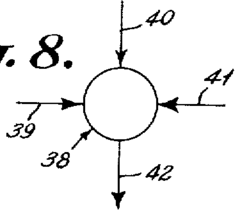
Fig. 8 shows a pulse gate.

Fig. 8 shows such a pulse gate which is designated generally by the reference numeral 38. Upon examining Fig. 8 it will be noted that there are three input leads 39–41 to gate 37 and one output lead 42. Referring to Fig. 9, which shows a typical circuit for gate 38, it will be noted that input leads 39 and 40 are input leads to a portion of the pulse gate circuit which is actually a coincidence gate circuit like that shown in Fig. 5. Thus, the output lead 43 of this portion of the pulse gate circuit leads to the suppressor grid 44 of the pentode 45 shown in Fig. 9. The characteristics of the pentode are such that a signal appearing on suppressor grid 44 as a result of a coincidence of inputs on leads 39 and 40 holds up the potential level so that a short duration pulse appearing on input lead 41 is passed as a short duration output signal on pulse gate output lead 42. While gate 38 is shown as having two input leads 39 and 40 for the coincidence gate part of the circuit, it could have one such lead or more than two such leads within practical limits. Further description of the pulse gate is deemed unnecessary as its circuitry and operation are believed evident to those skilled in the art.

THE MEMORY

In the computer art, the term "memory" may be defined as referring to that part of the computer which is capable of storing data fed into the computer, retaining the data, and giving up or feeding out the data when "asked" in the proper manner. As mentioned above, a single flipflop is a type of memory in that it can remember a single fact. Obviously a group of flipflops will have a memory capacity equal to the number of flipflops involved. Since a practical memory must have a substantial capacity to be useful for general computation purposes where the memory may have to store hundreds, if not thousands, of so-called words, it is preferred to use a medium which is capable of substantial storage.

One such type of memory is the magnetic drum type wherein the data to be stored is recorded on the magnetizable surface of the drum in discrete magnetized areas. A preferred embodiment of apparatus according to the present invention utilizes a magnetic drum type of memory because of its economy, ruggedness, and high performance characteristics as compared to other types of memories now known in the art. Inasmuch as it is possible to magnetize up to approximately 100 separate discrete areas per lineal inch on a magnetizable drum surface, it is apparent that a single track on the drum circumference can contain a substantial number of groups of magnetized areas which can represent numbers or other data being processed. In this connection, since the art commonly uses the term "word" to denote a number or other type of data being processed in a computer apparatus, this term is sometimes used hereinafter in the remainder of the detailed description.

In accordance with the teaching of the present invention, the information recorded in each track on the magnetizable surface of the magnetic drum may be continuously read and re-recorded on the drum surface. This is therefore a volatile system wherein, in effect, the words are lifted from the drum surface for a brief period of time and then put back onto the drum surface. When lifted from a track on the drum surface, so to speak, they may be transmitted from the drum to an output destination or to be recorded in another track on the drum and new words may come into the track in place of the old words.

This basic recirculation aspect according to the teaching of the present invention is shown schematically in Fig. 10 where the reference numeral 46 designates the magnetizable material circumference or outer surface of magnetic drum 47. Assuming that a portion of the magnetizable surface 46 contains a line or track of discrete magnetized areas representing bits of information, as the drum revolves in the direction of the arrow shown in Fig. 10, the magnetized areas can come successively under the magnetic induction reading head 48. As each discrete magnetized area on the drum surface is sensed, or read, by reading head 48, such sensing can cause an electrical pulse to pass through lead 49 to amplifier 50. The amplifier causes a write pulse to appear on lead 51 which transmits the write pulse to magnetic induction writing head 52 where the pulse is re-recorded as a discrete magnetized area on the surface of the drum.

Each bit of information will thus be re-recorded in exactly the same sequence and in the same track on the drum surface but will be displaced circumferentially from its former position in the track. After each magnetized area passes under reading head 48, it then passes under magnetic induction erasing head 53 which causes all areas to have the same magnetization as they approach writing head 52. As each area passes under the writing head, the latter will change the magnetization of the area if the writing head is energized by a pulse at that precise instant of time. It is to be realized that all equally spaced apart discrete areas representing a group of bits of information are magnetized areas with the magnetization of the areas representing the yes bits being different from the magnetization of the areas representing the no bits. Therefore, erasing head 53 simply changes the magnetization of the areas representing the yes bits so that they become areas representing no bits and thus all areas approach the writing head as areas representing no bits of information. The writing head 52 simply replaces some of the no bits with the proper yes bits in order that the relation of yes and no bits for any given group will be proper to represent the information correctly according to the binary number system.

Fig. 11 is a schematic showing similar to Fig. 10 to emphasize that the effect of the arrangement shown in Fig. 10 is as if the bits of information stored in a track on the drum surface were shaved from the drum surface and then spilled back over the shaving apparatus to get back onto the drum surface in the same order and in the same track from which they came. Erasing head 53 may be said to be the shaving apparatus and dotted line 54 may be said to represent the bits of information going from the drum surface 46 and spilling over the erasing head to get back onto the drum surface.

Fig. 12 is another schematic showing and shows a magnetic induction writing head 52 writing yes bits of information into a track 55 on drum surface 46. The dots 56 represent discrete magnetized areas in track 55 which represent the yes bits. Figs. 10–12 are to be understood as being quite simplified and as being illustrative of the storage of bits of information in a track or line on the drum surface and the simple recirculation of such bits of information from said track, through an external circuit, and back to the track. One significance of even this simplified showing is that it makes it apparent that each word (group of bits of information) in each track on the drum surface can be made available in an external circuit at a given period of time. Those skilled in the art will thus recognize this as a delay line type of memory since, for a given word, one must wait for it to appear in the external circuit if it is to be taken from the memory.

In a preferred embodiment of apparatus in accordance with the teaching of the present invention, the memory has a capacity of approximately 1,000 words with each word being about 25 binary digits in length. The words can be longer than 25 digits in length and the memory can have a greater capacity than stated but the stated capacity and word length are preferable because they help to reduce the size of the apparatus without unduly sacrificing the high speed general purpose computation ability of the apparatus. To accommodate the approximately 1,000 words capable of being stored in the memory, seven memory lines or tracks, such as track 55 shown in Fig. 12, are provided and each track has a capacity of 128 25-digit length words. In addition to the seven tracks, or long lines, mentioned, there are short tracks on the memory surface some of which are only one 25-digit word long and others of which are two 25-digit words long. This is brought out more fully in the later description.

In referring to a word as being 25 digits long, this is to be understood as meaning that there are 25 available digit positions for yes or no bits of information which make up the word. Thus there are 25 uniformly spaced apart discrete areas which can be magnetized to represent the yes or no bits of information. As will be understood by those skilled in the art, in representing a number, for example, according to the binary system, a 1 (yes) is placed in each digit position where it is necessary to have 2 to a power corresponding to the digit position to make up the complete number. Thus, the number 5 is represented according to the binary number system by 101, the number 10 represented by 1010, and the number 15 represented by 1111, all reading from right to left and with the right hand digit position being the units position as is well known by those skilled in the art.

Translated into electrical terms this means that to represent a given number by magnetizing discrete areas on the drum surface according to the binary number system, the areas will be magnetized to represent 1's (yes bits) and 0's (no bits) as required for the number involved. Where the words being processed are numbers, the first of the 25 digit positions is utilized as the sign digit. The remaining 24 digit positions are utilized to represent the number. With 24 magnetizable areas available per word it is apparent that if the particular number is a low number like 5, 10 or 15, then not more than the first four of the 24 areas will involve 1's (yes bits) and all the rest will be magnetized to represent 0's (no bits). On the other hand, if the particular number (word) is in the millions then most of the 24 magnetizable areas may involve 1's (yes bits). In any event, insofar as numbers are concerned, each word capacity goes up to 2 to the 24th power thus enabling the memory to store very large numbers and the apparatus to process very large numbers in arithmetic operations. In fact, as is brought out more fully later in the description, it is possible to process so-called double length words which go up to 2 to the 49th power. This can accommodate a very large number. Alternatively, words may represent fractions or they may represent any other coded information.

TIMING

Referring back to Fig. 1, it will be observed that the timing part (designated by block 17) of a preferred embodiment of apparatus according to the present invention is shown as being connected to the other parts of the apparatus as indicated by the small arrows extending from block 17. This, of course, is because the timing part synchronizes the action of the other parts and, so to speak, keeps all parts in step. It is evident that this is required since, to take merely one example, when electrical pulses are being recorded or written onto surface 46 of magnetic drum 47, corresponding electrical pulses going to different tracks on the drum surface must be recorded at exactly the same instant of time so that the relative word positions in the tracks will be the same. There can be no overlapping or variable gaps in relative word positions in the different tracks or else it would be impossible to command certain transfers to take place because the word positions would be unknown.

The exact uniform spacing of digit positions, sometimes called pulse positions, in every track on the magnetic drum surface is achieved by providing a master heart beat, so to speak, which is permanently recorded on magnetic drum surface 46 as one long track containing uniformly spaced apart discrete areas magnetized to represent 1's (yes bits). There are enough of these magnetized areas to provide precise control for 128 words each 25 digits long, it being understood that the last or 25th digit of one word is uniformly spaced from the first digit of the next subsequent word in the track. In other words, there is the same spacing between digits in digit positions 24 and 25 of one word as there is between this 25th digit and the first digit of the next succeeding word. Such a permanently recorded long line of uniformly magnetized discrete areas is indicated by dotted line 57 in Fig. 13 which is hereinafter referred to as the clock pulse track because, during each revolution of the magnetic drum, it presents uniformly spaced apart magnetized areas to a magnetic induction reading head 48 so that the latter can sense each magnetized area in succession.

Fig. 13 thus shows a magnetic induction reading head 48 as reading clock pulse track 57 to sense each of the magnetized areas present in the clock pulse track. As each discrete magnetized area is sensed, a pulse is produced which is fed to the amplifier designated by block 58. The amplified pulse is then fed to a suitable wave shaping component 59 from which it appears on output line 60 as a so-called write pulse (WP pulse). A switch 61 is provided whereby it is possible to interrupt the production of write pulses. Thus, if switch 61 is open nothing can be recorded or re-recorded on the magnetic drum surface because every magnetic induction writing head 52 is controlled by a write pulse. Hence, if a write pulse is not available the magnetic induction writing head cannot function. Switch 61 enables the operator to erase manually any information stored in the memory.

Fig. 14 illustrates schematically a shape which the write pulses appearing on output lead 60 may assume as a result of the re-shaping action of whatever electrical component is used to provide the wave shape. Thus, referring to Fig. 14, the write pulses (WP pulses) are shown as being square shaped pulses 62, this being simply illustrative of the shape which the pulse can take, the important point being that each write pulse be shaped like every other write pulse.

Referring back to Fig. 13, it will be noted that lead 63 is connected to the output of pulse gate 59 and feeds into a peaker 64 which has an output lead 65. The characteristics of peaker 64, or whatever equivalent electronic component is used, are such that it produces a sharp pulse coinciding with the trailing edge or trailing steep side 66 of each write pulse 62. This is shown in Fig. 14 where the sharp pulses 67 are shown as coinciding substantially in time relation with the trailing steep sides 66 of the write pulses 62. Sharp pulses 67 are hereinafter referred to as shift pulses (S*h* pulses).

Again referring to Fig. 13, it will be observed that lead 68 is connected to the output lead 65 of pulse gate 64 and feeds into a suitable electronic delay device indicated by block 69. The output from the delay device feeds into a pulse gate 70 which has an output lead 71. The characteristics of delay device 69 and pulse gate 70, or whatever suitable equivalent component is utilized, are such that pulses appear on lead 71 which are delayed a minute fraction of time from the write and shift pulses which appear on output leads 61 and 65 respectively. This is shown in Fig. 14 where the sharp pulses 72 are shown as being delayed timewise from the write and shift pulses. The delay is such that a pulse 72 occurs after a write pulse in approximately one-third of the interval of time between write pulses. This can be observed from Fig. 14 where it will be noted that the indicated positioning of a pulse 72 is approximately the first third of the distance between successive write pulses 62. Pulses 72 are sometimes hereinafter referred to as CP1 pulses.

Again referring to Fig. 13, it will be noted that lead 73 is connected to output lead 71 and feeds into a suitable electronic delay device designated by block 74 which in turn feeds into a pulse gate 75, or suitable equivalent device, having an output lead 76. Delay device 74 and pulse gate 75 operate like delay device 69 and pulse gate 70 to provide output pulses on line 76 which are sharp pulses spaced timewise from the write, shift and CP1 pulses. This is shown in Fig. 14 where the sharp pulses 77 are shown as occurring after their associated write, shift, and CP1 pulses. The delay is such that a particular CP2 pulse 77 occurs in approximately two-thirds of the time from one write pulse to the next succeeding write pulse. This can be observed from Fig. 14 where it will be noted that the pulse position 77 is indicated as being roughly two-thirds of the distance between write pulses 62 going from left to right.

It is therefore evident that each time that magnetic induction reading head 48 senses a magnetized area in the clock pulse track, four timing pulses are produced. The first is a write pulse 62, the next is a shift pulse 67, the next is a CP1 pulse 72, and the next is a CP2 pulse 77. Furthermore, all of these pulses result before the reading head 48 senses the next succeeding magnetized area. With magnetic drum 47 rotating at a relatively high rate of speed, it is apparent that the pulse production is extremely rapid and that the apparatus is therefore capable of very high speed operation electronically.

Figures 15, 16:
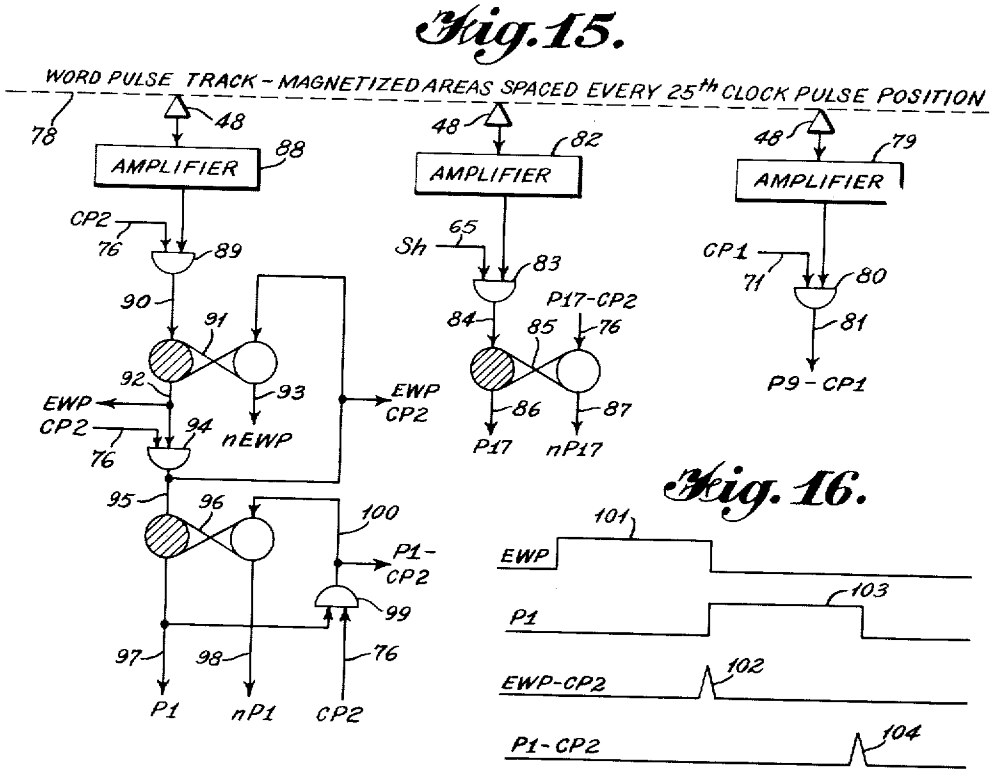
Fig. 15 is a circuit diagram of another timing part of a preferred form of apparatus according to the teaching of the present invention.
Fig. 16 shows various types of electrical pulses, and their time relation, obtained by means of the circuitry shown in Fig. 15.

Another timing track permanently recorded on the magnetized surface 46 of magnetic drum 47 is a so-called word pulse track designated by the dotted line 78 in Fig. 15. This track contains discrete areas magnetized as yes bits of information and spaced uniformly apart so that there is a spacing of 24 digit positions between each adjacent pair of such magnetized areas. Thus, in contrast to the clock pulse track which has a yes magnetized area for every one of the 25 digit positions constituting a word, the word pulse track has only one yes magnetized area per word. However, four different timing pulses are derived from the word pulse track and this is accomplished by the circuitry shown in Fig. 15.

Referring to Fig. 15, it is noted that three magnetic induction reading heads 48 read the word pulse track 78. These three magnetic induction reading heads are physically positioned or spaced with respect to each other so that they are a predetermined number of digit positions from each other. This means that if a yes magnetized area passes under one of the magnetic induction reading heads and travels on at a constant speed to pass under the next reading head, then the signal derived from the second reading head will occur after the first reading head signal a predetermined period of time. In the example shown in Fig. 15, and in accordance with a preferred practice according to the teaching of the present invention, pulses are derived from the word pulse track at the ninth digit position of a 25 digit position word, the 17th digit position, and the 25th digit position. This means that the reading heads 48 which originate the 17th and 25th digit position signals must be spaced exactly right with respect to the reading head 48 which originates the 9th digit position signal so that the 17th digit position signal will occur 8 digit positions in time behind the 9th digit position signal and the 25th digit position signal will occur 8 digit positions in time behind the 17th digit position signal When a yes magnetized area on the word pulse track 78 passes under the magnetic induction reading head 48 which originates the 9th digit position signal (the right hand reading head 48 as shown in Fig. 15), a pulse is fed to amplifier 79 and from the amplifier to gate 80. A CP1 clock pulse (see Fig. 14) is shown as being fed into gate 80 on CP1 clock pulse lead 71. The characteristics of gate 80 are such that this gate, in effect, gates the CP1 pulse through during the 9th digit position of each 25 digit position word so that a CP1 pulse appears on output lead 81 during every such 9th digit position. Since the CP1 pulse is a sharp short duration pulse it is apparent that the output of gate 80 is a sharp short duration output signal which occurs precisely during the 9th digit position in any given word. The fact that the CP1 pulse is gated during the 9th digit position is indicated by the symbol P9–CP1 shown in Fig. 15.

The magnetic induction reading head 48 which originates the 17th digit position signal feeds into an amplifier 82 which in turn feeds into a gate 83. A shift pulse (S*h* pulse) is also applied to gate 83 on shift pulse output lead 65 (see Fig. 13) during each clock pulse time so that when the gate receives a signal from amplifier 82, the sharp short duration shift pulse is gated through by gate 83 and appears on lead 84 as an input to flipflop 85.

The shift pulse which is gated through by gate 83 is actually the shift pulse produced on the trailing edge of the 16th digit position clock pulse. This shift pulse is applied to flipflop 85 and the latter introduces an additional digit position delay in changing to its set state. Thus, when the shift pulse is gated through to lead 84, it sets flipflop 85 causing lead 86 to become high during exactly the 17th digit position (17th clock pulse time). When flipflop 85 is set, lead 86 is high and lead 87 is low. The latter therefore represents the not 17th digit position signal (*n*P17). Flipflop 85 is reset by the next succeeding CP2 clock pulse fed in on lead 76 and which follows the shift pulse which set the flipflop. As is shown in Fig. 14 the CP2 pulse trails the shift pulse so that the resetting action can take place as just described.

During the 24th digit position (24th clock pulse time), the left hand magnetic induction reading head 48 shown in Fig. 15 reads a yes magnetized area appearing in word pulse track 78 and emits a signal which is fed to amplifier 88. The amplifier output signal is, in turn, fed to gate 89. A CP2 clock pulse is also fed to gate 89 via lead 76 during each clock pulse time. Therefore, when amplifier 88 feeds a signal to gate 89, the characteristics of the gate are such that the CP2 pulse is gated through and appears on lead 90 to set flipflop 91. Since the CP2 pulse was fed to gate 89 during the latter part of the 24th clock pulse time and prior to start of the 25th clock pulse time (see Fig. 14 for the relative spacing involved) then flipflop 91 is set during the 25th clock pulse time and consequently flipflop output lead 92 is high during the 25th clock pulse time. Correspondingly flipflop output lead 93 is low during the 25th clock pulse time. Lead 92 therefore bears the designation EWP meaning end of word pulse and lead 93 bears the designation *n*EWP meaning not end of word pulse.

Flipflop output lead 92 feeds to gate 94 which has a CP2 pulse fed thereto via lead 76 during each clock pulse time. Therefore, this CP2 pulse, which occurs during the latter portion of the 25th clock pulse time and precedes the next succeeding clock pulse time which is the first clock pulse time for the next word (pulse occurring during the first digit position) is gated through by gate 94 and goes via lead 95 to reset flipflop 91. This CP2 pulse also sets flipflop 96 so that during the first clock pulse time of the next succeeding word, output lead 97 is high and output lead 98 is low. These leads therefore are also indicated as P1 meaning a pulse occurring during the first digit position of a word and *n*P1 meaning no pulse during the first digit position of a word. Flipflop 96 is reset by the CP2 pulse which occurs during the latter part of the first clock pulse time, this CPT pulse being fed into gate 99 via lead 76. Gate 99 gates this CP2 pulse through and the latter is fed via lead 100 to reset flipflop 96. Lead 100 is therefore also indicated as having a P1–CP2 signal applied thereto meaning the CP2 pulse which occurs during the latter part of the first clock pulse time.

When flipflop 91 or 96 is set, flipflop output lead 92 or 97 is high for a relatively long period of time as compared to the duration of any clock pulse. This is shown in Fig. 16 where the relatively wide pulse 101 represents the EWP pulse appearing on line 92. When the CP2 pulse fed to gate 94 on line 76 is gated through by this particular gate it resets flipflop 91 so that pulse 101 terminates abruptly. This is evident from the relative positioning of the EWP–CP2 pulse 102 shown in Fig. 16 as compared to the EWP pulse 101. The same relation holds for the P1 pulse which appears on flipflop output lead 97, this pulse being indicated by the reference numeral 103 in Fig. 16, which is terminated abruptly by the P1–CP2 pulse indicated by the reference numeral 104 in Fig. 16.

The various clock pulses and the various pulses derived from the word pulse track are fed to various flipflops and gates involved in carrying out operations capable of being performed by apparatus according to the present invention. Of course, what pulses, flipflops and gates are involved at a given time depends upon the particular operation being carried out. However, it is to be understood as a general proposition, that every flipflop is controlled by at least one of the clock pulses which occurs during every clock pulse time so that the flipflop will be set or reset at precisely the correct clock pulse time involved.

COMMAND

As is indicated by the clock diagram shown in Fig. 1, during operation of apparatus in accordance with the teaching of the present invention, data may transfer from one part of the apparatus to another part of the apparatus. Usually, this transfer is from a line, or track, of the memory, through other parts of the apparatus wherein the data is modified in some manner, and then back to a line, or track, of the memory. Such transfer is in response to a so-called "command" which is also a 25-digit length word and which is read from an appropriate track on the memory just as words representing numbers are read from the memory.

Figure 17:
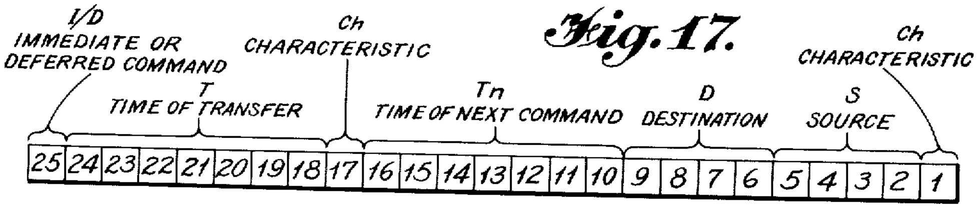
Fig. 17 shows the make-up of a preferred form of command word according to the teaching of the present invention.

Fig. 17 shows the make-up of a command according to the teaching of the present invention. According to this figure, the command has a length of 25 digit positions, i.e. will occupy 25 sequential discrete areas in a memory line. When the command is recorded in a line, or track, 56 on the magnetizable drum surface 46, line one of seven lines for example, the 25 sequential discrete areas which represent the command will be magnetized as yes or no bits of information in order to represent the particular command involved properly according to the binary number system.

Fig. 17 shows that the 25 digit positions constituting a command word are grouped into different groups and that the different groups control different aspects involved in accomplishing transfer of data. Thus, it is noted that digit positions 1 and 17 are labeled characteristic (*Ch*). Characteristic includes such types of transfer, for example, as transfer unchanged, transfer absolute value, or transfer for addition or subtraction. Since two digit positions are utilized for the characteristic, it is readily possible to specify the types of transfer mentioned according to the binary number system.

When a magnetic induction reading head 48 reads the discrete areas in digit positions 1 and 17 (the reading of the area in digit position 1 occurring first in time sequence), P1 and P17 pulses can result if these areas are magnetized as yes bits of information. It is thus possible to obtain P1 and P17 pulses, to obtain neither pulse or to obtain a pulse for only one of these digit positions. According to the binary system this gives the possibilities of 11, 00, 01 or 10 and it is therefore evident that the four possibilities of simple transfer, absolute value transfer, add or subtract may be specified.

Again referring to Fig. 17 it is observed that digit positions 2–5 are labeled source (S). Source means where the data is transferred from or, to put it another way, where the data which is fed to the Early Bus 6 originates. The usual sources are the various long lines or tracks on magnetizable drum surface 46.

Since four digit positions are allotted to determine source, it is apparent that, according to the binary number system, up to sixteen possible sources may be designated. Thus, when a magnetic induction reading head 48 reads discrete areas in digit positions 2–5 an electrical pulse will be produced each time that the reading head reads an area magnetized as a yes (1) bit. Assuming that none of the four areas is magnetized as a yes bit then the output from the reading of these four areas will be 0000 which designates the 0 source. Conversely, if each area is magnetized as a yes bit then the reading head will produce four electrical pulses (1111) which designates source 15. Thus, by having a range from 0 to 15, any one of 16 sources may be designated. It is to be understood that a source, such as a long line of the memory, may contain a number of words. Once the source has been designated, another part of the command (T) determines what particular word of the source is to be transferred. The possible pulses which may be derived from the reading of discrete areas in digit positions 2–5 are designated P2, P3, P4, and P5.

Again referring to Fig. 17 it is noted that digit positions 6–9 are labeled destination (D). Destination means where the data is to be transferred to or, to put it another way, where the Late Bus 7 sends the data. It is apparent therefore that digit positions 6–9 correspond in function to digit positions 2–5 and further detailed description concerning the destination digit positions is deemed unnecessary. Any one of sixteen possible destinations may be selected and the pulses which may be derived from the reading of discrete areas in digit positions 6–9 are identified as P6, P7, P8 and P9. It is apparent that these pulses occur subsequent to any source pulses P2–P5.

Again referring to Fig. 17, it is observed that digit positions 10–16 are labeled time of next command (T*c*). Time of next command means where the next 25 digit length word which is to serve as a command is located in terms of its word position in a particular line, or track, on the magnetizable drum surface which contains command words. In a preferred practice of the present invention, command words will be located in line zero (0), in other words, in the first long line of the seven long lines on the drum surface although additional lines may be used also if desired. Since a long line is stated to have 128 words it is necessary to provide enough digit positions in each command word to select any word position from word position 0 to word position 127 in the long line, or track, which contains the command words. By providing digit positions 10–16 there are seven available digit positions and in the binary number system 27 equals 128. Digit positions 10–16 can therefore designate any command word from a command word located in word position 0 of the command line up to a command word in word position 127 of the command line. As a magnetic induction reading head 48 reads the discrete areas in digit positions 10–16, pulses which may be produced from such reading are identified as P10–P16 pulses, these being T*c* pulses.

Referring back to Fig. 17, it is noted that digit positions 18–24 are labeled time of transfer (T). Time of transfer means during which word time, or word times, one or more of the words in a line, or track, on drum surface 46 is to be transferred. Since digit positions 18–24 total 7 positions then, as described above in connection with digit positions 10–16, any word from word 0 to word 127 in any of the long lines, or tracks, on the drum surface may be designated by its numerical position in the long line and this determines during which word time actual transfer will take place if but a single word is to be transferred. As is described more fully hereinafter, plural word transfer is also possible. Pulses which may be produced from the reading of discrete areas in digit positions 18–24 are identified as P18–P24 pulses, these being T pulses.

The 25th digit position shown in Fig. 17 determines whether a command is an immediate or a deferred command. An immediate command is one which causes transfer of data to occur beginning with the very next word time following the actual reading of the command. In other words, transfer starts with the first digit of the word which immediately succeeds the 25th digit of the command word. A deferred command is one in which transfer starts one or more word times following the word time during which the command is actually read. If the command is read in word position 0, deferred transfer can occur as late as during the next succeeding word position 0. This is, of course, the maximum delay possible with 128 word lines. A pulse which may be produced by reading a discrete area in the 25th digit position of the command word is designated P25, or the I/D pulse.

As is brought out more fully hereinafter, a deferred command causes transfer to take place for exactly one single length word time. In contrast, an immediate command can cause transfer to take place during one word time or during all of the word times of a long line, or track, on the drum surface. Thus, with just one command it is possible to transfer all of the 128 words in a long line, or track, on the drum surface. It is to be noted, furthermore, that the command shown in Fig. 17 and described above is a two-address command in that it not only gives the address of the source but it also gives the address of the destination. Also, in chain fashion, so to speak, each command links to it the next command to be obeyed.

Figure 18:
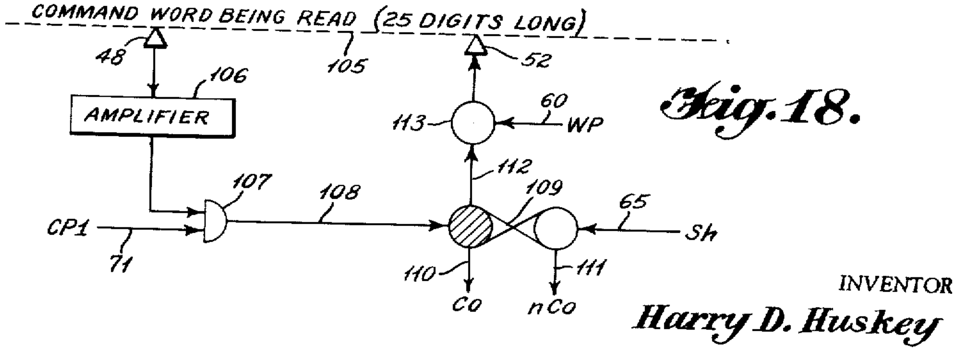
Fig. 18 is a circuit diagram of circuitry utilized in reading a command word.

Fig. 18 is a circuit diagram showing how the command pulses are made available. Dotted line 105 represents a line, or track, on drum surface 46 which contains command words. As stated above, command words are preferably located in the first long line, or track, on the drum surface. Wherever they are located, a particular command word being read will, during the reading, pass under a magnetic induction reading head 48 digit by digit in sequence starting with the digit in the first digit position and ending with the digit in the 25th digit position. Each time that the magnetic induction reading head 48 reads a discrete area magnetized as a yes bit of information (a 1) it will send a pulse to amplifier 106 which in turn feeds to gate 107. The characteristics of gate 107, or whatever equivalent electronic component is utilized in lieu thereof, are such that each time it is thus energized it will gate a CP1 pulse which is fed into the gate on CP1 pulse lead 71. Each CP1 pulse thus gated is fed via lead 108 and sets flipflop 109 causing flipflop output lead 110 to go high, the latter also being designated as the *Co* bus (command bus). Flipflop output lead 111, connected to the other side of the flipflop, is obviously the not command bus and hence is also designated *nCo*. Command pulses P1 to P-25 can thus appear on bus 110 depending upon the state of flip-flop 110. The pulses which appear on bus 111 are therefore obviously the complement of the pulses which appear on bus 110.

Fig. 18 shows that the command word recirculates so that it is recorded back onto the command line. Recirculation occurs because each time that flipflop 109 is set lead 112 goes high and energizes pulse gate 113. The characteristics of the pulse gate are such that it gates a write pulse fed into it on WP line 60 (see Fig. 13) each time that the gate is energized by lead 112 going high. The gated write pulses energize magnetic induction writing head 52 which magnetizes discrete areas on the drum surface to correspond to the pattern, or timing, of the write pulses. The command word is thus recorded in exactly the same sequence and with exactly the same make-up as it was read. Flipflop 109 is reset by a shift pulse fed to it on *Sh* line 65 immediately following each write pulse which appears on line 60. Erase head 53 is omitted in Fig. 18 since it is to be understood that there is always an erase head between a reading head and a writing head.

SOURCE AND DESTINATION SWITCHING

As the command word is read, pulses produced on *Co* bus 110 and *nCo* bus 111 during the reading of the discrete areas in digit positions 2–9 are fed to the source and destination switching parts 2 and 4 of the apparatus (see Fig. 1). More precisely, the P2–P5 pulses proceed through the destination switching part and into the source switching part followed by the P6–P9 pulses which go into the destination switching part but not beyond it.

Figure 19:
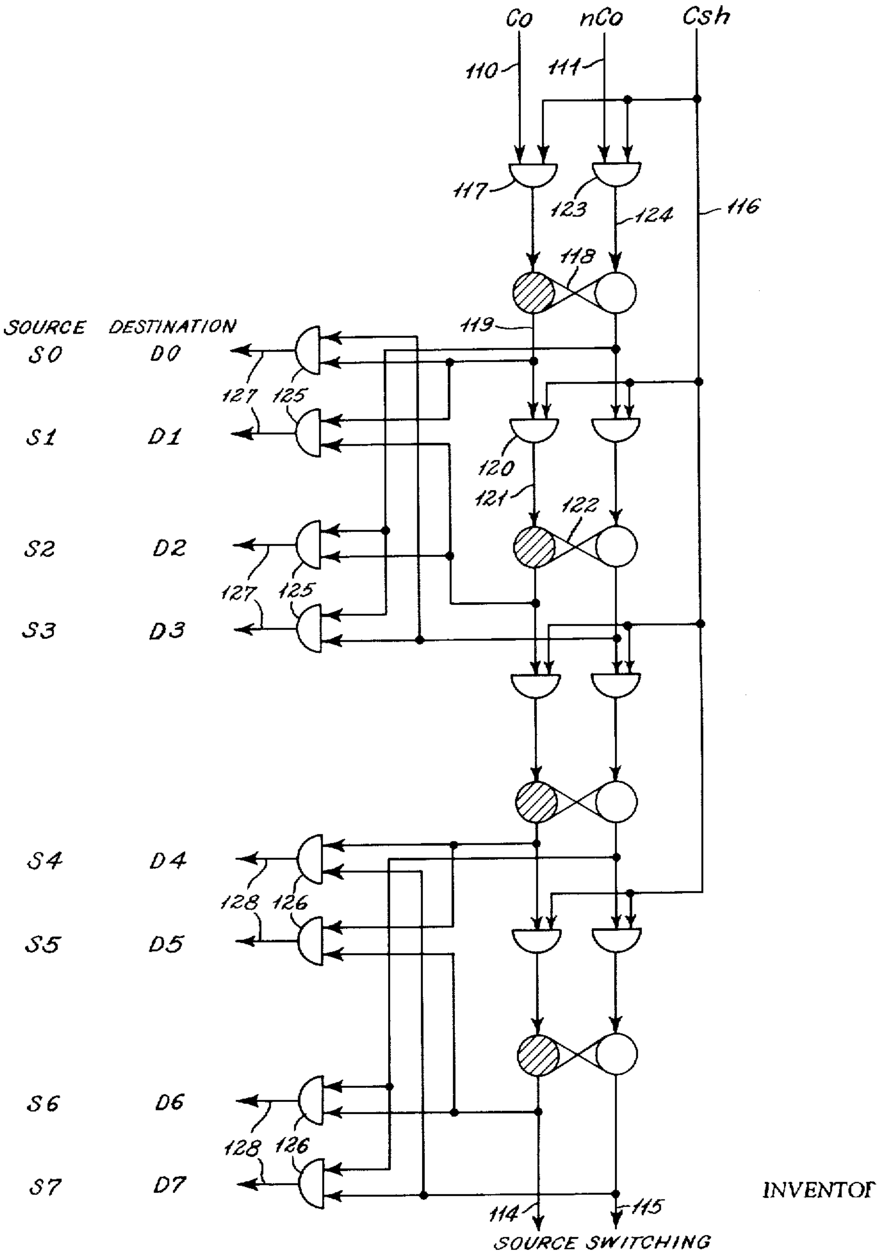
Fig. 19 is a circuit diagram of source and destination switching parts of a preferred form of apparatus according to the teaching of the present invention.

Fig. 19 shows the destination switching part which is designated generally by block 4 in Fig. 1. The source switching part designated generally by block 2 in Fig. 1 is not shown separately in Fig. 19 since it is exactly the same in arrangement as the destination switching part, it being understood that if the source switching part were shown it would be connected to the destination switching part by the two lines 114 and 115 shown in Fig. 19 and would be an exact replica of the destination switching part with the lines 114 and 115 corresponding to bus lines 110 and 111. This is the reason that, in the left hand portion of Fig. 19, the source coding S0 to S7 appears beside the destination coding D0 to D7.

As the discrete areas in digit positions 2–5 of the command word are read, or sensed, any pulses fed through to *Co* bus 110 proceed into the flipflop register shown in Fig. 19 and are shifted along by shift (*Sh*) pulses which occur each clock pulse time. These shift pulses are fed into the flipflop register on line 116 (the *Csh* time) which, as is described hereinafter, comes from the control part 16 of the apparatus. Assuming, for example, that a P2 pulse appears on bus 110, this pulse, in effect, passes through coincidence gate 117 when the next shift pulse appears on line 116 and sets flipflop 118. When flipflop 118 is thus set, flipflop output lead 119 is high. Hence, when the next shift pulse appears on line 116, gate 120 output lead 121 goes high thus setting flipflop 122.

The same shift pulse which causes lead 121 to go high, as just described, also resets flipflop 118 by causing coincidence gate 123 output lead 124 to go high. The new state of flipflop 122, that is, the set state, is thus the old state of flipflop 118 as it existed immediately prior to the shift pulse just mentioned. Now this shift pulse has caused flipflop 118 to become reset. Therefore, in the flipflop register being described, each flipflop which is reset by a shift pulse, in effect, preserves its state immediately prior to the shift pulse long enough for this state to be transferred to the next succeeding flipflop. If additional circuit components are desired to increase the delay time during which, in effect, a particular flipflop retains its state so that the flipflop has a longer time to transfer its state to the next succeeding flipflop, then such additional delay components may be provided as will be understood by those skilled in the art.

The pulse shifting thus continues during the time interval in which the discrete areas in digit positions 2–9 of the command word are read. At the end of this time interval, any P2–P5 pulses (source pulses) have set the proper flipflops in the source switching part of the apparatus. Likewise, any P6–P9 pulses (destination pulses) have set the proper ones of the four destination flipflops in the manner described above in regard to two of these flipflops 118 and 122. Whether a particular source or destination flipflop remains set at the end of the time interval depends on whether the corresponding discrete area is magnetized as a yes (1) bit of information. Thus, flipflops 118 and 122 will remain set if there is a yes area in digit positions 9 and 8, respectively, of the command word. As is explained more fully hereinafter, the command shift pulses (*Csh* pulses) cease to appear on line 116 immediately following the reading of the magnetized area in digit position 9 of the command word and hence all of the coincidence gates whose output leads connect to the source and destination flipflops, such as gates 117 and 123 for example, are blocked after any P9 pulse has entered the destination switching part.

Depending upon the final set, reset states of the source and destination flipflops, the two input leads to one of the four coincidence gates 125 shown in Fig. 19 will be high and likewise the two input leads to one of the four coincidence gates 126 will simultaneously also be high. This means that one of the four gate output leads 127 will be high at the same time that one of the four gate output leads 128 is high. Signals are thus produced on two of eight lines which gives sixteen possible combinations of pairs of lines thus enabling any one of sixteen destinations to be selected and, in similar manner, any one of sixteen sources. The output leads of the various source and destination flipflops thus connect to gates which partially decode the switching information into signals on two of eight lines. As is brought out more fully hereinafter, the rest of the decoding takes place at other gates which actually pass the data which is caused to be transferred by the command involved.

TRANSFER GENERALLY

Figures 20, 22:
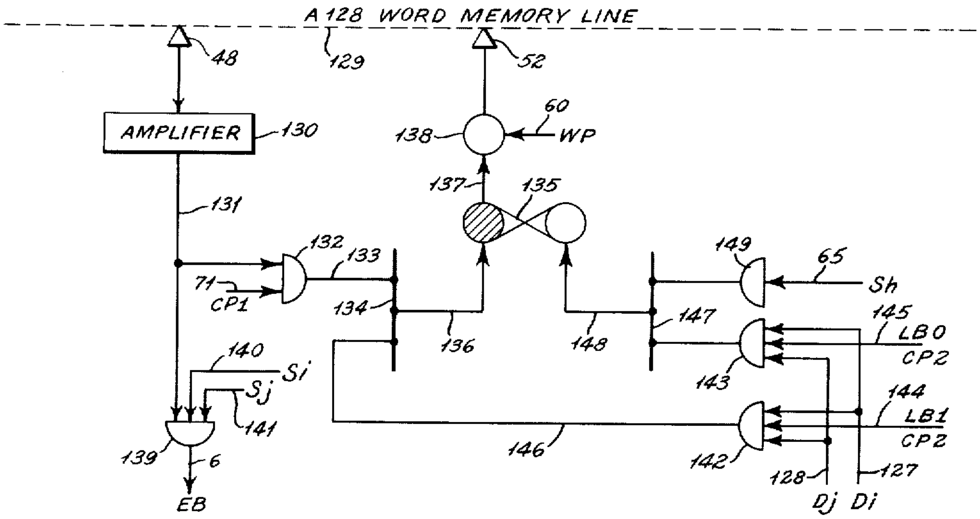
Fig. 20 is a circuit diagram showing how data may be recirculated from and back to a memory line, transferred from a memory line, and transferred into the memory line.
Fig. 22 is a table showing the states of certain flip-flops shown in Fig. 21 for different types of operations.

General recirculation of data from a line, or track, on the memory surface back onto the same line, or track, has been described above in connection with Figs. 10 and 11. However, for a more detailed description, reference is made to the typical memory circuit shown in Fig. 20. In Fig. 20 the dotted line 129 represents one of the seven assumed long lines on the memory drum surface. It will be recalled that such a line, or track, is said to contain 128 25 digit length words.

As the magnetic drum 47 rotates, reading head 48 senses the yes magnetized discrete areas which represent 1's in the digit positions involved, the absence of a yes area in any digit position of course representing a zero in that digit position. Each time that a yes magnetized area is sensed, the resulting pulse is amplified by amplifier 130 and appears on lead 131 as an input to coincidence gate 132. A CP1 clock pulse also feeds into gate 132 on CP1 clock pulse line 71. Therefore, at CP1 clock pulse time, a signal, or sharp pulse, is fed on lead 133, through junction lead 134, and into flipflop 135 on lead 136 setting the flipflop. The flipflop output lead 137 goes high thus energizing pulse gate 138. The characteristics of pulse gate 138 are such that it, or whatever equivalent electronic component is used in its place, gates a write pulse (another clock pulse, it will be recalled) fed into the pulse gate on write pulse lead 60. The gated write pulse is fed to magnetic induction writing head 52 which is thus energized to magnetize a discrete area as a yes bit of information, thereby re-recording the yes bit sensed by reading head 48. The memory line data therefore recirculates from the memory line back to the memory line sequentially, bit by bit.

In addition to being re-recorded on the drum surface, the sensed data can also be transferred to another part of the memory, another long line or track for example, and be recorded there simultaneously with being re-recorded in the same track from which it is being sensed. Such transfer is permitted by gate 139. Gate 139 will pass the amplified pulses resulting from the sensing of yes magnetized bits by reading head 48 only if the two source lines 140 and 141 are both high when the amplifier output lead 131 is also high. The two source lines are also designated as S*i* and S*j*.

Assuming seven long lines on the memory, then *i* and *j* can represent different number combinations to give seven pairs of different numbers which can thus be used as source designations to designate which one of the seven memory lines is to serve as the source of data to be transferred. Lines 140 and 141 are two of the eight source switch output leads which correspond to the destination output leads 127 and 128 shown in Fig. 19. It will be recalled that, as a particular command is read, the source switching part energizes one of the four leads 140 and one of the four leads 141. The selected leads connect to a gate, such as gate 139, and thus select the source as commanded by the command. The selected source therefore has an open gate, so to speak, through which to transfer its information at the proper time as determined by the transfer time specified by the command.

New data, for example, a word from another line of the memory, may be recorded or written into the memory line instead of re-recording the normally recirculated word as has been described above. In this case, the recirculation must be blocked since otherwise the new word and the recirculating word would coincide and the result would be meaningless. Referring to Fig. 20, it will be noted that gates 142 and 143 have three input leads each. Input leads 127 and 128 are common to each gate. Input lead 144 is a Late Bus line leading to gate 142 while input lead 145 is a Late Bus line leading to gate 143.

As is brought out more fully hereinafter, Late Bus 7 actually consists of two Late Bus lines (LB1 and LB0). Lines 127 and 128 are also designated D*i* and D*j* respectively and represent one of the four destination switching part output leads 127 and one of the four output leads 128 shown in Fig. 19. By letting the letters *i* and *j* stand for different ones of the leads 127 and 128 it is apparent that any one of the seven long lines of the memory may be selected as the particular destination to which data is to be sent.

Assuming that leads 127 and 128 shown in Fig. 20 are both high then whenever Late Bus line 144 is high (which occurs at CP2 clock pulse time), gate 142 passes a signal to lead 146. The signal proceeds via junction lead 134 and lead 136 into flipflop 135 to set the flipflop. It may be that gate 132 has already caused the flipflop 135 to be set at a CP1 clock pulse time immediately preceding the CP2 clock pulse time during which a signal appears on line 144. If so, this does not matter because writing head 52 will magnetize an area on the drum surface as a yes bit of information to represent that the particular LB1 pulse being recorded for the digit position involved is in fact a 1. If, on the other hand, a zero (0) is to appear for the next digit position on the drum surface following the 1 just recorded, then Late Bus line 145 will be high at this particular pulse time. Therefore, even if gate 132 should pass a CP1 clock pulse which sets flipflop 135, since gate 143 passes the immediately following CP2 clock pulse, flipflop 135 is reset by the CP2 clock pulse which is fed to the flipflop via gate 143, junction lead 147, and lead 148. Flipflop output lead 137 is therefore low which means that the next succeeding write pulse (WP) on line 60 is not gated to the writing head 52. Consequently, the discrete area on the drum surface for the digit position involved is not magnetized as a yes bit of information and hence is a no (0) bit of infomation. If flipflop 135 is not reset by a pulse coming from gate 143, it is reset by the next succeeding shift pulse which appears on shift pulse line 65, goes through gate 149, junction lead 147, and then on lead 148 to the indicated side of flipflop 135.

Fig. 20 thus shows that memory line data may recirculate, i.e. may, so to speak, be lifted from the line and redeposited onto the line in exactly the same order in which it was lifted; that data may simultaneously recirculate and be transferred from the line to some destination; and that new data may be sent to the line to replace the data which would otherwise recirculate onto the line. As will be evident to those skilled in the art, an index can be prepared giving respective sources and destinations and a programmer will utilize the index to make up his program of transfers and operations required in the solution of a particular problem. The following is a type of index table which may be employed in the practice of the present invention.

*Index table*

| Number | S*i*S*j* or D*i*D*j* | Source | Destination |
|---|---|---|---|
| 0 | 40 | Product | Read. |
| 1 | 41 | Line 1 | Line 1. |
| 2 | 42 | Line 2 | Line 2. |
| 3 | 43 | Line 3 | Line 3. |
| 4 | 50 | Line 4 | Line 4. |
| 5 | 51 | Line 5 | Line 5. |
| 6 | 52 | Line 6 | Line 6. |
| 7 | 53 | Line 7 | Line 7. |
| 8 | 60 | | Product. |
| 9 | 61 | Accumulator | Acc. Add. |
| 10 | 62 | Acc. and line 2 | Discrimination. |
| 11 | 63 | | |
| 12 | 70 | Ready 1 | Sign control. |
| 13 | 71 | Ready 2 | Special. |
| 14 | 72 | Acc. or line 3 | Print. |
| 15 | 73 | Product and line 7 | |

Special Destinations

| Destination | Source | Effect |
|---|---|---|
| 71 | 40 | Multiply. |
| 71 | 41 | |
| 71 | 42 | Bell. |
| 71 | 43 | |

The above table provides for up to sixteen sources and up to fifteen destinations plus a special destination. It will be recalled from the description in connection with Fig. 19 that it is possible to select any one of sixteen possible sources and any one of sixteen possible destinations. The blanks appearing under the headings "Source" and "Destination" in the above table provide room to insert some other sources and destinations in addition to those set forth in the table, should this be desired.

The numbers appearing in the column under the heading S*i*S*j* or D*i*D*j* show the numerical coding employed to select the two of the source switching output leads 140 and 141 and the two of the destination switching output leads 127 and 128 required for the transfer operation involved. The various sources and destinations are identified under the headings, source, destination. The line 1 to line 7 sources and destinations are of course the seven long lines, or tracks, on the memory drum surface. Various ones of the other sources and destinations listed in the above table are referred to again in the description hereinafter.

SIGN INSPECTION

It will be recalled by referring back to Fig. 1 that all data which goes from the Early Bus 6 to the Late Bus 7 passes through the sign inspection part of the apparatus designated by block 3 in Fig. 1. Where the data (word) is a number, the first digit is the sign digit identifying whether the number is positive or negative. If the number is positive, the first of the 25 magnetized discrete areas representing the number according to the binary system, assuming a single word length number, is magnetized so that, when it is sensed by a reading head, no pulse is produced. This is a no bit of information (a zero) and means that the sign digit for a positive number is a zero (0). Conversely, for a negative number, the first magnetized discrete area is so magnetized that when it is sensed a pulse does result. This is a yes bit of information (a 1) and hence the sign digit for a negative number is therefore a 1.

The sign inspection part 3 of the apparatus inspects the information derived from the sensing of the discrete area in the first digit position of the word involved, which may be of single or double length. If there is to be a simple transfer of the word from one part of the apparatus to another part of the apparatus, from the memory back to the memory for example, the sign inspection part permits the transfer without modifying the word. If the word is to be transferred in absolute value form, the sign inspection part 3 of the apparatus, in effect, deletes the first digit of the word so that whether it was originally a positive or negative number, it reaches its destination as a positive number. If the word being transferred is to be added to or subtracted from another word, a word present in the accumulator for example, then the sign inspection part 3 of the apparatus effects complementation of the word, if required, so that the proper addition or subtraction operation will take place in the accumulator.

Thus, if a negative number is to be added to a number in the accumulator, the negative number is first complemented and the same with a positive number which is to be subtracted from a number already present in the accumulator. The sign inspection part 3 of the apparatus is therefore a most important part of the apparatus and it is to be noted further that this part of the apparatus performs its function while the data passing through it is in transit from one part of the apparatus to another part of the apparatus.

Since single length words (25 digits long) or double length words (50 digits long) may be involved in a given transfer of data from one part of the apparatus to another part of the apparatus, through the sign inspection part of the apparatus, it is necessary to "condition" the sign inspection part of the apparatus to handle the respective word lengths properly. This is accomplished by providing a sign control pulse at a time which immediately precedes the time during which any pulse occurs resulting from the sensing of the first discrete area of the areas representing the word involved. In other words, the so-called sign control pulse immediately precedes any sign pulse. It is apparent therefore that the sign control pulse will occur every 25 clock pulse times, or every 25th time that a discrete area on the drum surface is sensed, for a single length word and every 50 clock pulse times for a double length word.

Figure 21:
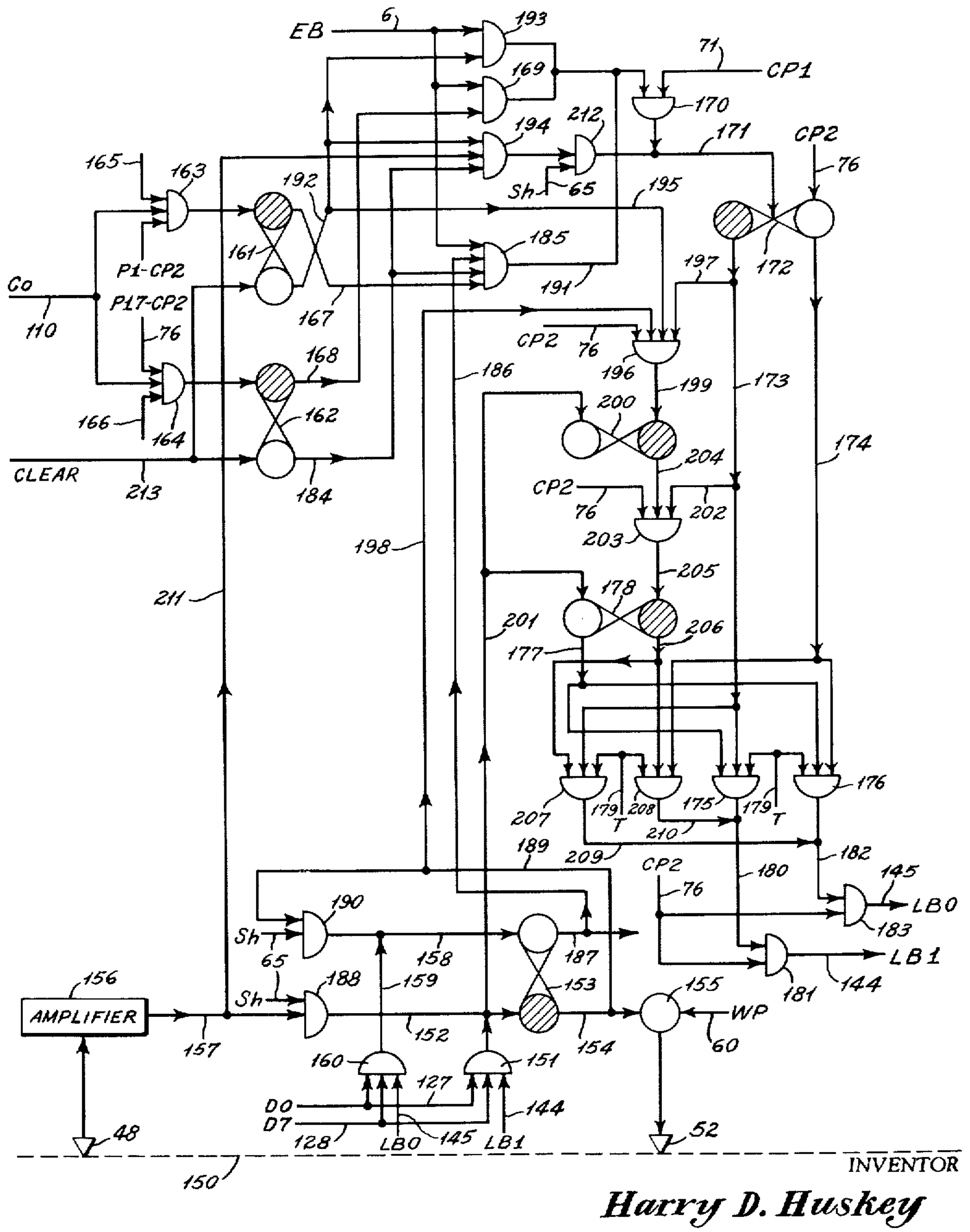
Fig. 21 is a circuit diagram showing the sign inspection part of a preferred form of apparatus according to the teaching of the present invention.

Referring to Fig. 21, which shows the circuitry of the sign inspection part 3 of the apparatus, dotted line 150 denotes a line, or track, on memory drum surface 46 which is two words long (50 magnetized discrete areas in 50 uniformly spaced apart digit positions). When the programmer is dealing with single length words (25 digits long) he will cause two sign control pulses to be entered or recorded in line 150 25 digit positions apart, namely, at the 25th and 50th digit positions. If he is dealing with double length words (50 digits long) he will cause only one sign control pulse to be recorded in the 50th digit position of line 150.

A sign control pulse is recorded in line 150 via gate 151 which is fed by leads 127, 128 and 144. Leads 127 and 128 are two of the eight destination output leads (see Fig. 19) also labelled D0 and D7 according to the index table given above. The programmer will provide the necessary command to select D0 and D7 leads 127 and 128 to be high when it is desired to record the proper sign control pulses in line 150. With leads 127 and 128 high, when a pulse appears on LB1 line 144 gate 151 passes the pulse to lead 152 which feeds it to flipflop 153, setting the flipflop. When flipflop 153 is set, flipflop output lead 154 is high and energizes pulse gate 155. The characteristics of the pulse gate are such that a write pulse fed into the gate on write pulse lead 60 is gated through to energize magnetic induction writing head 52. The latter thereupon magnetizes a discrete area in line, or track 150 as a yes bit of information thus recording a sign control pulse. The positioning of the yes magnetized discrete area in line 150 is such that when the magnetized area is sensed by the reading head 48, the resulting pulse fed through amplifier 156 will produce a pulse on lead 157 occurring, in time, properly in advance of the first digit position of a 25 digit length word being transferred and whose sign is to be inspected.

When a sign control pulse has been recorded as described, flipflop 153 is reset by a pulse appearing on lead 158. Lead 158 is high when gate output lead 159 is high and the latter is high when all three input leads 127, 128 and 145 to gate 160 are high. D0 and D7 leads 127 and 128 have remained high and LB0 lead 145 goes high immediately following the appearance of a pulse on LB1 lead 144. Gate output lead 159 therefore does go high hence resetting flipflop 153. Flipflop 153 remains reset, insofar as leads 127, 128 and 144 are concerned, until these three leads again become high at the same time to again record a sign control pulse. This could be, for example, in changing from handling double length words to handling single length words.

With memory line 150 thus, so to speak, properly conditioned, the sign inspection part 3 of the apparatus is ready to operate as regards sign inspection. What it does to the data transferred through it depends upon the states of flipflops 161 and 162 shown in Fig. 21. The various combinations of states which these flipflops may assume are given in the table of Fig. 22. The particular combination of states for a given transfer is determined by the command word digits in digit positions 1 and 17 of the command word which commanded the transfer to occur (see Fig. 17). As a particular command word is read, any P1 pulse derived from the sensing of the first magnetized discrete area of the 25 such areas representing the command word is fed on command bus 110 (see Fig. 18) to gate 163 and 164. Leads 165 and 166, which come from the control part of the apparatus described hereinafter, are both high at this time. Gate 163 may be thus energized to pass a P1–CP2 pulse fed into the gate on P1–CP2 lead 100 (see Fig. 15) immediately following the sensing of the very first magnetized discrete area of the 25 such areas representing the particular command word being read and prior to the sensing of the second such discrete area. In like manner a P17–CP2 pulse appearing on P17–CP2 lead 76 may be gated through by gate 164 immediately following the sensing of the 17th magnetized discrete area of the 25 such areas representing the command word being read. It will be recalled from the description above under the heading "Command" that the command word digits in digit positions 1 and 17 determine the characteristic of the command.

Assuming that a pulse appears on Co line 110 at both P1 and P17 pulse times then, as described above, flipflops 161 and 162 are both set. With both flipflops set, their output leads 167 and 168 are both high. Output lead 168 feeds into gate 169 which is also fed by Early Bus 6. Any pulses appearing on the Early Bus are therefore passed by gate 169 to energize gate 170.

Each time that gate 170 is thus energized, it gates through a CP1 clock pulse fed into the gate on CP1 clock pulse lead 71. The gated CP1 clock pulse feeds on lead 171 to flipflop 172 changing the state of this flipflop. Assuming that the flipflop is in the reset state, when it changes state as a result of a pulse fed into it on lead 171 as just described, flipflop output lead 173 will be high and flipflop output lead 174 will be low. If, however, no pulse appears on lead 171, in other words a CP1 clock pulse is not gated through by gate 170 for the particular digit position involved of the command word, then flipflop 172 does not change state. Assuming that flipflop is in reset state, this means that lead 173 remains low and lead 174 remains high for the particular digit position involved. To put it another way, the discrete area in the digit position involved is magnetized as a no bit of information (a 0).

If flipflop 172 is set by a CP1 clock pulse appearing on lead 171, the flipflop is reset substantially immediately by a CP2 clock pulse fed into the flipflop on CP2 clock pulse lead 76 as shown in Fig. 21. This CP2 clock pulse is the one which follows immediately the CP1 clock pulse for the particular clock pulse time coinciding with the sensing of a magnetized discrete area and during which four types of clock pulses are produced (see Figs. 13 and 14). Hence, the CP2 clock pulse which resets flipflop 172 occurs ahead of the next succeeding CP1 clock pulse which may be gated through gate 170.

Lead 173 is therefore high whenever a discrete area in a digit position of the word (number) being transferred is magnetized as a yes bit of information (a 1) and, conversely, lead 174 is high whenever a discrete area in a digit position of the word (number) being transferred is magnetized as a no bit of information (a 0). The information appearing on leads 173 and 174 thus corresponds exactly to the information derived by sensing the discrete areas located in the digit positions of the word (number) being transferred.

Lead 173 feeds to gate 175 while lead 174 feeds to gate 176. Both of these gates are also fed by output lead 177 of flipflop 178 and also by lead 179. When flipflop 178 is in reset state as shown in Fig. 21 output lead 177 is high. Lead 179 is a T(transfer) lead which comes from the control part of the apparatus and is high when data is being transferred through the sign inspection part of the apparatus as is described hereinafter. With leads 177 and 179 being high during transfer of data through the sign inspection part of the apparatus, it is apparent that gates 175 and 176 will pass pulses appearing on leads 173 and 174 each time that any such pulses do appear on these leads.

Thus, assuming that lead 173 goes high, then the output lead 180 of gate 175 goes high and feeds into gate 181. When gate 181 is energized it gates through a CP2 clock pulse fed into the gate on CP2 clock pulse lead 76 as shown in Fig. 21. The gated CP2 clock pulse appears on LB1 line 144 representing a yes bit of information (a 1) for the particular digit position involved of the word being transferred. Likewise, each time that a pulse appears on lead 174, the output lead 182 of gate 176 goes high and feeds into gate 183. When thus energized, the latter gate gates through a CP2 clock pulse fed into it on CP2 clock pulse lead 76 and the gated clock pulse appears as a pulse on LB0 line 145 representing a no bit of information (a 0) for the digit position involved of the word being transferred. For simple transfer therefore, where the yes, no pattern of the data being transferred is to be unchanged, flipflops 161 and 162 both have to be set, as is set forth in the table shown in Fig. 22.

If the command word being obeyed commands absolute value transfer to take place then, according to the table shown in Fig. 22, flipflop 161 is to be set and flipflop 162 is to be reset. This means that there will be a yes bit of information (a 1) in the first digit position of the command word and a no bit of information (a 0) in the seventeenth digit position of the command word. Consequently gate 163 is energized at P1 pulse time to pass a P1–CP2 clock pulse to set flipflop 161 as described above but gate 164 is not energized at P17 pulse time and hence flipflop 162 is not set. Flipflop output leads 167 and 184 are therefore high.

These flipflop leads both feed into gate 185 which is also fed by Early Bus 6 and by lead 186, the latter being connected to output lead 187 of flipflop 153. The two flipflop output leads 167 and 184 remain high during the sensing of all 25 discrete areas representing the word being transferred and, of course, the Early Bus 6 will be high during each pulse time in which a pulse results from the sensing of a discrete area representing the word being transferred magnetized as a yes bit of information (a 1). However, lead 186 is low during the sensing of the discrete area in the first digit position of the word being transferred, i.e. at P1 pulse time, and consequently even if a pulse does appear on Early Bus 6 at P1 pulse time, the pulse will not be passed by gate 185. This effectively deletes the first digit of the word so that, for example, if a negative number is being transferred the sign digit is deleted.

The reason that lead 186 is low during P1 pulse time is because flipflop 153 is set during this pulse time. It will be recalled that memory line 150 shown at the bottom of Fig. 21 contains a discrete area magnetized as a yes bit of information (a 1) and that the positioning of this discrete area is such that it is sensed and a pulse produced in the digit position immediately preceding the first digit position of the word being transferred. Lead 157 is therefore high immediately preceding the sensing of the first discrete area located in the first digit position of the word being transferred and this lead feeds into gate 188 which is also fed by shift clock pulse lead 65. When lead 157 is high, gate 188 passes a shift clock pulse occurring at the shift clock pulse time immediately preceding the sensing of the discrete area in the first digit position of the word being transferred.

The shift clock pulse therefore proceeds via lead 152 and sets flipflop 153 causing flipflop output lead 187 to be low during the P1 pulse time of the word being transferred. Since lead 187 is low, lead 186 is also low and thus blocks gate 185. During P1 pulse time, flipflop output lead 154 is high and hence lead 189 connected thereto is also high. Lead 189 feeds into gate 190 which is also fed by shift clock pulse lead 65. Therefore, gate 190 passes the shift clock pulse which immediately succeeds the shift clock pulse passed by gate 188. The shift clock pulse passed by gate 190 proceeds via lead 158 to flipflop 153 resetting the flipflop after the sensing of the discrete area in the first digit position of the word being transferred and prior to the sensing of the discrete area in the second digit position of such word.

Lead 186 therefore goes high and stays high during the sensing of the discrete areas in digit positions 2–25 of the word being transferred. Gate 185 therefore passes any pulses appearing on Early Bus 6 at pulse times P2–P25 and any such pulses proceed via lead 191 to gate 170. When gate 170 is energized it gates a CP1 clock pulse as described above and the remainder of the circuit involved operates as described above to transfer the word. The yes, no information therefore appears on LB1 and LB0 lines 144 and 145 respectively according to the pattern of such information in the word being transferred for digit positions 2–25 of the word. In every case, however, any yes bit of information in the first digit position of the word being transferred is deleted.

If the command word being obeyed has a characteristic which specifies addition then, referring to the table shown in Fig. 22, flipflop 161 is to be in reset state and flipflop 162 is to be in set state. This means that there is to be a pulse on *Co* bus 110 during P17 pulse time but not during P1 pulse time for the command word being obeyed. With flipflop 161 in reset state, output lead 192 of this flipflop is high. This output lead feeds to gates 193 and 194 and also has a lead 195 connected thereto which feeds to gate 196. With flipflop 162 in set state, flipflop output lead 168 is high and this lead feeds to gate 169.

Assuming that the word being transferred is positive, a positive number for example, then, as explained above, the first or sign digit of the word is a 0. This means that during P1 pulse time no pulse will appear on Early Bus 6 and hence no pulse is fed to flip-flop 172. This flip-flop therefore remains in reset state during this P1 pulse time with the result that, as described above, a pulse appears on LB0 line 145 representing that a no bit of information (a 0) is present in the first digit position of the word being transferred. The transfer then continues with any yes bits of information (1's) passing gates 193 and 169 both of which feed into gate 170 to energize this gate during any pulse time in which a pulse is fed to this gate. Transfer continues in the manner described above in connection with straight transfer so that pulses appear on LB1 line 144 and LB0 line 145 corresponding to the yes, no pattern of the word being transferred.

If, however, the word being transferred is negative, a negative number for example, it is modified (complemented) in the course of its transfer through the sign inspection part of the apparatus. If it is a negative word, the first or sign digit is a 1 represented by a discrete area in the first digit position magnetized as a yes bit of information. When this first discrete area is sensed a pulse is produced at P1 pulse time and proceeds via Early Bus 6 and through gates 169 and 193 to energize gate 170. A CP1 clock pulse is therefore gated through to set flipflop 172. Flipflop lead 173 goes high feeding via gate 175 and gate output lead 180 to gate 181 energizing the latter. A CP2 clock pulse is gated through by gate 181 and appears on LB1 line 144 as a pulse representing the sign digit. The sign digit is therefore preserved and proceeds to the word destination selected by the command being obeyed.

When flipflop lead 173 does go high, lead 197 connected thereto also goes high. Lead 197 feeds to gate 196 which is also fed by lead 195, lead 198, and CP2 clock pulse lead 76. As explained above in connection with the description of absolute value transfer, flipflop 153 (shown in the lower part of Fig. 21) is set during P1 pulse time of the word being transferred. Output lead 154 of this flipflop is therefore high during this time. Consequently lead 189 connected thereto and lead 198 connected to lead 189 are also high during this P1 pulse time. This means that leads 195, 197 and 198 are all high during P1 pulse time of the word being transferred and, consequently, gate 196 passes a CP2 clock pulse fed into the gate on CP2 clock pulse lead 76 during the CP2 clock pulse time immediately following the CP1 clock pulse time in which flipflop 172 is set.

Gate output lead 199 passes the CP2 clock pulse just referred to to flipflop 200 setting this flipflop. Flipflop 200 remains set during the next 24 pulse times of the word being transferred, being reset by a shift clock pulse passed by gate 188 and appearing on gate output lead 152 to which lead 201 is connected. However, as described above, the shift pulse which appears on gate output lead 152 does not appear until immediately prior to the sensing of the discrete area located in the first digit position of the next succeeding word to be transferred. Hence flipflop 200 is not reset until after the sensing of the discrete magnetized area in the 25th digit position of the word being transferred and prior to the sensing of the discrete area in the first digit position of the next word to be transferred.

Assuming that the next digit of the word being transferred is also a 1, i.e. the discrete area in the second digit position of the word is also a yes bit of information, then flipflop 172 is again set as described above causing flipflop output lead 173 to go high. Lead 202 is connected to lead 173 and hence this lead is also high. Lead 202 feeds into gate 203 which is also fed by output lead 204 of flipflop 200 and by CP2 clock pulse lead 76. Since flipflop 200 is set its output lead 204 is high and this means that a CP2 clock pulse is gated through gate 203 in the CP2 clock pulse time immediately following the particular CP1 clock pulse time during which flipflop 172 is set. The gated CP2 clock pulse proceeds via lead 205 to set flipflop 178. The latter remains set until reset by a shift clock pulse appearing on lead 201 as described above in connection with the resetting of flipflop 200.

When the flipflop 178 is set, its output lead 206 goes high and this output lead feeds to gates 207 and 208. These gates are also fed by a control line 179 which, as is described in greater detail hereinafter, is high during transfer of data. Finally, gate 207 is fed by lead 173 while gate 208 is fed by lead 174 these being output leads of flipflop 172. Therefore, whenever output lead 173 goes high, output lead 209 goes high and this connects to lead 182 which feeds to gate 183 to energize this gate. As explained above, gate 183 passes a CP2 clock pulse fed into it on CP2 clock pulse lead 76. However, it is important to note, that the signal or pulse coming from lead 173 causes a CP2 clock pulse to be gated through to LB0 line 145 instead of LB1 line 144. Correspondingly, any signal appearing on lead 174 is gated through gate 208 and proceeds via gate output lead 210 to lead 180 to energize gate 181. The latter, when energized, gates a CP2 clock pulse through to LB1 line 144 instead of LB0 145. This means that, in effect, 1's and 0's appearing in digit positions 3–25 of the word being transferred are interchanged. The number is therefore complemented and proceeds to its destination in complemented form. This type of complementation is therefore seen to involve passing the sign digit, then passing the next digit which is a 1, and thereafter interchanging all 1's and 0's.

In the example just described, it is assumed that there is a 1 in the second digit position of the word being transferred. If the first 1 following the sign digit occurs in a digit position higher than the second digit position of the word then the complementation does not start until the digit position following that in which the first 1 does occur. For example, if the first 1 following the sign digit occurs in digit position 6, then the complementation starts with digit position 7.

If the command word being obeyed commands that the number being transferred is to be subtracted from another word present in the apparatus, a number in the accumulator for example, then, referring to Fig. 22, flipflops 161 and 162 are both in reset state. This means that, when the command word being obeyed was read, no pulses appeared on *Co* bus 110 during P1 and P17 pulse times and hence neither flipflop 161 nor flipflop 162 was set. Therefore, with these flipflops being in their reset state as shown in Fig. 21, flipflop output leads 184 and 192 are both high.

These leads both feed into gate 194 which is also fed by a lead 211 connected to lead 157. From the description above, it will be recalled that lead 157 is high during a pulse time immediately preceding the first or P1 pulse time for the word being transferred. This results from the sensing of a discrete area in memory track 150, said sensing producing a pulse at the time mentioned which appears in amplified form on lead 157. Since all three output leads to gate 194 are high immediately preceding the arrival of any pulses on Early Bus 6 for the word being transferred, gate 212 is therefore energized in advance of the arrival of any such pulses. Being thus energized, gate 212 gates a shift clock pulse fed into it on shift clock pulse lead 65. This gated shift clock pulse proceeds via lead 171 to set flipflop 172 in advance of the arrival of any pulses on Early Bus 6.

It is evident therefore that when a subtract command is being obeyed, flipflop 172, in effect, has an initial state just the reverse of the state which it has when an add command is being obeyed. It will be recalled from the description given above concerning an add command that positive numbers are transferred through unchanged while negative numbers are complemented. Therefore, conversely, for a subtract command, positive numbers are complemented and negative numbers are transferred through unchanged. This simply follows the rule that the subtraction of a negative number is actually the addition of the corresponding positive number to another number.

Assuming that a positive number is being transferred in obedience to a subtract command, there is no pulse at P1 pulse time and hence no CP1 clock pulse is gated through to change the state of flipflop 172. Gate 196 is therefore effective to gate a CP2 clock pulse through at the CP2 clock pulse time immediately following the shift clock pulse time during which flipflop 172 changed state in advance of the arrival of any pulses on Early Bus 6. Flipflop 200 is therefore set by the gated CP2 clock pulse and then flipflop 178 may subsequently be set to substitute gates 207 and 208 for gates 175 and 176 to cause complementation to occur as has been described above in connection with the addition of a negative number.

If the number being transferred in obedience to a subtract command is a negative number then, of course, a pulse does appear on Early Bus 6 during P1 pulse time and a CP1 clock pulse is gated through to change the state of flipflop 172 so that output lead 173 is low at the CP2 clock pulse time immediately following the CP1 clock pulse time during which the state of flipflop 172 is changed. Gate 196 therefore does not pass a CP2 clock pulse and flipflops 200 and 178 remain in the reset states shown in Fig. 21 throughout the remainder of the time during which transfer of the negative number occurs. The negative number therefore transfers through unchanged except in sign.

Lead 213 is a lead coming from the control part of the apparatus which feeds to the indicated sides of flipflops 161 and 162. A pulse appearing on lead 213 will therefore reset these flipflops if either or both of them are set so that the flipflops will return to the state shown in Fig. 21. As is described more fully hereinafter, lead 213 is a so-called "clear" lead which, so to speak, clears the apparatus to a given initial state. This action is analogous to clear levers or buttons on mechanical calculators which return numeral wheels or the like so that 0's show in all of the window positions of the calculator.

The foregoing description shows that the sign inspection part 3 of the apparatus is capable of transferring data without change, transferring the data in absolute value form, or modifying (changing sign and/or complementing) the data when such modification is required as, for example, for the addition or subtraction of signed numbers. Any required modification is accomplished as the data transfers through the sign inspection part of the apparatus and follows inspection of the sign digit which is inspected first in the course of the transfer of the data.

In lieu of using memory line 150 and the circuitry associated therewith to produce a sign control pulse, a 26 digit position command word could be utilized with the first digit being the sign control digit. In other words, the single word length for such an alternative is a 26 digit length word instead of the 25 digit length word heretofore described. Any pulse derived from sensing a discrete area in the first digit position of the 26 digit positions of an assumed 26 digit length word would be fed to flipflop 153 to set this flipflop just as a pulse derived from sensing memory line 150 causes the flipflop to be set. Further description of how the first digit of a 26 digit length command word could be utilized for sign control purposes is deemed unnecessary since it is believed apparent to one skilled in the art.

SINGLE WORD LENGTH ACCUMULATOR

The single word length accumulator designated generally by block 9 in Fig. 1 may be described as a one word register with adding circuits on the input. An example of circuitry for such an accumulator is shown in Fig. 23. In this figure, dotted line 214 designates a line, or track, on the memory drum surface which is exactly one word (25 digit positions) in length. As mentioned, such a line may be called a one word register.

Recirculation of data from line 214 back into line 214 takes place substantially as has been described above in connection with recirculation of data in a typical 128 word memory line as shown in Fig. 20. Thus, referring back to Fig. 23, each time that magnetic induction reading head 48 senses a discrete area in line 214 magnetized as a yes bit of information, a pulse is produced which feeds to amplifier 215 and proceeds in amplified form on lead 216 to gate 217. CP1 clock pulse lead 71 also feeds into gate 217 so that each time that lead 216 is high, a CP1 clock pulse is gated through gate 217 and appears on lead 218 to which lead 219 is connected. Lead 219 passes the CP1 clock pulse to leads 220 and 221.

Lead 220 feeds into flipflop 222 and hence the state of this flipflop is changed by the CP1 clock pulse. If flipflop 222 is in the assumed reset state shown in Fig. 23 then when it changes state, its output lead 223 goes high energizing pulse gate 224. The latter gate remains high during the next write clock pulse time and hence a write clock pulse fed into the gate on write clock pulse lead 60 is gated through to energize writing head 52. The latter thereupon re-records the yes bit of information on memory line 214. Of course, if reading head 48 senses a discrete area magnetized as a no bit of information then no signal is fed to the amplifier at the time this particular discrete area is sensed and consequently no CP1 clock pulse is gated through to change the state of flipflop 222. Therefore writing head 52 is not energized and the no bit of information appears in its proper sequence in the memory line.

Lead 225 is connected to lead 223 and feeds into gate 226 which is also fed by lead 221 and by lead 187 which comes from the sign inspection part of the apparatus shown in Fig. 21. Lead 187 is an output lead of flipflop 153 shown in Fig. 21 which, as will be recalled from the description of the sign inspection part of the apparatus, is in a state during P1 pulse time of the word being transferred such that its output lead 187 is low. This lead therefore qualifies gate 226 so that this gate is not energized during P1 pulse time. Lead 187 is, however, high during pulse times P2–P25 so that gate 226 is energized when the other two leads feeding into it (leads 221 and 225) are both high. The significance of this is brought out more fully hereinafter.

Despite the fact that lead 187 is high during pulse times P2–P25 and that lead 221 may feed CP1 clock pulses into gate 226, the latter gate is not energized during simple recirculation of data because lead 225 is low when lead 221 has a CP1 clock pulse appearing on it. Conversely, when lead 225 goes high as a result of a change of state of flipflop 222, the very short duration CP1 clock pulse has disappeared and hence line 221 is low. Thus, the delay in having lead 225 go high results from the delay caused by the time taken by flipflop 222 to change state.

If it is desired to transfer data (a word) from memory line 214, gate 227 is used as a source gate. This is accomplished by specifying source 61 (S6, S1), see the index table above, which means that the two of the eight source designating lines 140 and 141 which are to be energized to make the selection are the S1 line 140 and S6 line 141. Lines 140 and 141 correspond, of course, to destination designating lines 127 and 128 shown in Fig. 19. With S1–140 and S6–141 lines energized, each time that a pulse appears on lead 216 it transfers through gate 227 to Early Bus 6. Of course, the pulse also recirculates as described above back to memory line 214.

Incoming data, a word which is to be added to a word already present in the accumulator for example, arrives on LB1 line 144 which feeds into gate 228. As shown in Fig. 23, gate 228 feeds to lead 219. It is to be recalled, however, that any pulse appearing on LB1 line 144 occurs at a CP2 clock pulse time. Therefore, since gate 217 passes CP1 clock pulses, the information fed to lead 219 from gate 228 reaches lead 219 a minute fraction of time following the information which passes gate 217, the difference in time for a given digit position involved being that between a CP1 clock pulse and the immediately following CP2 clock pulse as shown in Fig. 14.

The other two input leads to gate 228 are D1 lead 127 and D6 lead 128. This is the coding of the index table given above which specifies destination 61 (D6, D1) as the single word length accumulator. Therefore the two destination leads of the eight destination leads 127 and 128 shown in Fig. 19 which are energized to select this particular destination are D1 lead 127 and D6 lead 128.

Assuming that the word already present in the accumulator is a negative number and that the word arriving on LB1 line 144 is also a negative number, then, as will be recalled, both numbers have a yes bit of information (a 1) in the first digit position which is the sign digit position. This being true, a CP1 clock pulse is gated through gate 217 during the first or P1 pulse time involved and proceeds to flipflop 222 to change the state of this flipflop. However, a CP2 clock pulse follows substantially immediately from gate 228 and proceeds via lead 220 to change the state of flipflop 222 back to the assumed reset state shown in Fig. 23. Flipflop output lead 223 is therefore low in advance of the arrival of a write clock pulse on lead 60 and consequently pulse gate 224 is not energized at the time of arrival of the write clock pulse. Writing head 52 is therefore not energized and a no bit of information appears in the particular digit position involved (the first digit position). The CP2 clock pulse passed by gate 228 also proceeds via lead 221 to gate 226. However, as mentioned above, lead 187 feeding into this gate is low during the P1 pulse time involved and hence gate 226 is not energized.

Assuming that there is a yes bit of information (a 1) in the second digit position of both the word in the accumulator and the word transferring into the accumulator via LB1 line 144 then, as just described, flipflop 222 is changed in state twice, once by a CP1 clock pulse and next by a CP2 clock pulse and consequently a no bit of information appears in the memory line for the second digit position. However, lead 187 feeding to gate 226 is now high and lead 225 also feeding to this gate is high when the CP2 clock pulse feeds into the gate on lead 221. The CP2 clock pulse therefore proceeds via lead 229 to set flipflop 230. A yes bit of information (a carry) is thus entered into the adder circuitry shown in Fig. 23.

During the shift clock pulse time immediately following the CP2 clock pulse time which produced the carry, the carry is transferred from flipflop 230 to flipflop 222 by a shift clock pulse appearing on shift clock pulse lead 65. Lead 65 feeds into gate 231 which is also fed by flipflop output lead 232, the latter being high at the time of arrival of the shift pulse because flipflop 230 has been changed in state as described. The shift clock pulse therefore proceeds through gate 231 and via lead 233 to flipflop 222 to set the flipflop in advance of any pulse produced in the third digit position time (P3 pulse time). In addition to shifting the carry bit of information just mentioned, the shift clock pulse also feeds to flipflop 230 as shown in Fig. 23 to reset the flipflop. Therefore, with no carry bit of information already present in the adder portion of the circuitry shown in Fig. 23, the addition of a 1 and a 1, so to speak, produces a 0 in memory line 214 for the particular digit position involved and a carry (a 1) in the adder circuit.

With the carry in flipflop 222, output lead 223 is high. Therefore, if there is a no bit of information in the third digit position of the word in the accumulator and the word being transferred into the accumulator, no CP1 or CP2 clock pulse is passed by gates 217 and 228 during the third (P3) pulse time involved. Flipflop 222 remains unchanged in state until the next shift pulse appears on shift clock pulse lead 65 and is gated through to reset flipflop 222. However, a write clock pulse appears on lead 60 before the shift clock pulse which changes the state of flipflop 222 and, with lead 223 being high at this time, the write clock pulse is gated through to energize writing head 52 and cause a yes bit of information (a 1) to be entered into memory line 214 in the third digit position.

If, for the third digit position being considered, there is a yes bit of information (a 1) in either the word already present in the accumulator or in the word transferring into the accumulator, a no bit of information will be entered into the memory line in this third digit position. The reason for this is that flipflop 222 will be changed in state by either the CP1 clock pulse or the CP2 clock pulse gated through gates 217 and 228 respectively prior to the arrival of a write clock pulse on lead 60. Pulse gate 224 is therefore not energized when the write clock pulse does arrive. A new carry is however entered in the adder circuit because either the CP1 clock pulse or the CP2 clock pulse is gated through by gate 226 to set flipflop 230.

If there is a carry bit of information (a 1) already present in the adder circuit, i.e. flipflop 222 is set, and if there is a yes bit of information (a 1) in the particular digit position involved of both the word already present in the accumulator and the word being transferred into the accumulator then a yes bit of information (a 1) is recorded in the memory line 214 in the particular digit position involved and a new carry (a 1) is fed into the adder circuit. This is evident because lead 223 is high at the outset and, although it goes low when the CP1 clock pulse changes the state of flipflop 222, it goes high again when the CP2 clock pulse changes the state of the flipflop still again. Consequently, a write clock pulse is gated through pulse gate 224 to energize writing head 52 and cause a yes bit of information (a 1) to be recorded in the memory line for the digit position involved. With lead 223 high at the outset, lead 225 is high and the CP1 clock pulse fed into gate 226 via lead 221 thus proceeds via lead 229 to set flipflop 230 thus entering the carry bit of information into the adder. By the time the CP2 clock pulse arrives on lead 221, lead 225 has gone low and therefore this CP2 clock pulse does not get through to flipflop 230 to change the state of the flipflop back again. Consequently the carry bit of information remains in flipflop 230 until it is shifted along into flipflop 222 by the next succeeding shift clock pulse as described above.

From the foregoing description it is believed evident how the adder portion of the circuitry shown in Fig. 23 operates to combine properly a word already present in the one word register (memory line 214) with a word being transferred into the accumulator via LB1 line 144. The addition of a 1 and a 1 occurring in corresponding digit positions for the word present in the accumulator and the word being transferred into the accumulator is seen to produce a carry for all digit positions except the very first or sign digit position. Any carry from the first digit position to the second digit position is suppressed because lead 187 is low during P1 pulse time. However, a carry can occur from P2 to P3 pulse times, from P3 to P4 pulse times, etc. even including a carry from P25 pulse time to P1 pulse time of the next succeeding word time. Even if a carry does occur from P25 pulse time to P1 pulse time as mentioned there is still no carry from P1 pulse time to the next P2 pulse time. Therefore, even with end around carry, further carry from P1 pulse time to P2 pulse time is suppressed. The significance of this is brought out more fully hereinafter.

The operation of the circuitry shown in Fig. 23 is perhaps better understood by reference to a so-called "truth table" which is a term known to those skilled in the art. Such a truth table is shown in Fig. 24 where the 1's represent yes bits of information and the 0's represent no bits of information. Put another way, the 1's represent pulses for the particular digit positions involved whereas the 0's represent no pulses for the particular digit positions involved. Upon examining the truth table shown in Fig. 24, it is noted that there are five columns 234–348 having the respective headings Line 214, LB1–144, Carry, Write Head and New Carry.

Column 234 thus represents the information already present in the accumulator, i.e. already present in Line 214 when new data arrives via LB1–144. Column 235 thus represents the new data which does arrive via LB1–144 to be combined with the data already present in Line 214. Column 236 represents any carry present in the adder portion of the circuit immediately preceding the combining of bits of information in the next succeeding digit position of each word being combined, i.e. during the next pulse time. This really refers to the state of flipflop 222 which may be described as the carry-in flipflop.

The two columns at the right of Fig. 24 result from the combining of information present in the other three columns shown in Fig. 24. Thus, column 237 represents the sum obtained from combining columns 234 and 235. This sum is, of course, the word which is written into line 214 as a result of combining the word initially present in the line with another word arriving via LB1–144. Column 238 shows data which is entered into the adder part of the circuitry shown in Fig. 23 as a new carry. Thus, if the result of combining respective digits of the word already present in the accumulator and a new word arriving via LB1–144 produces a carry, such a carry proceeds into flipflop 230 prior to the next succeeding pulse time wherein the next respective digits of the two words are combined. Flipflop 230 can be referred to as the carry-out flipflop.

Examples of additions which may be accomplished according to the teaching of the present invention utilizing accumulator circuitry as shown in Fig. 23 are given as follows:

Addition Example 1

| | P25 | P24 | P5 | P4 | P3 | P2 | P1 | Dec. Equiv. |
|---|---|---|---|---|---|---|---|---|
| In Acc. | 0 | 0 | 0 | 1 | 0 | 1 | 0 | +5 |
| From LB1-144 | 0 | 0 | 0 | 0 | 1 | 1 | 0 | +3 |
| Ans. in Acc. | 0 | 0 | 1 | 0 | 0 | 0 | 0 | +8 |

Addition Example 2

| | P25 | P24 | P5 | P4 | P3 | P2 | P1 | Dec. Equiv. |
|---|---|---|---|---|---|---|---|---|
| In Acc. | 1 | 1 | 1 | 0 | 0 | 1 | 1 | −7 |
| From LB1-144 | 0 | 0 | 1 | 0 | 1 | 0 | 0 | +10 |
| Ans. in Acc. | 0 | 0 | 0 | 0 | 1 | 1 | 0 | +3 |

Addition Example 3

| | P25 | P24 | P5 | P4 | P3 | P2 | P1 | Dec. Equiv. |
|---|---|---|---|---|---|---|---|---|
| In Acc. | 1 | 1 | 1 | 0 | 0 | 1 | 1 | −7 |
| From LB1-144 | 0 | 0 | 0 | 0 | 1 | 1 | 0 | +3 |
| Ans. in Acc. | 1 | 1 | 1 | 1 | 0 | 0 | 1 | −4 |

Addition Example 4

| | P25 | P24 | P6 | P5 | P4 | P3 | P2 | P1 | Dec. Equiv. |
|---|---|---|---|---|---|---|---|---|---|
| In Acc. | 1 | 1 | 1 | 1 | 0 | 0 | 1 | 1 | −7 |
| From LB1-144 | 1 | 1 | 1 | 1 | 1 | 0 | 0 | 1 | −4 |
| Ans. in Acc. | 1 | 1 | 1 | 0 | 1 | 0 | 1 | 1 | −11 |

Example 1 above is an example wherein the word already present in the accumulator (line 214) is assumed to be a positive number (+5) and the word arriving via LB1 line 144 is also assumed to be a positive number (+3). Since both numbers are positive, no pulse is fed to magnetic induction writing head 52 during the P1 pulse time for each word, as explained above, and consequently a no bit of information is recorded as the sum in this particular digit position of the word representing the total of the two numbers being combined. Therefore, a zero (0) appears under the heading P1 for the first digit position of the sum word denoting a positive sum.

The two numbers proceed through the adder portion of the circuitry shown in Fig. 23 being combined, respective digit with respective digit. It is noted that the combining of the two yes bits of information (1's) during P2 pulse time of each word produces a carry. The addition of the carry continues on through P3 and P4 pulse times until finally the carry produces a yes bit of information (a 1) at P5 pulse time. The answer is therefore a plus 8 since, of course, insofar as the number is concerned, the digit appearing under the P2 heading is the least significant digit of the number. Two positive numbers may thus be added and, if large enough, may produce a carry that goes into P25 position without causing any trouble. However, if the numbers being added are too large there will be a carry beyond the P25 digit position which may show up in the P1 position and the answer will appear to be negative when in reality the capacity of the accumulator was exceeded.

Example 2 above is one wherein one operand is positive, the other is negative, and the answer is positive. Since the adder portion of the circuitry shown in Fig. 23 treats the information fed into it in a symmetric fashion, it does not matter whether the negative number is in the accumulator memory line 214 or whether it is coming from LB1 line 144. In either case, the information has previously passed through the sign inspection part of the apparatus shown in Fig. 21 so that any negative number present in the accumulator memory line 214 or arriving via LB1 line 144 is in complementary form with the digit in the first digit position (under the heading P1) representing the sign of the number.

Example 2 above shows the addition of a −7 and a +10. The −7 appears in complementary form with a 1 present in the first digit position (under the heading P1) designating that it is a negative number. The complementation is effected by keeping the next succeeding 1 (under the heading P2) and thereafter interchanging 1's and 0's throughout the remaining 25 digit positions of the single length word. Since, in the binary number system, a 7 is denoted by 111, then keeping the first 1 (the 1 on the right) means that two 0's and from then on all 1's form the complement as is shown in Example 2 above.

On the first addition, i.e. the addition occurring during the first word time, the sign digit in the first digit position (under the heading P1) is recorded in the single word length memory line 214. However, as will be evident to those skilled in the art, the summing of the number initially present in memory line 214 and the number arriving via LB1 line 144 causes a carry to occur beyond the 25th digit position (beyond P25 pulse time). In the very first digit position of the next succeeding word time, this carry is combined with the sign digit (1) initially recorded in memory line 214, as a result of the summing of the information present in the first digit positions of the respective words being combined, to produce a 0 as the sign digit. This gives the correct positive sign digit for the answer and, as mentioned above, because line 187 which leads to gate 226 is low during P1 pulse time, any carry from the first digit position to the second digit position is suppressed. Hence, there is no carry from P1 to P2. The answer or sum in accumulator memory line 214 (the one word register) therefore remains as a +3.

Example 3 above shows the addition of operands of different signs which produces a negative answer. In this example, a −7 and a +3 are combined to give a −4 as the answer. The −7 appears in the accumulator memory line 214 in complementary form. Hence, on the very first addition which occurs during P1 pulse time, the sign digit (a 1) is recorded in line 214 denoting a negative answer. The addition then proceeds during the first word time but no carry is produced beyond the 25th digit position and therefore the 1 remains as the sign digit of the answer. Of course, since the answer is a negative number it is present in the single word length accumulator memory line 214 in complementary form.

Example 4 above shows the addition of two negative numbers. In this example, a −7 and a −4 are added to give a −11 as the answer. All numbers are in complementary form as explained above. On the very first addition, i.e. the addition of the yes bits of information (1's) appearing in the first digit position of each word being combined, a no bit of information (a 0) appears in the first digit position of the answer. However, the continued summing of bits of information present in corresponding digit positions of the words being combined finally produces a carry beyond the 25th digit position. The carry (a 1) is added to the 0 in the sign digit position during the very next succeeding word time and hence the number (sum) appears in line 214 (the one word register) as shown in Example 4 above. It is evident that the sum is a negative number (having a sign digit of 1) and since it is a negative number it appears in complementary form.

In all of the foregoing examples it is noted that a so-called end around carry is provided to arrive at the correct sign digit for the answer (sum). Furthermore, the end around carry doees not affect the actual numerical value of the answer because any carry which may result in arriving at the correct sign digit (any carry from P1 pulse time to P2 pulse time) is suppressed.

CONTROL OF WHEN TRANSFER OCCURS

Referring to the command word make-up shown in Fig. 17, it is noted that the bits of information in digit positions 10–16 determine the time of the next command (T*n*) which is to be obeyed and the bits of information in digit positions 18–24 determine the time of transfer (T), or the termination of transfer for immediate commands, for the particular transfer called for by the command word being read. The circuit shown in Fig. 25 translates, so to speak, the particular command word being read and effects the necessary control so that transfer does occur at the time commanded and the next command is read at the time commanded.

Figure 25:
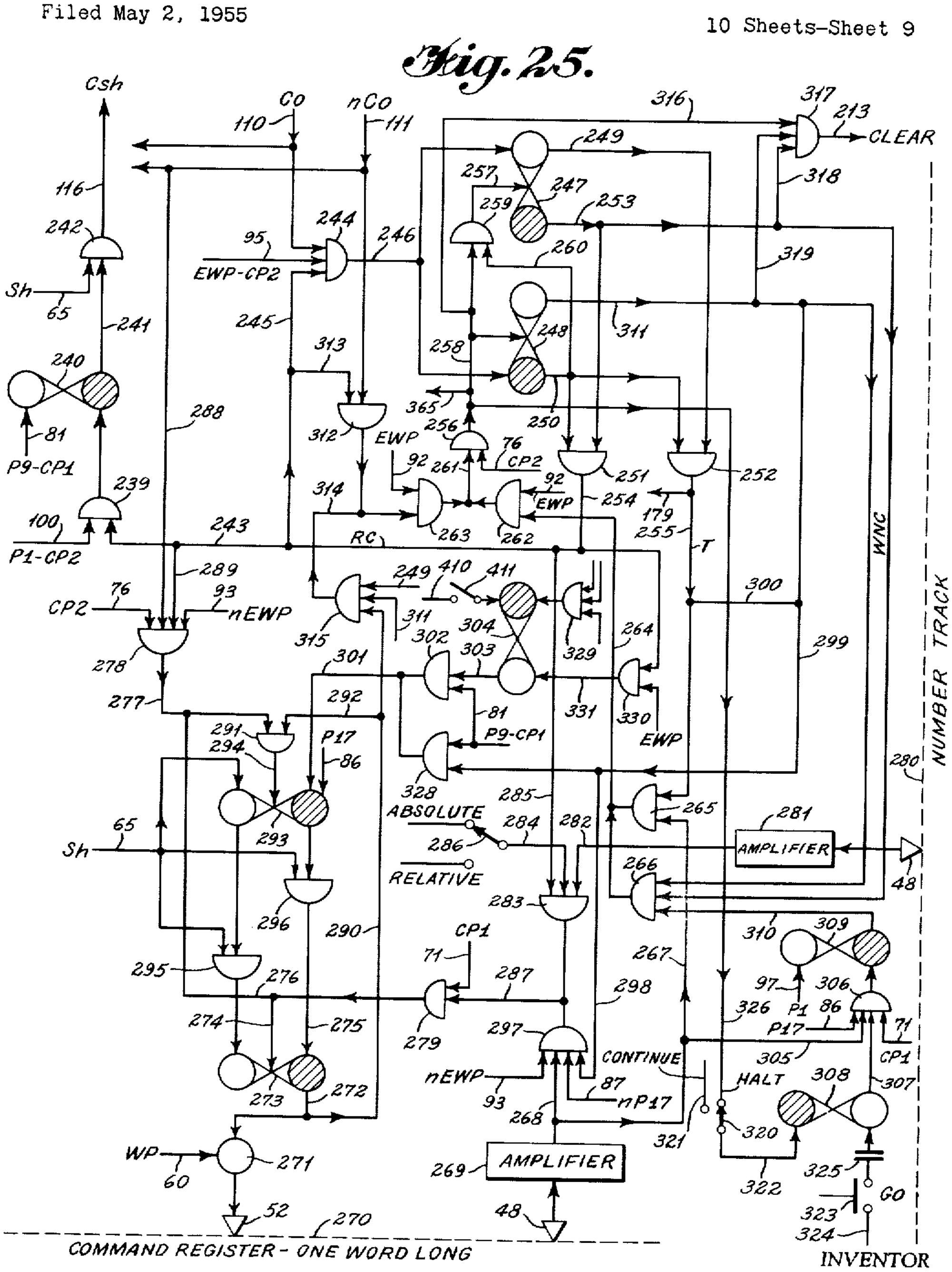
Fig. 25 is a circuit diagram showing the control part of a preferred form of apparatus according to the teaching of the present invention.

As a particular command word is read, the information derived from the reading is fed into the circuit shown in Fig. 25 on command busses 110 and 111. It is apparent that these busses, being output leads from different sides of the same flipflop, reproduce the command word information and the 1's complement of the command word information, the latter appearing on bus 111. Since the command word information arrives on these busses starting with the very first digit position of the particular command word being read, the command word information in digit positions 1–9 enters the control circuitry shown in Fig. 25 in advance of any command word information concerning when transfer shall occur. The reason for this, of course, is so that the proper source and destination gates will be selected by the circuitry shown in Fig. 19.

Following the sensing of the information in the first digit position of the command word being read, and preceding the sensing of the information in the second digit position of said word, a P1–CP2 pulse is gated through by gate 239 to set flipflop 240 and cause flipflop output lead 241 to go high immediately in advance of the sensing of information in the second digit position of the command word being read. When lead 241 is high it energizes gate 242 which gates through shift clock pulses fed into the gate on shift clock pulse lead 65. These shift clock pulses thus appear on line 116 (the C*sh* line) which furnishes shift pulses to the source and destination switching circuitry shown in Fig. 19. The control circuitry of Fig. 25 thus effects control over the circuitry shown in Fig. 19.

Lead 241 remains high until flipflop 240 is reset by a P9–CP1 pulse fed into the flipflop on lead 81. When this occurs lead 241 goes low and no more shift clock pulses are fed in on line 116 to the source and destination switching circuitry shown in Fig. 19. However, by this time, this particular circuitry has selected the proper source and destination gates since eight digit positions of the command word (digit positions 2–9) have been sensed. The P1–CP2 and P9–CP1 pulses come from the word pulse track 78 shown in Fig. 15. Gate 239 is energized by lead 243 whenever a command word is being read. Lead 243, which is high whenever a command word is being read as will be evident from the description given hereinafter, may be called the read command (RC) lead.

It will be recalled from the description of the command word make-up that if there is a yes bit of information (a 1) in the 25th digit position of the command word then the command is a so-called immediate command whereas with a no bit of information (a 0) in the 25th digit position, the command word is a so-called deferred command. Assuming that the command is an immediate command, the pulse derived from sensing the yes bit of information in the 25th digit position of the command word energizes gate 244. This gate is also qualified by lead 245 but this lead is high since it has been stated that the read command lead 243 is high and lead 245 is connected to lead 243 as shown in Fig. 25. When gate 244 is thus energized, it gates through an EWP–CP2 pulse derived from the word pulse track shown in Fig. 15 and fed into gate 244 on lead 95. The gated pulse travels via lead 246 to the indicated sides of flipflops 247 and 248.

Flipflops 247 and 248 are important flipflops in the circuitry of Fig. 25. These two flipflops have four combinations of states which determine whether the control circuitry is involved in reading a command, has read a command and is waiting for the commanded transfer to start, is causing a transfer to take place, or is waiting for the next command to be read. The four combinations of states for these various conditions are shown in the table of Fig. 26.

In the example being described which involves an immediate command, the wait transfer state is skipped which means that the flipflops 247 and 248 go from an assumed set state for both flipflops to a state wherein flipflop 247 is reset but flipflop 248 remains set. Thus, the EWP–CP2 pulse which proceeds via lead 246 resets flipflop 247 causing its output lead 249 to go high. Output lead 250 of flipflop 248 remains high. The two flipflops have therefore switched the control circuitry, so to speak, from the read command state directly to the transfer state.

It is noted that flipflop output lead 250 feeds into coincidence gates 251 and 252. Gate 251 is also fed by flipflop output lead 253 while gate 252 is also fed by flipflop output lead 249. Referring to the table shown in Fig. 26, leads 250 and 253 are both high when flipflops 247 and 248 are in the read command state. Gate 251 is therefore energized to cause its output lead 254 to be high. This lead connects to the read command (RC) lead 243 which has been described above as being high when a command word is actually being read. When flipflops 247 and 248 go to the transfer state, lead 249 goes high instead of lead 253 and gate 252 is therefore energized. The output lead 255 of this gate is the so-called transfer (T) lead which qualifies the sign inspection circuitry shown in Fig. 21 to permit the transfer to start when lead 255 says it should start. In the example being considered, an immediate command, the transfer is to start with the bit of information in the very first digit position of the word immediately succeeding the command word. Therefore lead 255 goes high immediately following the sensing of the bit of information in the 25th digit position of the command word being read.

With the transfer lead 255 high, transfer will continue until the line goes low again. In the case of an immediate command, the transfer can continue through the very next succeeding word time following the word time in which the command word is read or it can continue for any fraction of a whole memory cycle of 128 word times. Transfer terminates when flipflops 247 and 248 reverse state so that they go into the wait next command state shown in the table of Fig. 26.

Flipflops 247 and 248 are both changed to the wait next command state by a CP2 clock pulse which is gated through by gate 256 and appears on leads 257 and 258 which lead to the respective flipflops as shown in Fig. 25. Lead 257 proceeds from gate 259 but this gate is energized to pass the CP2 clock pulse since lead 260 feeds into it and is connected to flip-flop output lead 250 which is high when flipflop 248 is in the transfer state. Gate 256 is qualified by an input lead 261 which is energized by either gate 262 or gate 263. Therefore, when one or the other of these gates passes an end of the word pulse (EWP) fed into it on EWP lead 92, obtained from the word pulse track (see Fig. 15), the EWP pulse keeps gate 256 energized sufficiently long to pass a CP2 clock pulse immediately following the sensing of the bit of information in the 25th digit position of a word being transferred and prior to the sensing of the bit of information which is in the first digit position of the immediately succeeding word in word time relation.

It is noted that coincidence gate 262 has an input lead 264 which must be high in order for gate 262 to pass an end of the word (EWP) pulse. Lead 264 is high if either gate 265 or gate 266 is energized. Considering gate 265, it is noted that this gate is fed by transfer lead 255 which, of course, is high at this time. The only other lead feeding into gate 265 is lead 267 which is connected to output lead 268 of amplifier 269. Amplifier 269 is fed by magnetic induction reading head 48 and it is apparent therefore that when this reading head produces a pulse, the amplified pulse travels via lead 267, gate 265, and lead 264 to gate 262. If the pulse is present when an end of the word pulse is fed into gate 262 on lead 92, then gate 262 is energized to, in turn, energize gate 256 which gates through a CP2 clock pulse to change the state of flipflops 247 and 248 from the transfer state to the wait next command state.

Whether or not magnetic induction reading head 48 does produce a pulse at the indicated time so that the change in state of flipflops 247 and 248 occurs as described depends upon information present in a line or track 270 on the magnetic drum surface. Line 270 is a memory line which is exactly one word (25 digit positions) long. Such a line may be described as the command register since it contains information which determines when, for a particular command word involved, the control circuitry changes states, i.e. goes from the transfer state to the wait next command state, for example.

Information is written into memory line 270 (the command register) by magnetic induction writing head 52 which is energized by write pulses (WP pulses) fed into pulse gate 271 on WP input lead 60 and gated through by this pulse gate when the pulse gate is energized. Pulse gate 271 is energized whenever the output lead 272 of flipflop 273 is high. If flipflop 273 is assumed to be in the reset state shown in Fig. 25, then its output lead 272 is high only when flipflop 273 is set as by a pulse fed into it on either lead 274 or lead 275. Lead 274 is connected to another lead 276 which, in turn, is connected to output lead 277 of gate 278. Lead 276 is also the output lead of gate 279. A CP2 clock pulse lead 76 feeds into gate 278 while a CP1 clock pulse lead 71 feeds into gate 279. It is apparent therefore that lead 274 which goes into flipflop 273 as shown in Fig. 25 is capable of transmitting both CP1 and CP2 clock pulses to change the state of the flipflop and thus cause information to be written into the command register, memory line 270.

It will be recalled that the information contained in digit positions 18–24 of the command word being read determines when a one word deferred transfer occurs and for how long a period of time an immediate transfer occurs. In order to facilitate programming, i.e. making up instructions (commands) which the apparatus is to obey, it is desirable to know the location of the command word in terms of its numerical position in one of the long memory lines, for example, and it is also obviously desirable to know the word position, or positions, of the word or words being transferred in obedience to the command word being read. In other words, with an assumed memory line capacity of 128 25 digit length words, the word positions can be designated as 0 through 127. Therefore, for every one of the assumed 7 long memory lines, the individual word positions can be designated by corresponding numbers.

When the command being read locates the word to be transferred in terms of its numerical word position in one of the memory lines and likewise locates the next command to be read in terms of its numerical position in one of the memory lines, this may be described as operating in the absolute address mode. This is in contrast to operation in the relative address mode where the numerical position of a word is unknown insofar as its location in a memory line is concerned. In the relative address mode of operation, all that is known is that transfer occurs a certain number of word times, for example, displaced from the word time during which the command word was read, assuming a deferred command, or in the case of an immediate command transfer occurs during one or more word times following the word time during which the command was read. Since the numerical word position of the command word is unknown then obviously the numerical word position of the transferred information is likewise unknown. Operation in the relative address mode tends to make programming more difficult and is preferably to be avoided.

In operating according to the absolute address mode according to the teaching of the present invention, information derived from sensing discrete areas located in digit positions 18–24 of the command word being read is combined with information which represents a correction factor, as it may be called. The correction information is recorded in a long line on the memory drum surface in advance of operation of the apparatus. This permanently recorded long line, which can supply a correction number for each of the 128 words in a long memory line, may be called the number track and is designated by dotted line 280 appearing at the right of Fig. 25.

As the magnetic drum rotates, the number track is sensed by magnetic induction reading head 48 which feeds its output to amplifier 281 having an output lead 282 which feeds into gate 283. This gate is also fed by leads 284 and 285, the latter being connected to the read command lead 243 which is high when a command word is being read. Lead 284 is connected to switch 286 which is shown as being in a position for operation according to the absolute address mode wherein line 284 is energized from a suitable source, not shown, so that this lead is high. With all three of its input leads thus high, gate 283 is energized whenever any pulses appear on amplifier output lead 282. Each time that a yes bit of information is sensed in the number track 280, a pulse does appeal on lead 282 and passes through gate 283 to appear on lead 287, energizing gate 279. The latter, when energized, gates a CP1 clock pulse through which goes to flipflop 273 changing the state of the flipflop. Therefore, during the particular word time in which the command is being read, a correction number is also read from the number track and fed to flipflop 273.

As the command word is being read, and considering for the moment only the information in digit positions 18–24 of the command word, the 1's complement of this information appears on lead 288 which feeds into gate 278. This gate is also fed by lead 289 which is connected to the read command lead 243 and of course this lead is high since the command is being read. Finally, gate 278 is also qualified by a not end of the word pulse (*n*EWP) lead 93 which is high during the sensing of the discrete areas in the first 24 digit positions of the command word but is low during the sensing of the discrete area in the 25th digit position of the command word (see Fig. 15). It is apparent therefore that with leads 93 and 289 remaining high during the sensing of the discrete areas of the command word in digit positions 18–24, a CP2 clock pulse will be gated through whenever lead 288 is high. Since this is the 1's complement lead it means that the CP2 clock pulses will be gated through and fed into flipflop 273 via leads 277 and 274 to enter the complement with respect to 127 of whatever number has been entered in digit positions 18–24 of the command word.

The complement referred to and the correction number derived from the number track 280 thus go into flipflop 273 as CP1 and CP2 clock pulses. If there is a CP1 clock pulse and then immediately following it a CP2 clock pulse, flipflop 273 changes state twice so that output lead 272 is low and consequently magnetic induction writing head 52 is not energized to record a yes bit of information in the command register 270 for the particular digit position involved. However, the CP1 clock pulse did cause lead 272 to become high for a minute fraction of time and when it was high, lead 290 was high, this lead feeding into gate 291 via lead 292. Gate 291 is thus energized at the time the immediately succeeding CP2 clock pulse arrives via lead 277 and consequently the CP2 clock pulse not only proceeds to flipflop 273 but also proceeds to flipflop 293 via lead 294. This is simply entering a carry from flipflop 273 into flipflop 293 and it is apparent that these two flipflops constitute a two stage binary adder which operates in the manner described above in connection with the single word length accumulator described in connection with Fig. 23. Thus, as each carry is fed into flipflop 293 it is shifted along to flipflop 273 by the very next succeeding shift clock pulse appearing on shift clock pulse lead 65 which feeds into gates 295 and 296. Further description of the adder portion of the circuitry shown in Fig. 25 is deemed unnecessary in view of the description given above with reference to Fig. 23.

In addition to the CP1 and CP2 clock pulses fed into the adder portion of the circuitry shown in Fig. 25, a P17 pulse (derived from the word pulse track, see Fig. 15) is also fed to the indicated side of flipflop 293 during each word time including the word time during which the particular command involved is being read. This adds a 1 into the adder circuitry during each word time. Therefore, in summary, during the reading of a command word and considering for the moment only the reading of the discrete areas in digit positions 18–24 of the command word, three numbers are fed into the adder portion of the circuitry shown in Fig. 25. One of these numbers is the 1's complement of the number appearing in digit positions 18–24 of the command word, the second number is obtained from the number track 280, and the third number is a 1 resulting from the feeding of a pulse to the adder during the sensing of the discrete area in the 17th digit position of the command word, the effect of this being to add a 1 into the adder during the sensing of the discrete area in the 18th digit position of the command word. Therefore, upon completion of the reading of the command word, the total of these three numbers is recorded in the discrete areas in digit positions 18–24 of the single word in command register 270.

During the sensing of the discrete area in the first digit position of the very next succeeding word in word time relation, the information in the command register begins to recirculate proceeding via reading head 48, amplifier 269, lead 268, and gate 297 to energize gate 279 each time that a yes bit of information is sensed from the command register. When the pulse gate is energized it of course gates through a CP1 clock pulse which changes the state of flipflop 273 to energize pulse gate 271 which gates through a write clock pulse, this in turn energizing writing head 52 to re-record the yes bit of information in its proper digit position in the command register. Gate 297 is qualified by lead 298 which is connected to lead 299. The latter lead is connected to the transfer lead (T) 255 by lead 300. In the case of an immediate command flipflops 247 and 248 change directly from the read command state to the transfer state and hence lead 255 goes high immediately following the sensing of the discrete area in the 25th digit position of the command word being obeyed. Hence leads 300, 299 and 298 are high to permit recirculation.

The other two leads feeding into gate 297 are *n*EWP lead 93 and *n*P17 lead 87 (see Fig 15). Leads 87 and 93 are high during the sensing of discrete areas in all digit positions of the word in the command register except digit positions 17 and 25. The reason that these leads are low during the sensing of the discrete areas in these digit positions is to prevent the recirculation of any carry which may appear in these digit positions, the manner in which a carry occurs being more evident from the following description. Recirculation can occur, however, during the sensing of information in all other digit positions except the two mentioned. Each time that the word recorded in the command register does recirculate another 1 is added to the number appearing in digit positions 18–24 because of the feeding of a P17 pulse into the adder each word time. It is apparent therefore that the number of word times may be counted.

The following example, which of course is simply but an example, illustrates how the control circuitry of Fig. 25 controls the duration of transfer in the case of an immediate command:

*Transfer Example 1—Immediate command*

| End of Word Time | State | In the Command Register 270 | |
|---|---|---|---|
| | | P10–P17 | P18–P25 |
| 10 | RC | 115 | 119 |
| 11 | T | 116 | 120 |
| | T | ------ | ------ |
| 19 | T | 124 | 128 |
| 20 | T | 125 | 1 |
| 21 | WNC | 126 | ------ |
| 22 | WNC | 127 | ------ |
| 23 | WNC | 128 | ------ |
| 24 | WNC | 1 | ------ |
| 25 | RC | 2 | ------ |

The example given above is one wherein the command is read during word time 10 and transfer is to start with word time 11 and continue through to the end of word time 20. During word time 10, flipflops 247 and 248 are in read command state since the command is actually being read during this word time. The programmer will have entered the number 20 in digit positions 18–24 of the command word and as the command word is read the 1's complement of this number is fed into the adder via gate 278. With seven digit positions available for the number, the maximum number which can appear in these positions is 127 and the 1's complement of 20 is therefore 107. A P17 pulse is also fed into the adder which adds a 1 to the 107 making it 108. A correction number, which is one digit larger than the word time during which the command is read, comes from the number track. Since the command is being read during word time 10, the correction number is an 11. The total thus appearing in digit positions 18–24 of the command register is 119.

During the next 9 word times, a P17 pulse is added in during each word time raising the number which appears in the command register in digit positions 18–24 until finally, at the end of word time 19, the total 128 has been reached which means that a yes bit of information appears in the 25th digit position of the word in the command register. This is simply a carry which results from the addition of a P17 pulse during word time 18. Since the yes bit of information in the 25th digit position appears at the end of word time 19, it is not sensed by reading head 48 until the end of word time 20 inasmuch as it takes one word time for a digit in a particular digit position of the word in the command register to pass from the writing head to the reading head. However, when the yes bit of information in the 25th digit position of the word in the command register does reach reading head 48 at the end of word time 20, the resulting pulse passes via amplifier 269, lead 267, gate 265, and lead 264, to gate 262. An EWP pulse is therefore gated through to energize gate 256 which, in turn, gates through a CP2 clock pulse to change flipflops 247 and 248 from transfer state to wait next command state.

Referring back to the makeup of the command word, it is recalled that the information in digit positions 10–16 of the command word determines the word time during which the next succeeding command is read. Therefore, the programmer enters the number of the word time for the next command in these digit positions of the command word and, just as for the transfer timing number, the 1's complement of this next command number proceeds into the adder as the particular command being read is read. Similarly, a correction number proceeds into the adder, this correction number being obtained by sensing information in digit positions 10–16 of a word in the number track 280 corresponding in word position to the word position of the command being read. Also, a third number (a 1) is fed into the adder during the reading of the command word, this 1 resulting from a P9–CP1 pulse which is fed to flipflop 293 via lead 301. Lead 301 is an output lead of gate 302 which is fed by output lead 303 of flipflop 304 and by P9–CP1 lead 81 (see Fig. 15). Flipflop 304 is assumed to be in a state such that lead 303 is high at this time. Therefore, during the sensing of the information appearing in digit position 9 of the command word, a P9–CP1 pulse is fed to flipflop 293 and the result of this is, in effect, that a 1 is added into the adder during the sensing of the information in the 10th digit position of the command word. The three numbers thus mentioned are combined in the adder and their sum recorded in digit positions 10–16 of the word in the command register.

Referring to the transfer example set forth above, it is assumed that the command is read during word time 10 and that the next command is to be read during word time 25. At the end of word time 10 the number 115 appears in digit positions 10–16 of the word in the command register. This number is obtained by combining 102, 12, and 1. The 102 is the 1's complement of 25, i.e. 127 minus 25 since the next command is to be read during word time 25. The 12 is the correction number obtained from number track 280 and, of course, the 1 is the 1 added in as a result of feeding the P9–CP1 pulse to the adder.

At the end of word time 23 a yes bit of information appears in the 17th digit position of the word in the command register. Since the command register is one word long it takes another word time for this yes bit of information to be sensed by reading head 48 and the circuitry accordingly remains in the wait next command state until the end of word time 24. However, during the sensing of the yes bit of information in the 17th digit position, the resulting pulse proceeds via amplifier 269 and lead 267 to lead 305 which feeds into gate 306. This gate is qualified by output lead 307 of flipflop 308 which flipflop is assumed to be in a state such that lead 307 is high. Gate 306 is also qualified by P17 lead 86 but of course this lead is also high during the sensing of a digit in the 17th digit position. The gate therefore gates through a CP1 clock pulse fed into it on CP1 clock pulse lead 71 to set flipflop 309.

When flipflop 309 is set, its output lead 310 goes high and this lead feeds into gate 266. This gate is also fed by leads 253 and 311, these being output leads of flipflops 247 and 248, respectively. At this particular time, flipflops 247 and 248 are in wait next command state and consequently both leads 253 and 311 are high. Gate 266 is therefore energized causing lead 264 to go high and remain high during the sensing of the remaining information in digit positions 18–25 of the word in the command register 270. During the sensing of the bit of information in digit position 25 of the word in the command register, an end of the word (EWP) pulse is fed to gate 262 via EWP lead 92 and proceeds via lead 261 to energize gate 256. The latter thereupon gates through a CP2 clock pulse which proceeds via lead 258 to set flipflop 248. Because flipflop 248 was in reset state during wait next command state for the two flipflops 247 and 248, lead 260 was low. Consequently, the CP2 clock pulse does not pass gate 259. Flipflop 247 remains set and it is observed from the table shown in Fig. 26 that with both flipflops 247 and 248 set, the control circuitry is in read command state. Accordingly, beginning with the sensing of the bit of information in the first digit position of the next succeeding word, a new command word is read. This new command word is read during word time 25.

If, in the example just described, the command being read is a deferred command instead of an immediate command, the control circuitry goes to wait transfer state beginning with word time 11 and remains in wait transfer state through to the end of word time 19. This is illustrated by the following example which, like the preceding example, assumes that the command being obeyed is read during word time 10. However, in the following example, the command is a deferred command calling for transfer of a single word to occur during word time 20. As before, the next command is to be read during word time 25. The example is as follows:

*Transfer Example 2—Deferred command*

| End of Word Time | State | In the Command Register 270 | |
|---|---|---|---|
| | | P10–P17 | P18–P25 |
| 10 | RC | 115 | 119 |
| 11 | WT | 116 | 120 |
| | WT | | |
| 19 | WT | 124 | 128 |
| 20 | T | 125 | 1 |
| 21 | WNC | 126 | |
| 22 | WNC | 127 | |
| 23 | WNC | 128 | |
| 24 | WNC | 1 | |
| 25 | RC | 2 | |

Upon examining the example given immediately above, it is noted that it is identical to transfer Example 1 excepting that the control circuitry is in wait transfer state during word times 11–19. The reason for this is that in the case of a deferred command a no bit of information (a 0) appears in the 25th digit position of the command word. Consequently, during the sensing of the discrete area located in the 25th digit position of the command word being read, no pulse appears on *Co* bus 110 but a pulse does appear on *nCo* bus 111 since this bus is the 1's complement line with respect to bus 110. Bus 111 feeds into gate 312 which is also fed by lead 313, the latter being connected to lead 245 which is, in turn, connected to the read command lead 243.

During the reading of a command, as has been stated, the read command lead 243 is high and consequently lead 313 is high at the time a pulse arrives on bus 111 during the sensing of the bit of information in the 25th digit position of the command word. Gate 312 is therefore energized and feeds into gate 263 via lead 314. Gate 263 is also fed by an end of the word pulse (EWP) lead 92 which goes high during the sensing of the bit of information in the 25th digit position of the command word being read. Consequently, gate 263 is energized and, via lead 261, energizes gate 256 which gates through a CP2 clock pulse. This clock pulse proceeds via lead 258 and through gate 259 to lead 257, resetting both flipflops 247 and 248. This puts the control circuitry in the wait transfer state (see the table shown in Fig. 26). This occurs immediately following the sensing of the bit of information in the 25th digit position of the command word being read and, since it is assumed that the command word is being read during word time 10, the control circuitry goes into wait transfer state immediately in advance of the beginning of word time 11. It remains in this state through to the end of word time 19 as shown in the Example 2 appearing above.

As explained above in connection with the immediate command example, a yes bit of information is recorded in the 25th digit position of the single word in the command register immediately at the end of word time 19 and preceding the first digit position of a word sensed during word time 20. This yes bit of information resulted from a carry from digit position 24 to digit position 25, the carry of course being produced by the adder of the control circuitry. When this carry is produced, lead 290 is high and it is noted that this lead feeds into gate 315. This gate is also fed by leads 249 and 311 these being output leads of flipflops 247 and 248. It is to be understood that the leads 249 and 311 shown as feeding into gate 315 are in fact connected to the output leads 249 and 311 shown as coming from flipflops 247 and 248, the actual connections being omitted to avoid confusing Fig. 25 any more than is necessary.

Since the control circuitry is in wait transfer state, leads 249 and 311 are high. Gate 315 is therefore energized causing lead 314 to go high. The latter lead feeds into gate 263 which is also fed by an end of the word pulse (EWP) lead 92. Both leads 92 and 314 are thus high during the sensing of the information in the 25th digit position of the command word being read. Gate 263 is therefore energized causing lead 261 to go high and energize gate 256. A CP2 clock pulse is gated through and proceeds via lead 258 to set flipflop 248. Gate 259 blocks flipflop 247 from changing state. With flipflops 247 and 248 being reset and set respectively, the control circuitry goes to transfer state immediately preceding the beginning of word time 20 and remains in this state during word time 20 as has been described above in connection with the example concerning an immediate command where transfer terminates at the end of word time 20. In the case of the deferred command example being considered, the next command is read during word time 25 and the manner in which this occurs is the same as has been described above in connection with the immediate command example.

In both examples considered above, i.e. a deferred command and an immediate command, it has been assumed that the next command is to be read at a word time occurring after the word time in which transfer terminates. It could, of course, be that the next command is to be read during a word time earlier than the word time during which transfer is to take place. If this is the case, it simply means that the magnetic drum will rotate until the word time is reached during which transfer occurs and then, following completion of transfer, will rotate to the word time in the next memory cycle during which the next command is to be read. For example if, instead of having transfer occur during word time 20 and the next command read during word time 25, transfer is to occur during word time 25 and the next command read during word time 20, then the magnetic drum will rotate from word time 10 through to word time 25 where transfer occurs. The drum will continue rotating until word time 20 in the next memory cycle is reached and then the next command is read. A deferred command consisting of all 0's will produce the maximum delay in execution. This command causes transfer to occur during a word time which is 1 memory cycle later than the word time during which the command is read and the next command is read during a word time which is still another memory cycle after the word time during which transfer occurs.

It will be noted that if a command is read during an even word time (a 0 being assumed to be an even number) then all transfers take place during odd word times. It is to be noted further that the correction numbers obtained from number track 280 are one digit higher than the word time number of the command being read insofar as the transfer correction number is concerned and two digits higher insofar as the time of next command correction number is concerned. From the examples above where the command is assumed to be read during word time 10, the correction number for transfer is 11 and the correction number for next command is 12. Put more generally, where the word time position of the command is designated as $k$, then the correction number for transfer is $k+1$ and the correction number for next command is $k+2$.

The CP1 clock pulse which sets flipflop 248 to change the state of flipflops 247 and 248 from wait next command state to read command state proceeds via lead 316 to gate 317. This gate is also fed by leads 318 and 319 which are connected to flipflip output leads 253 and 311 respectively. When flipflops 247 and 248 are in wait next command state, their output leads 253 and 311 are high. Consequently, leads 318 and 319 are high. The CP1 clock pulse fed into gate 317 via lead 316 is therefore gated through and proceeds via the clear lead 213 which feeds into the sign inspection circuitry shown in Fig. 21. As mentioned above, in connection with the description of the sign inspection circuitry, a pulse appearing on clear lead 213 resets flipflops 161 and 162 if either flipflop happens to be set at the time the pulse arrives. Flipflops 161 and 162 are therefore in reset state, as shown in Fig. 21, in advance of the arrival of the first bit of information obtained as a result of reading a command word.

PLURAL OR SINGLE COMMAND OPERATION

With each command selecting the next subsequent command to be read and obeyed, apparatus according to the teaching of the present invention may operate in a continuous manner until a programmed halt is reached. Alternatively, the apparatus may be operated so that but a single command is read and obeyed at a time, it being necessary for the operator to act by actuating a switch for example, to cause the next command to be read and obeyed. Whether the apparatus operates in a continuous manner or one command at a time depends upon the positioning of switch 320 shown in the lower right-hand corner of the circuitry of Fig. 25.

If the apparatus is to operate in a continuous manner, switch 320 is thrown so that it connects to lead 321 which is energized at an appropriate bias level. The computation is halted automatically by obeying a command whose next command timing number refers back to itself. If the operator wishes to halt the computation manually, he throws switch 320 to halt position. This connects lead 322 to lead 326 causing flipflop 308 to be set as is described more fully hereinafter.

When flipflop 308 is set, its output lead 307 is low. This output lead qualifies gate 306 so that the latter gate does not pass a CP1 clock pulse which normally would be passed during the sensing of the bit of information in the 17th digit position of the single word in the command register. Flipflop 309 therefore remains reset and no signal passes gate 266 to change the control circuitry from wait next command state. The control circuitry remains in this state until something is done to reset flipflop 308.

Flipflop 308 is reset by depressing G*o* switch 323 thereby completing a circuit from lead 324, through condenser 325 to flipflop 308. Lead 324 is energized from a suitable external source, not shown, so that when switch 323 is depressed a pulse proceeds into flipflop 308 to reset the flipflop. The G*o* switch will, of course, be depressed when another series of commands are to be executed and following execution of these commands another programmed halt may occur.

If it is desired to operate one command at a time, switch 320 is thrown so that lead 322 is connected to lead 326. The latter lead is connected to lead 258 which is the output lead of gate 256, the latter passing CP2 clock pulses when properly energized. Accordingly, any time that a CP2 clock pulse appears on lead 258 it also appears on lead 326 and, when lead 322 is connected to lead 326, proceeds, via lead 322, to set flipflop 308. It will be recalled that gate 256 passes a CP2 clock pulse following completion of transfer which causes the control circuitry to go to wait next command state. This CP2 clock pulse can set flipflop 308 and block the control circuitry from changing from wait next command state until flipflop 308 is reset. When G*o* switch 323 is depressed to reset flipflop 308 another command is read, the control circuitry changes into either wait transfer or transfer state and then, immediately at the end of transfer, a CP2 clock pulse proceeds via lead 326 to reset flipflop 308 as described above. This blocks further command word reading until G*o* switch 323 is depressed again and the control circuitry can thus be operated one command at a time.

DISCRIMINATION

It will be recalled from the description above that during each word time, including the word time during which a command is read, a P9–CP1 clock pulse is fed into the adder part of the circuitry shown in Fig. 25. It will be recalled further that the feeding of the P9–CP1 clock pulse effects the addition of a 1 into digit position 10 of the single word recorded in the command register 270. As explained above, the continued additions of such 1's finally causes a carry to appear in digit position 17 of the single word in the command register and when this carry digit is sensed the control circuitry is changed from wait next command state to read command state so that the next command is read during the selected word time.

It may be desirable, however, to cause a different command to be read as the next command if some desired result has been reached upon execution of a particular command. In other words, when a particular command is read it will normally select another command as the next command to be read and obeyed but if, following execution of the particular command being read, a certain result has been achieved, it may be desirable to select an alternate command to the command so selected as the next command to be read and obeyed. Such choice of next command is possible according to the teaching of the present invention by utilizing discrimination circuitry shown in the center portion of Fig. 25 and shown separately in Fig. 27.

Referring to Figs. 25 and 27, flipflop 304 is assumed to be in a state such that its output lead 303 is high. With lead 303 being high, each time tha a P9–CP1 clock pulse appears on lead 81, gate 302 is energized and the pulse proceeds via lead 301 to flipflop 293 which is a part of the adder circuitry shown in Fig. 25. If, however, flipflop 304 is set by a pulse appearing on lead 327 and becomes set prior to the arrival of a P9–CP1 clock pulse on lead 81 then gate 302 is not energized since lead 303 goes low in advance of the arrival of the P9–CP1 clock pulse. Assuming that the setting of flipflop 304 occurs during a transfer period and in advance of the arrival of a P9–CP1 clock pulse, then lead 303 goes low in advance of the arrival of a P9–CP1 clock pulse and consequently such a pulse does not proceed into flipflop 293 during the reading of a command. Since lead 299 is high at all times except when a command is being read, gate 328 will, however, pass each P9–CP1 clock pulse which occurs during each word time except the word time when a command is being read. 1's are therefore fed into the adder part of the circuitry of Fig. 25 but it is apparent that inasmuch as a P9–CP1 clock pulse was blocked during the time that the command involved was read, it will take one more word time to supply this P9–CP1 clock pulse to cause a carry to appear in digit position 17 of the single word in the command register. The next command that is read is therefore one word time later than the command normally selected by the particular command being read.

By utilizing this technique, the programmer can have a choice of two commands as the next command to be read. This enables him to practice so-called "branching out" programming whereby he can program a particular problem, continue the set program until a desired result is reached, shift to another program when the result is reached, and then shift to still another program when a desired result is reached in the second program. The circuitry is such that it will determine when the desired result is reached so that the programmer can, so to speak, check to see if the desired result has been reached and if it has not the initial program will continue until it is reached before a shift in program will occur. There are a number of problems where discrimination according to the teaching of the present invention may be practiced. Merely one example is a problem involving missile trajectory where the computation is to proceed until the missile strikes ground meaning that its altitude is then 0. When this occurs it may be desirable to terminate the computation and shift to another program of computation. Discrimination circuitry according to the teaching of the present invention enables this to be accomplished.

When it is desired to utilize the discriminator circuitry shown in Figs. 25 and 27, destination 62 (D6, D2) is selected. This is in accordance with the Index Table given above and means that one of the destination leads 127 and one of the destination leads 128 is energized (see Fig. 19) so that destination 62 is selected. These leads feed into gate 329 (see Fig. 27) which is also fed by LB1 line 144. Leads 127 and 128 remain high during any transfer commanded by the particular command which selected destination 62 as the destination for transfer. Consequently, any yes bit of information appearing on LB1 line 144 will pass gate 329 to set flipflop 304 in advance of the reading of the next command. The next command will be read during the word time selected by the command which selected destination 62 as the transfer destination but during the time that this next command is read no P9–CP1 pulse will pass gate 302 nor of course gate 328 because lead 299 is low when a command is being read. This means that the next command will be read one word time later than if destination 62 had not been chosen as the transfer destination by the very first command mentioned. Flipflop 304 is reset by an end of the word pulse (EWP) which passes gate 330. Read command lead 243 feeds into gate 330 and is high whenever a command is being read.

All of the foregoing assumes that at least one yes bit of information appeared on LB1 line 144 while destination 62 leads 127 and 128 were high. Since only one yes bit of information is required on LB1 line 144 to set flipflop 304 this means that the word arriving via LB1 line 144 can be checked for sign, i.e. to determine whether it is a negative or positive number or, in short, it can be checked to determine whether there is a 1 in any of the 25 digit positions of the word. If so, flipflop 304 will be set.

In summary therefore, as regards discrimination, the programmer can link together a series of commands to carry out a desired computation. Following what he considers to be the last command of this series he can insert a command specifying the discriminator as the destination and can transfer to the discriminator via LB1 line 144 any information which will determine whether the computation has been completed. Following the command which selects the discriminator as the destination he can place a further command in the series which can carry the computation a step farther, and subsequent to this command he can insert a new command which shifts to a new line of computation if the previous computation has been completed as he suspects it should be. Then, when the command is reached which specifies the discrimination circuitry as the destination, if the series of computations has produced the desired result, a yes bit of information will appear on LB1 line 144 to set flipflop 304. The transfer, if any, commanded by the next command in the computation series will be executed, but the next command read is a command subsequent to the normally selected next command. Sources 62 (S6, S2) and 73 (S7, S3), see the Index Table above, are suitable as sources capable of providing logical operations to determine the presence of a yes bit of information capable of setting flipflop 304.

THE PRODUCT ACCUMULATOR

Figure 28:
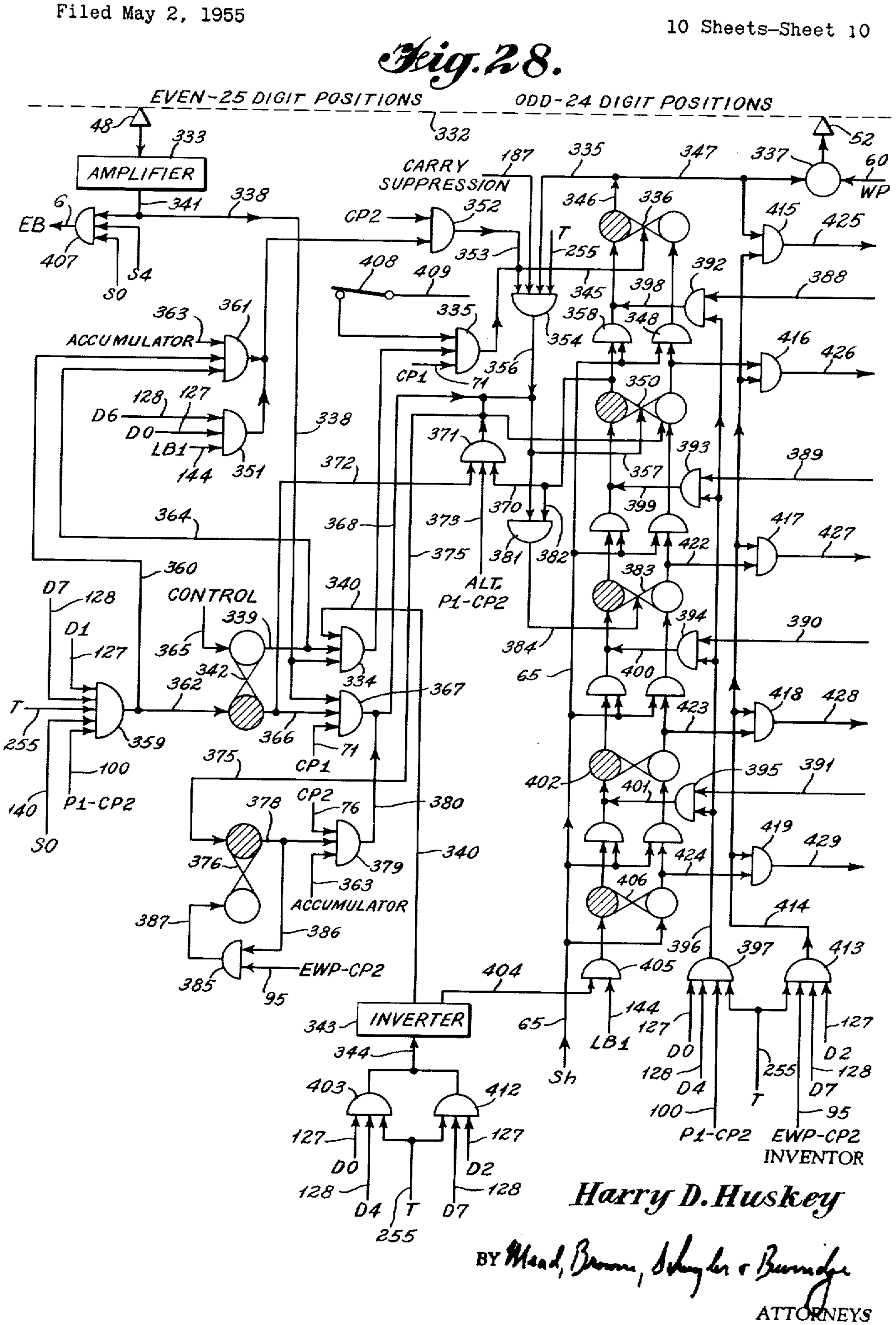
Fig. 28 is a circuit diagram showing the product accumulator and input-output parts of a preferred form of apparatus according to the teaching of the present invention.

The product accumulator, designated by block 10 in Fig. 1, and shown in greater detail in Fig. 28, comprises a two word register (50 digit positions long) made up of one flipflop in series with a memory line providing 49 digit positions. The flipflop, of course, stores the 50th bit of information. The product accumulator has an adder circuit on its input so that it may be used to add either single or double length words. It is also used for multiplication and for information input and information output.

Referring to Fig. 28, dotted line 332 designates the memory line which provides the 49 digit positions of the product accumulator. Recirculation of information from line 332 back to line 332 occurs via reading head 48, amplifier 333, gate 334, gate 335, flipflop 336, pulse gate 337, and writing head 52. Flipflop 336 is the flipflop which stores one of the 50 bits of information making up the double length word capable of being stored in the product accumulator.

Gate 334 is fed by leads 338–340. Lead 338 is connected to amplifier output lead 341. Lead 339 is an output lead of flipflop 342, the latter flipflop being assumed to be in a state such that lead 339 is high. Lead 340 is an output lead of a suitable inverter type of electronic component designated as block 343 which is capable of maintaining lead 340 high when inverter input lead 344 is not energized. The component designated by block 343 may be any suitable type of electronic component capable of performing this desired function as will be understood by those skilled in the art.

Since leads 339 and 340 are both assumed to be high, then gate 334 will be energized each time that magnetic induction reading head 48 senses a yes bit of information in line 332, the pulse produced by reading head 48 being amplified and fed into gate 334 on lead 338. When gate 334 is energized it feeds a pulse to gate 335 and the latter can then pass a CP1 clock pulse fed into it on CP1 clock pulse lead 71. The gated CP1 clock pulse proceeds via lead 345 to change the state of flipflop 336. If, as shown in Fig. 28, flipflop 336 is assumed to be in a state such that its output lead 346 is low then, when flipflop 336 is changed in state by a CP1 clock pulse, output lead 346 goes high and energizes lead 347 connected thereto. Lead 347, in turn, energizes pulse gate 337 which gates through the next succeeding write pulse (WP) fed into it on write pulse lead 60. The write pulse energizes magnetic induction writing head 52 and the yes bit of information is re-recorded in line 332 in a digit position corresponding to that in which it was located when it was sensed by reading head 48.

Each time that flipflop 336 is changed in state by a CP1 clock pulse it is changed back to its original state by the very next succeeding shift clock pulse (S*h* pulse) appearing on shift clock pulse lead 65. This lead feeds into gate 348 which is also fed by output lead 349 of flipflop 350. The latter flipflop is assumed to be in a state, as shown in Fig. 28, such that its output lead 349 is high and hence gate 348 passes the shift clock pulse to reset flipflop 336. The flipflop is therefore ready to accept another CP1 clock pulse.

When it is desired to add a word to a word already present in the product accumulator, the command instructing that this be done specifies the product accumulator as the destination. Referring to the Index Table above, it is noted that the product accumulator is destination 60 (D6, D0). The D0, D6 leads 127 and 128 respectively feed into gate 351 (upper part of Fig. 28) which is also fed by LB1 line 144. Therefore, with D0, D6 leads 127, 128 high, gate 351 is energized each time that a yes bit of information (a 1) appears on LB1 line 144. When gate 351 is energized, it feeds a pulse to gate 352. A CP2 clock pulse lead 76 also feeds into gate 352 so that the latter when energized, gates through a CP2 clock pulse which proceeds via lead 353 into gate 354 and also via lead 345 to flipflop 336 to change the state of this flipflop.

From the description thus far it is apparent that the circuitry shown in Fig. 28 functions similarly to the circuitry of the single word accumulator shown in Fig. 23. In other words, each time that a yes bit of information is sensed by reading head 48, a CP1 clock pulse is gated through to change the state of flipflop 336. Correspondingly, each time that a yes bit of information arrives via LB1 line 144 a CP2 clock pulse is gated through to change the state of flipflop 336. If the respective yes bits of information happened to be derived in the same digit position of the word in product accumulator line 332 and arriving via LB1 line 144, it simply means that flipflop 336 will be changed in state twice very rapidly, once by the CP1 clock pulse and then substantially immediately by the immediately succeeding CP2 clock pulse.

This will produce a carry which is fed via lead 355 to gate 354. That is, when the CP1 clock pulse changes the state of flipflop 336 so that its output lead 346 goes high, lead 355 is also high. Then, when the CP2 clock pulse arrives and feeds into gate 354 as mentioned, the CP2 clock pulse can pass gate 354 and proceed via leads 356 and 357 to flipflop 350 to change the state of this flipflop. Flipflop 350 corresponds to flipflop 230 shown in Fig. 23. The carry will be shifted from flipflop 350 to flipflop 336 by the next succeeding shift pulse which appears on shift pulse lead 65 which feeds into gates 348 and 358. This is the same as has been described above in connection with the single word accumulator shown in Fig. 23.

Gate 354 is also fed by leads 187 and 255. Lead 187 is the carry suppression lead which is low during the combining of the first bit of information in the product accumulator with the first bit of information arriving via LB1 line 144. As explained above in connection with the single word accumulator, this prevents any carry from P1 to P2 digit positions which is essential to achieve the proper sign following end around carry. Lead 255 is the transfer lead which is high when information is being transferred. Gate 354 is therefore effective to pass a carry during the 49 digit positions of a double length word following the first digit position of the word. Further description of how the addition actually takes place is deemed unnecessary since it proceeds as has been described above in connection with the single word accumulator.

When the product accumulator is used in the arithmetic operation of multiplication, flipflop 350 is inserted into the recirculation path so that there is a total of 51 digit positions in the path. This, as will be appreciated by those skilled in the art, means that each double word time a recirculation of information occurs, each bit of information is displaced one digit position from the digit position it occupied immediately preceding the recirculation. This may be described as a one bit precession and its purpose is, of course, to provide the necessary shift in order that multiplication will be accomplished properly. As will be recalled from the ordinary process of long hand multiplication using decimal numbers, as each digit of the multiplier is used to multiply the multiplicand, the resulting partial products are shifted with respect to each other so that, when they are added, the correct answer will be obtained. Shifting of partial products is also necessary when multiplication is being carried out with binary numbers and it is apparent that the product accumulator accumulates the partial products as the multiplication operation proceeds.

Prior to starting multiplication, the multiplier is located in the product accumulator. As shown in Fig. 28, memory line 332 may be considered as consisting of an even part having 25 digit positions and an odd part having 24 digit positions. Flipflop 336 stores the bit of information which in conjunction with the information contained in the 24 digit positions of the odd part of memory line 332 constitutes a single word length for this part of the product accumulator. As shown in Fig. 28, the even part is assumed to be on the left and the odd part on the right. The multiplicand may be transferred from any desired part of the memory to the single word accumulator before multiplication is initiated.

Assuming that the multiplier is in the even part of the product accumulator with its sign digit being the first digit to appear at line 341, multiplication is initiated by a CP2 clock pulse at time P1 fed into gate 359 on P1–CP2 lead 100. Gate 359 is qualified by transfer lead 255 which is high when transfer occurs and by D1, D7 leads 127 and 128 respectively and S0 lead 140. Destination 71 is a special destination, see the Index Table above, and it is noted that source 0 (S0) is one of four source leads which may be energized to provide a choice of one of four special destinations whenever destination 71 is selected. Therefore, with D1, D7 leads 127, 128 and S0 lead 140 all assumed to be high as a result of selecting the special destination which is used during multiplication, gate 359 will pass a CP2 clock pulse to initiate the multiplication operation.

The P1–CP2 clock pulse proceeds via lead 360 to gate 361 and via lead 362 to flipflop 342. Gate 361 is also fed by accumulator lead 363 and lead 364 which is connected to output lead 339 of flipflop 342. Although the P1–CP2 clock pulse proceeds into flipflop 342 via lead 362, thus setting the flipflop, output lead 339 remains high for a sufficient period of time so that gate 361 can pass the P1–CP2 clock pulse, provided accumulator lead 363 is also high. Whether or not accumulator lead 363 is high depends upon whether the sign digit of the word being transferred from the accumulator is a 1 or a 0. If it is a 0 then the P1–CP2 clock pulse does not pass gate 361. Conversely, if the sign digit is a 1, then accumulator lead 363 is high and the P1–CP2 clock pulse does pass gate 361.

When the P1–CP2 pulse passes gate 361 it proceeds through gate 352 and via lead 345 which feeds into flipflop 336. The flipflop is changed in state by the P1–CP2 clock pulse. It is apparent therefore that if the sign digit of the multiplier is a 0, denoting a positive number as the multiplier, then a negative multiplicand will cause flipflop 336 to be changed in state so that the product has a sign digit denoting a negative number. Conversely, if the multiplicand is a positive number then flipflop 336 is not changed in state and the product is a positive number. If both the multiplier and the multiplicand are negative numbers, the product is a positive number since the multiplier sign digit caused flipflop 336 to change state and the multiplicand sign digit caused it to change back again to an assumed reset state as shown in Fig. 28. Flipflop 336 thus stores the sign digit of the product.

Flipflop 342 is changed in state by the P1–CP2 clock pulse causing its output lead 339 to go low hence blocking gate 361. Gate 361 continues to be blocked until flipflop 342 is reset which occurs when the control circuitry shown in Fig. 25 changes from transfer state to wait next command state. It will be recalled that when this change in state does occur, a CP2 clock pulse passes gate 256. This CP2 clock pulse appears on control lead 365 which is connected to output lead 258 of gate 256 (see Fig. 25).

When flipflop 342 is set, its output lead 366 is high and this lead feeds into gate 367. Gate 367 is also fed by lead 338 which is connected to amplifier output lead 341 and by CP1 clock pulse lead 71. Therefore, during the reading of information in digit positions 2–50 of the double length word stored in the product accumulator, gate 367 can pass a CP1 clock pulse each time that a pulse representing a yes bit of information (a 1) appears on lead 338. Gate 367 has an output lead 368 which transmits any CP1 clock pulse passed by gate 367 to lead 356 and then, via lead 357, to flipflop 350. This introduces flipflop 350 into the recirculation path which previously had included only flipflop 336. With flipflop 350 thus introduced into the recirculation path, the latter path is obviously one digit position longer (51 digit positions long) which, as will be understood by those skilled in the art, causes a one bit precession (delay) each time that recirculation occurs.

Each time that a yes bit of information is sensed by reading head 48, gate 367 passes a CP1 clock pulse which changes the state of flipflop 350, this flipflop being reset between each such change of state by a shift clock pulse from lead 65 as will be evident from an inspection of Fig. 28. At the end of the first single word time during which multiplication was initiated (the time taken for 25 digit positions to pass reading head 48) the most significant digit of the multiplier is located in flopflop 350. At the end of two more single word times this most significant multiplier digit is in product register 332, having precessed one digit position. At P1 pulse time of the next single word time this most significant digit will be in flipflop 350. When this occurs and if this most significant multiplier digit is a 1, flipflop 350 is set. When set, its output lead 369 is high.

Lead 370 is connected to flipflop output lead 369 and feeds into gate 371. This gate is also fed by lead 372 which is connected to flipflop output lead 366 which is high at this time. Gate 371 is also fed by lead 373 which is energized from a suitable source, not shown, to feed a P1–CP2 pulse into gate 371 at the beginning of each alternate word time. It is assumed that a P1–CP2 pulse appears on line 373 during P1 pulse time of each even word time, the terms even and odd being used to distinguish two consecutive word times. If flipflop 350 has been set by a multiplier digit (the most significant multiplier digit in the first instance), then gate 371 will be energized by the P1–CP2 pulse which appears at the beginning of an even word time. When gate 371 is energized, its output lead 374 is high and lead 375, connected thereto, feeds into flipflop 376 to set this flipflop. Lead 377, connected to gate output lead 374, feeds to the indicated side of flipflop 350 to reset flipflop 350. This, in effect, causes the multiplier digit to be cleared.

When flipflop 376 is set, output lead 378, which feeds into gate 379, is high. Gate 379 is also fed by CP2 lead 76 and accumulator lead 363. Since flipflop 376 is set at P1–CP2 pulse time, lead 378 is low during the time that a bit of information in the first digit position of a word is being read and gate 379 is ineffective to pass any pulse at this particular time. However, it can pass any yes bit of information (a 1) occurring in digit positions 2–25 of the multiplicand which enters the gate via accumulator lead 363. It will be recalled that it is assumed that the multiplicand is coming from the single word accumulator.

The information in digit positions 2–25 of the multiplicand proceeds through gate 379 and via lead 380, lead 368, lead 356, and lead 357 into flipflop 350. Lead 356 feeds into gate 381 which is also fed by lead 382 connected to lead 370. Gate 381 provides a path whereby a carry from flipflop 350 may be fed into flipflop 383 via gate 381 and lead 384. Upon examining that part of the circuitry of Fig. 28 which includes flipflops 350 and 383 and leads 357, 369, gate 381 and lead 384, it will be recognized that this is simply a two-stage binary adder which operates as has been described above in connection with the single word accumulator shown in Fig. 23. The information coming from the product accumulator is fed in at CP1 clock pulse time whereas the information coming from the single word accumulator is fed in at CP2 clock pulse time. Addition can thus be accomplished and, in view of the description given above in connection with the single word accumulator, it is deemed unnecessary to repeat how the addition takes place.

The arithmetic process of multiplication thus proceeds with each digit of the multiplier, going in order from P25 down to and including P2, being located in flipflop 350 at P1 pulse time of an even word time. When the multiplier digit located in flipflop 350 is a yes bit of information (a 1), the multiplicand is gated through and added to the multiplier during the particular even word time involved. Conversely, if the multiplier digit is a no bit of information (a 0), then the information in the product accumulator simply circulates during the particular even word time involved.

It is apparent that the multiplication must proceed for a substantial number of single word times when the numbers being multiplied each consists of a substantial number of digits. In order to complete multiplication of two numbers consisting of 24 digits each plus a sign digit, the control circuitry must remain in transfer state for a total of 51 single word times. An immediate command is therefore necessary to permit transfer to continue for the necessary length of time. If the multiplication is interrupted prior to completion of the necessary number of single word times, an approximate right answer can be obtained since the multiplication proceeds starting with the most significant digit of the multiplier and going down to the least significant digit of the multiplier.

Flipflop 376 is reset at the end of each single word time by an EWP–CP2 clock pulse obtained from the word pulse track and fed into gate 385 on EPW–CP2 lead 95. Gate 385 is also fed by lead 386 but, since this lead is connected to flipflop lead 378 and the flipflop is assumed to be set when the multiplicand is proceeding through gate 379, lead 386 is high. The EWP–CP2 clock pulse proceeds through gate 385 and goes to flipflop 376 via lead 387 to reset the flipflop. Flipflop 376 is thus reset in advance of the time when each digit of the multiplier which can cause the flipflop to be set as described above is stored as a bit of information in flipflop 350.

The following in an example of multiplication according to the teaching of the present invention:

*Multiplication example*

| Beginning of Word Time | Product Accumulator | | Flipflop 350 | Flipflop 336 |
|---|---|---|---|---|
| | odd word part | even word part | | |
| $k$ (odd) | 0 0 0 | 1 1 1 $s$ | ---------- | 0 |
| $k+1$ | 1 0 $s$ | 0 0 0(0) | 1 | 1 |
| $k+2$ | 0 0 1 | 1 1 0 $s$ | 0 | 0 |
| $k+3$ | 0 $s$ 0 | 0 0 0(1) | 1 | 1 |
| $k+4$ | 1 0 1 | 1 0 $s$ 0 | 1 | 1 |
| $k+5$ | $s$ 0 1 | 1 1 0(1) | 1 | 0 |
| $k+6$ | 1 0 1 | 0 $s$ 1 0 | 1 | 0 |
| $k+7$ | 1 0 1 | 0 1 0(1) | 0 | $s$ |
| $k+8$ | 1 0 0 | $s$ 1 1 0 | 0 | 0 |
| $k+9$ | 1 0 0 | 0 1 0 0 | $s$ | 1 |

In the multiplication example above it is assumed that both the multiplier and the multiplicand are 4 digits long, the first digit of each being the sign digit and the remaining 3 digits constituting the number. It is further assumed that the three digits constituting the number for both the multiplier and the multiplicand are all 1's. The four digit position example is selected in order to conserve space but it is evident that the principle is the same whether there are four digit positions involved or 25 digit positions involved.

Word time $k$ in the multiplication example above is assumed to be an odd word time thue making $k+1$ an even word time, $k+2$ the next odd word time, and $k+3$ the next even word time etc. Furthermore, each word time shown is assumed to be at the beginning of the word time. Therefore, as shown, at the beginning of word time $k$, the multiplier is in the even word portion of the product accumulator with its sign digit being the first digit which will be read by reading head 48 during word time $k$. Assuming that multiplication is initiated by a P1–CP2 pulse fed into gate 359 during P1 pulse time of odd word time $k$, then sign digit $s$ will be in flipflop 336 at this P1 pulse time. The sign digit of the multiplicand is also fed to flipflop 336 at this P1 pulse time so that flipflop 336 then contains the sign digit of the product. The multiplication thus starts with the storing of the sign digit and proceeds through the single word time $k$ at the end of which word time the various digits have shifted to the position shown in the next succeeding line which is the beginning of word time $k+1$ (an assumed even word time). Flipflop 350 has been included in the recirculation path and thus appears in the line including $k+1$.

Recirculation continues during word times $k+1$ and $k+2$ with precession occurring. At the beginning of word time $k+3$, the most significant digit of the multiplier is in the even part of product register 332. This most significant digit is indicated by the 1 in parenthesis shown in the line including $k+3$ in the multiplication example above. At P1 pulse time of word time $k+3$, this most significant digit will be located in flipflop 350. Since this most significant digit is a 1, flipflop 350 is set as described above to cause the multiplicand to be added to the contents of the product accumulator during word time $k+3$. Furthermore, flipflop 350 is reset immediately preceding such addition which, in effect, clears the most significant multiplier digit. At the end of word time $k+3$ the product accumulator contains a partial product resulting from the multiplication of the multiplicand by the most significant digit of the multiplier.

Recirculation continues, with the multiplicand being added to the contents of the product accumulator during each even word time in which a yes bit of information (a 1) appears in flipflop 350 at P1 pulse time. Thus, in the multiplication example above, a 1 from the multiplier appears in flipflop 350 at P1 pulse time of even word times $k+3$, $k+5$, and $k+7$. The multiplicand is therefore added to the contents of the product accumulator during these word times $k+3$, $k+5$, and $k+7$. This uses up all three digits of the multiplier and the multiplication terminates at the end of word time $k+8$ which is shown in the multiplication example above as the beginning of word time $k+9$. As shown in the line including $k+9$, the sign digit appears in flipflop 350. However, a shift pulse appearing on shift pulse lead 65 shifts the sign digit into flipflop 336 simultaneously with the arrival of the next succeeding first digit from amplifier 333 which is always a no bit of information (a 0).

If it is assumed that the numbers involved in the multiplication example above are both fractions with the binary point on the left, then the answer is likewise a fraction with the binary point on the left. Thus, with each number being represented by three yes bits of information (three 1's), both the multiplier and the multiplicand are the fraction ⅞. The product is therefore $^{49}/_{64}$ths. Upon inspecting the product appearing in the last line of the multiplication example above, it is noted that it is made up of ½ plus ¼ plus $^{1}/_{64}$ which equals $^{49}/_{64}$. Flipflop 336 contains the most significant digit and the binary point is immediately to the left of this digit. If the numbers involved in the multiplication are integers then the multiplication process described above produces twice the answer.

INPUT-OUTPUT

As indicated in Fig. 1, new data fed into the apparatus of the present invention (input data) is fed into the product accumulator. The input data will come from a suitable external source, such as a tape reader (not shown), and can proceed into the product accumulator via input leads 388–391 (see the right-hand portion of Fig. 28). Having four input leads makes it possible to code decimal digits from 0 to 9 according to the binary number system.

Input leads 388–391 feed into four gates 392–395, respectively. These gates are part of the input-output part of a preferred embodiment of apparatus according to the present invention, said input-output part being designated by block 11 in the block diagram of Fig. 1. Lead 396, which is an output lead of gate 397, also feeds into each of gates 392–395. Gate 397 is fed by four leads, these being D0, D4 leads 127,128, P1-CP2 clock pulse lead 100, and transfer lead 255. D0, D4 leads 127, 128 are the two leads which select destination 40. This destination, according to the index table above, is the read destination which means that the input leads are to be read for any information present on them. When a command specifies that data be read into the apparatus then this command will select destination 40 as the destination and hence D0, D4 leads 127, 128 will be high. Since a transfer operation is being performed, transfer lead 255 is also high. Accordingly, a P1–CP2 clock pulse can be gated through by gate 397 and feed into each of gates 392-395.

If, at the brief instant of time that the P1–CP2 pulse is fed into each of gates 392–395, a pulse is present on any of input lines 388–391, the gate 392–395 associated therewith passes the P1–CP2 pulse to energize the gate output lead. Thus, one or more of gate output leads 398–401 may be energized. Each gate output lead so energized will set the flipflop into which it feeds. If gate output lead 398 is energized, flipflop 336 is set, if gate output lead 339 is energized flipflop 350 is set, if gate output lead 400 is energized flipflop 383 is set, and if gate output lead 401 is energized flipflop 402 is set.

When D0, D4 leads 127, 128 go high in conjunction with transfer lead 255 they energize gate 403 which feeds, via lead 344, into the inverter component designated by block 343. As mentioned above, the characteristics of this inverter are such that lead 340 is high when input lead 344 is low whereas lead 404 is high and lead 340 low when input lead 344 is high. Lead 404 feeds into gate 405 which is also fed by LB1 line 144. It is thus seen that when the read destination is selected by a command, the recirculation path of the product accumulator is lengthened to include flipflops 350, 383, 402, and 406. Recirculation via gate 334 is blocked because lead 340 which feeds into this gate goes low immediately preceding transfer when the read destination is selected.

Information in the product accumulator can thus proceed via reading head 48, amplifier 333, and gate 407 to Early Bus 6. Gate 407 is also fed by S0, S4 leads 140, 141. The command which selects the read destination as the destination also selects the product accumulator as the source. Upon examining the index table above, it is noted that source 40 is the product accumulator. Therefore during input of data, the product accumulator transfers from itself, back to itself, via the sign inspection part of the apparatus (which is in a state such that transfer through it occurs without modification of the data in transit) and the four additional flipflops 350, 383, 402, and 406. The recirculation path is seen to involve 49 digit positions in memory line 332 plus 5 flipflops making a total of 54 digit positions, in effect. In other words, 54 bits of information may be stored in such a path.

Prior to executing a read command, the product accumulator, or at least that part of the product accumulator which is to receive the input information, will be cleared. One way of accomplishing such clearing is to subtract any information present in the accumulator from such information. In other words, the product accumulator is subtracted from itself. Another way to clear the product accumulator is to open switch 408 which is in line 409 which feeds into gate 335. Line 409 is energized from a suitable source, not shown, to qualify gate 335. Therefore, when switch 408 is opened gate 335 is blocked and this prevents recirculation of information from line 332 to line 332 thus clearing the product accumulator. After the product accumulator is cleared, switch 408 is closed again.

Assuming that the product accumulator has been cleared, the even word part of the product accumulator will then contain 25 zeros (0's). At P1 pulse time of the single word time during which the first read command is executed, the first zero (0) from the even word part of the product accumulator will be located in flipflop 406 since flipflops 350, 383, 402, and 406 are now included in the recirculation path. Also, at this P1 pulse time of the first read command word, input information is fed in on input leads 388–391. The information fed in on lead 388 may be either a 1 or a 0 but the information fed in on leads 389–391 during the first read command word time should be zeros (0's). It is assumed that when flipflops 350, 383, 402, and 406 were included in the recirculation path, these flipflops all contained zeros which is necessary, in general, for correct operation of the read command.

At the end of the single word time during which the first read command is executed, the last five 0's which were in the even word part of the product accumulator at the beginning of this read command word time are in flipflops 336, 350, 383, 402, and 406. In other words, the bits of information which were initially in the even word part of the product accumulator may now be considered as being four digit positions late because of the inclusion of four additional flipflops in the recirculation path. At the end of the next single word time, the information will have circulated so that the bit of information fed in on input lead 388 during P1 pulse time of the first read command will be the first bit of information to be read by reading head 48 at the beginning of the next read command. Thus, at P1 pulse time of this next read command, the first bit of information fed in on lead 388 will appear in flipflop 406 and four new bits of information may be fed in on input leads 388–391 to proceed into flipflops 336, 350, 383, and 402 immediately in advance of the bit of information present in flipflop 406 at this P1 pulse time.

Thus, during P1 pulse time of each read command four bits of information proceed into the product accumulator via input leads 388–391 going into position immediately in advance of the four bits of information fed into the product accumulator during execution of the immediately previous read command. After a read command has been executed seven times a total of 28 bits of information will have been transferred into the product accumulator. At the end of the seventh read command, the bits of information fed in on input leads 389–391 during execution of the first read command will be located in flipflops 350, 383, and 402. However, it will be recalled that these three bits of information are zeros (0's). Flipflop 336 contains the bit of information which was fed in on input lead 388 during execution of the first read command and the odd word part of the product register contains the 24 bits of information which were fed into the product accumulator during execution of read commands 2–7. The bit of information in flipflop 336 is the most significant digit of the word in the product accumulator, input of information thus going in the sequence from most significant to least significant.

At the end of the next single word time following the seventh read command the information fed into the product accumulator has circulated into the even word part of the product accumulator and occupies the 25 digit positions of this even word part. It is thus seen that since the even word part has but 25 available digit positions, it was necessary to feed zeros in on input lines 389–391 during execution of the first read command or otherwise the capacity of the even word part of the product accumulator would have been exceeded. Also, feeding zeros (0's) into flipflops 350, 383, and 402 during execution of the first read command permits subsequent filling up of the other word portion of the product accumulator without any intervening clearing of the flipflops. It is thus seen that information may be fed into the product accumulator to fill up one of the two word parts of the product accumulator. If it is assumed that the odd word part of the product accumulator is filled by executing read commands during odd word times then, correspondingly, the even word part of the product accumulator may be filled by executing read commands during even word times.

The information input procedure described above assumes that read commands are present in the computer memory. In other words, the information input procedure which has been described may be referred to as programmed or automatic input where the computer automatically looks for its input information in response to read commands. In contrast, for initial information input, the computer is operated one command at a time.

For initial information input, the computer memory is cleared by opening switch 61 (see Fig. 13) which interrupts the feeding of write pulses to all of the magnetic induction writing heads 52 and thus results in all zeros (0's) in the various memory lines with which magnetic induction writing heads are associated. Switch 320 (see the lower right-hand corner of Fig. 25) is in halt position which, as described above, means that the computer is in the one-operation-at-a-time mode or, to put it another way, may be operated one command at a time. Of course, after the memory has been cleared, switch 61 is closed again. Information circulates in the command register (line 270) and a carry (a 1) appears during P17 pulse time once each memory cycle.

Therefore, as has been described above in connection with the description concerning Fig. 25, when the operator depresses push button 323, the next such carry digit which occurs during P17 pulse time causes an all zeros command to be transferred to the control circuitry shown in Fig. 25. An all zeros command is a transfer from the product accumulator back to the product accumulator via the four extra flipflops 350, 383, 402, and 406. In other words, the source and destination coding of an all zeros command specifies the product accumulator (source 40) as the source and destination 40, the read destination, as the destination. Of course, the read destination is actually the product accumulator with the four extra flipflops on its input so that the all zeros command does call for a transfer from the product accumulator back to the product accumulator via the four extra flopflops. Therefore, if the memory has been cleared, any command from line 0 of the memory (one of the long memory lines) consists of all zeros and will consequently cause a read operation to take place.

Prior to depressing switch 323 for the first read command operation on initial input, the operator will make input information available so that the input information will appear on input leads 338–391 during execution of a read command. The suitable external information input source, not shown, may be a tape reading device or the like, it simply being necessary that the external source be capable of presenting the input information so that it is available in the proper sequence each time that the operator causes a read command to be executed by depressing switch 323.

When the operator depresses switch 323 seven times to cause seven read commands to be executed, then, as described above in connection with information input, 28 bits of information are fed into the product accumulator with the three bits of information which end up in flipflops 350, 383, and 402 being all zeros. If it is assumed that the read commands are executed during odd word times then this results in filling up the odd word part of the product accumulator. By executing read commands during even word times the even word part of the product accumulator may be filled up by executing seven more read commands.

This may be accomplished by manually setting flipflop 304 (see Figs. 25 and 27) to cause the next seven read commands to be executed during even word times. In other words, the commands executed during odd word times are read during even word times as described above in connection with the description concerning the control circuitry shown in Fig. 25. By means of the discrimination circuitry shown in Figs. 25 and 27, an alternate command is selected which will be read during an odd word time. A command read during an odd word time is executed during an even word time and thus the even word part of the product accumulator may be filled up after the odd word part has been filled.

Referring more particularly to Fig. 27, it is noted that lead 410 feeds to the indicated side of flipflop 304 when switch 411 is closed. Lead 410 is energized from a suitable external source, not shown, so that when switch 411 is closed, flipflop 304 is set causing lead 303 to go low and block gate 302. As explained above in the description concerning the discrimination circuitry, this causes the next command to be read during a word time which is one word time later than it would have been read had flipflop 304 not been set. Therefore, read commands may be read during odd word times and executed during even word times to fill up the even word part of the product register.

After the operator has filled up both parts of the product register he can use the information in one part to cause transfer of the information in the other part to some other destination in the memory. In other words, he will enter two commands in the product register and use one of these commands to command transfer of the other command to another part of the memory, one of the long memory lines, for example. However, in order to be able to obey a command which has been established in the product register as initial input information, it is necessary to be able to connect the control circuitry shown in Fig. 25 to the product accumulator so that the latter is the command source. This may be accomplished in any suitable manner apparent to those skilled in the art such as, for example, by providing a switch which can be closed manually to connect command busses 110 and 111 to the product accumulator as a command source so that one of the command words entered in the product register as initial input information will be read as the command to cause transfer of the other word in the product register to another part of the memory. In this way, a series of commands may be entered into the memory and finally located so that the command series will then call for automatic information input making it unnecessary for the operator to continue the manual input. The initial input operation is therefore simply an initial ritual to go through in order to, so to speak, prime the apparatus so that it will thereafter call for its input information.

In summary, as regards initial input, the memory is first cleared by opening switch 61 (see Fig. 13) to interrupt the production of write pulses which energize the magnetic induction writing heads. Then this switch 61 is closed after the memory has been cleared. The operator thereupon executes six read commands, i.e. depresses switch 323 six times. He then closes switch 411 to set flipflop 304. Switch 323 is depressed again to complete the filling up of one part of the product register. Then, since flipflop 304 was set, he can fill up the other part of the product register by depressing switch 323 seven more times. The product accumulator is next made available as the source of next command. The operator then depresses switch 323 one more time whereupon one command present in the product accumulator causes the other word in the product accumulator (which will usually also be a command when initial input is being accomplished) to be transferred to some other part of the memory. The product register is then cleared by opening switch 408 to block gate 335. Then the above process may be repeated to get other commands into the memory and thus build up a series of commands which can call for automatic input.

The procedure involved in transferring data from the apparatus to a suitable external destination, such as an electric typewriter, not shown, is generally similar to the procedure described above for accomplishing automatic information input. In other words, when a command calls for data output the print destination (D72 in the Index above) is selected. The product accumulator is again the source which means, of course, that when a particular word is to be transferred to the output destination it must be present in the product accumulator to permit such transfer.

Assuming that a print command has just been read, gate 407 is energized by S0, S4 leads 140 and 141 to pass information from the product register to Early Bus 6. D2, D7 leads 127 and 128 are also high. These leads feed into gates 412 and 413 (see the lower portion of Fig. 28). Therefore, at the beginning of the next single word time when transfer (T) lead 255 goes high, gate 412 is energized. As has been described above, this causes gate 405 to pass any information fed into the gate on LB1 lead 144. Therefore, at the beginning of execution of a print command flipflops 350, 383, 402, and 406 are introduced into the recirculation path of the product accumulator.

At the end of the single word time during which the print command was executed, 25 bits of information have been read by reading head 48 and have proceeded via Early Bus 6, the sign inspection circuitry shown in Fig. 21, and LB1 lead 144 into the flipflops now included in the recirculation path. The last four bits of information end up in flipflops 350, 383, 402, and 406. Assuming that this is the first print command which has just been executed for the particular word being read for information output, then the four flipflops just mentioned will contain the four most significant digits of this particular word. At the end of execution of the second print command these four flipflops will contain the next four most significant digits of the word being read for information output. Therefore, when seven print commands have been executed all 25 digits of the word being read for information output will have been present in the four flipflops mentioned, proceeding from the most significant digit to the least significant digit.

At the end of the word time during which each print command is executed, an EWP–CP2 clock pulse appears on lead 95 which feeds into gate 413. Since all of the other leads feeding into this gate are high at this time, gate output lead 414 is energized by the EWP–CP2 pulse. Gate output lead 414 feeds into gates 415–419. These gates are also fed, respectively, by flipflop output leads 420–424. Therefore, depending upon the information present in the various flipflops at the time the EWP–CP2 pulse appears on gate output lead 414 none, or one or more of the flipflop output leads 420–424 may be high. Consequently, any gate 415—419 will be energized if at the time the EWP–CP2 pulse appears on lead 414, the flipflop output lead feeding into the gate is also high. In this way one or more of the information output leads 425–429 may be energized.

In the description above, reference has been made to the utilization of flipflops 350, 383, 402, and 406 for information output. Normally this will be preferable but, it is apparent that, if desired, flipflop 336 may also be used for information output thus providing five information output leads as contrasted to four information input leads. Since the output information passes gates 415–419 as EWP–CP2 pulses which are of very brief duration, it is preferable to feed each such pulse, via the output lead involved, to some other device, such as a thyratron, not shown, which is capable of being triggered, to maintain a suitable steady output signal for interpretation by output information reading equipment. If a sequence of print commands is executed during even word times to obtain information output from a word in one part of the product register then obviously a subsequent sequence of print commands may be executed during odd word times to obtain output information from the word in the other part of the product register.

Inasmuch as apparatus according to the teaching of the present invention is capable of executing read commands and print commands during very brief time intervals, it is necessary to synchronize the execution of a read command, for example, with whatever external information input equipment is feeding the input information to leads 388–391. Normally, such external equipment will not be able to present the input information in proper sequence as rapidly as the apparatus can execute read commands. Also, normally, external information output equipment such as an electric typewriter, tape punch or the like, will not be able to accept output information from output leads 425–429 as rapidly as successive groups of bits of output information can be made available on said output leads by executing print commands.

Synchronization of external information input and information output equipment with the execution of read commands and print commands may be accomplished according to the teaching of the present invention by utilizing the discrimination circuitry described above in connection with Figs. 25 and 27. Thus, when input information, for example, is available on input leads 388–391, clock pulses may be fed to the discriminator as a destination (gate 329, see Fig. 27) to set flipflop 304 and thus cause a subsequent command to be read. This subsequent command will be a read command which, when executed, will cause the input information to be read as described above. If the input information is not available on information input leads 388–391 then clock pulses will not be fed to the discriminator and a read command will not be selected as the next command to be obeyed. In this way, read commands are executed only when information is available on the information input leads 388–391. The same technique may be followed to assure that print commands are executed only when the external information output receiving equipment is ready to receive the output information.

Sources 70 and 71 (see the Index Table above) are suitable for use as sources of clock pulses to be fed to the discriminator (D62). In other words, in testing to determine whether input information, for example, is available to be read, source 70 may be selected as the source and destination 62 as the destination. The command which selects ready as a source and the discriminator as the destination may select itself as the next command to be obeyed if, for example, input information is not available on input leads 388–391.

CONCLUSION

From the above description it is seen that apparatus constructed in accordance with the teaching of the present invention provides a stored program, general purpose computer which is lower in cost and smaller in physical size than computers now available which have comparable computational capacity and versatility. A computer constructed in accordance with the teaching of the present invention is capable of storing a substantial number of words, each word consisting of sequential bits of information. Command words and words representing data to be processed in accordance with the commands (instructions) may both be stored in the memory of the apparatus. Furthermore, words may be of either single or double length.

The makeup of a command word provides substantial programming flexibility. Thus, the command word determines source and destination, determines the type of transfer which is to occur, determines when transfer is to be initiated and for how long it is to continue, and selects the next command word to be read and obeyed. One word or a plurality of sequential words may be transferred in response to one command. In fact, it is possible to accumulate a sequence of words by a single command. By providing a number track in the memory according to the teaching of the present invention, the computer may be operated in the absolute address mode thus further facilitating programming.

High arithmetic speed is facilitated by the minimum access coding possible by utilizing each command to specify the location of the next command to be read and obeyed. Arithmetic speed is also facilitated by performing any required modification of the bits of information which make up a word being transferred while, in response to a command, said bits of information are being transferred from a source to a destination. This, of course, is accomplished by the sign inspection part of apparatus according to the teaching of the present invention as has been described more particularly above in connection with Fig. 21. Arithmetic speed is further facilitated by utilizing end around carry in conjunction with carry suppression thus making it possible to accumulate numbers rapidly. In multiplication, the sign digit of the product is stored in a flipflop at the outset of multiplication, said flipflop being a part of the recirculation path utilized in carrying out the arithmetic operation of multiplication. In addition to arithmetic operations, branching and other logical operations may be carried out as will be apparent to those skilled in the art.

Apparatus constructed in accordance with the teaching of the present invention has substantially fewer components which make up the apparatus than does the usual apparatus for high speed general purpose computing available prior to the present invention. By minimizing the number of components used, reliability is increased. Furthermore, by using printed circuit techniques, plug-in units, and the like, the entire apparatus is extremely compact and may be readily maintained. In short, the present invention provides a rugged, low cost, versatile high speed general purpose computer.

While I have described and illustrated embodiments of my invention, I wish it to be understood that I do not intend to be restricted solely thereto but that I do intend to cover all modifications thereof which would be apparent to one skilled in the art and which come within the spirit and scope of my invention.

What I claim as my invention is:

1. An apparatus useful for high speed general purpose computing, said apparatus comprising means to store data as sequential groups of sequential signals, each signal representing a bit of information and each group of signals representing a word, information output means connected to said storage means to read said signals from said storage means in the same sequence in which said signals were stored in said storage means, and information transfer means connected to said output means to transfer said signals as they are read by said output means, said transfer means including means to, in response to a single command, either transfer one or more groups of said signals in continuous sequence unchanged, transfer one or more groups of said signals in continuous sequence and delete the first signal of each group as said transfer is being accomplished, or transfer one or more groups of said signals in continuous sequence and modify signals in each group as said transfer is being accomplished.

2. An apparatus useful for high speed general purpose computing, said apparatus comprising means to store data as sequential groups of sequential signals, each signal representing a bit of information and each group of signals representing a word, information output means connected to said storage means to read said signals from said storage means in the same sequence in which said signals were stored in said storage means, and information transfer means connected to said output means to transfer said signals as they are read by said output means, said transfer means including means to transfer, in response to a single command, one or more groups of said signals in continuous sequence and delete the first signal of each group as said transfer is being accomplished.

3. An apparatus according to claim 2, wherein said transfer means includes means to, in response to a single command, either transfer one or more groups of said signals in continuous sequence unchanged, or to transfer one or more groups of said signals in continuous sequence and delete the first signal of each group as said transfer is being accomplished.

4. An apparatus according to claim 2, wherein said transfer means includes means to, in response to a single command, transfer one or more groups of said signals in continuous sequence and delete the first signal of each group as said transfer is being accomplished, or transfer one or more groups of said signals in continuous sequence and modify signals in each group as said transfer is being accomplished.

5. An apparatus useful for high speed general purpose computing, said apparatus comprising a cyclically movable delay type memory having a plurality of information storage memory lines each capable of storing a plurality of words, each word being represented by sequential bits of information readable by electrical means, the number of bits of information making up each word being the same and said bits of information being uniformly spaced apart whereby each word may be read in the same length of time, electrical reading means, electrical writing means, an electrical loop connecting each reading means to a writing means whereby information read from each memory line may be written back into said line, the writing and reading means associated with each line being spaced apart so that a predetermined number of words may be stored in each memory line, each word recirculating via said loop once during each cycle of movement of said memory a sign inspection circuit, means electrically connecting said sign inspection circuit to each reading means and each writing means whereby information from any memory line may transfer to another memory line via said sign inspection circuit, a transfer control circuit, means electrically connecting said transfer control circuit to a reading means whereby a word may be fed into said control circuit from one of said memory lines, means in said control circuit connected to said sign inspection circuit to control said sign inspection circuit in advance of transfer of information through said sign inspection circuit, and means in said control circuit responsive to a word fed into said control circuit to select one or more words for transfer from one memory line to another memory line via said sign inspection circuit.

6. A general purpose digital computer comprising a magnetic drum memory, a plurality of pairs of magnetic induction writing heads and magnetic induction reading heads positioned in operative proximity to the drum circumference, the writing head and reading head in each pair being spaced apart a predetermined distance in accordance with the word length of words to be stored in said memory, electrical gates connected to each writing head and to each reading head, an electrical loop circuit connecting each reading head gate to the gate associated with the corresponding writing head whereby bits of information read by said reading head may recirculate from said memory back into said memory via said reading head and said writing head, an electrical sign inspection circuit common to all of said gates, gate selecting means operable to actuate a gate connected to a reading head and a gate connected to a writing head to set up a transfer path from said reading head gate to said writing head gate via said sign inspection circuit, said sign inspection circuit including means to transfer information unchanged or to modify information while such information is in transit via said sign inspection circuit, an electrical control circuit for controlling said gate selecting means and said sign inspection circuit, said control circuit being connected to one of the electrical loops associated with a memory line whereby command words may be fed into said control circuit from said memory line, said control circuit including means responsive to information contained in a command word fed into said control circuit to energize said gate selecting means and actuate said sign inspection circuit transfer means in advance of transfer of information from one memory line to another memory line, means responsive to information contained in said command word to initiate transfer of one or more words and terminate transfer when the proper number of words have been transferred, and means responsive to information contained in said command word to feed the next command word into said control circuit.

7. An apparatus useful for high speed general purpose computing, said apparatus comprising a movable carrier for information having a plurality of information storage lines, each line being capable of storing data as groups of signals representing sequential bits of information, signal reading and signal writing means operatively associated with each information storage line, each signal representing a bit of information written into a storage line by a writing means being read from said storage line by the associated reading means a predetermined period of time after the signal was written into said storage line, a first electrical circuit connecting the reading means and writing means associated with each storage line to re-circulate signals representing bits of information read from each storage line back into the storage line from which the signals where read whereby each information storage line has an information re-circulation loop associated therewith, said movable information carrier also having an accumulator information storage line capable of storing data as a group of signals representing sequential bits of information, an accumulator line reading means and an accumulator line writing means operatively associated with said accumulator storage line, an information re-circulation loop connecting said accumulator line reading means to said accumulator line writing means whereby signals representing bits of information read from said accumulator information storage line may re-circulate back into said accumulator information storage line, said accumulator information storage line re-circulation loop including an adder, and a second electrical circuit connectible between any information reading means and any information writing means to transfer sigals representing sequential bits of information from one information storage line either back to the same information storage line or to another information storage line, the transfer to said accumulator information storage line being through the adder included in the re-circulation loop of said accumulator storage line whereby an arithmetic operation may be performed on the information transferring to said accumulator information storage line, said second electrical circuit including sign inspection means operative to inspect the signals being transferred for sign while said signals are in transit via said second electrical circuit, and said sign inspection means also including means controllable to modify individual signals in a group of signals being transferred via said second electrical circuit irrespective of whether the destination of said group of signals being transferred is said accumulator information storage line or some other information storage line, said modification occurring while said signals are in transit via said second electrical circuit.

8. An apparatus according to claim 7, wherein said movable carrier for information includes a plurality of accumulator information storage lines each capable of storing at least one group of signals representing sequential bits of information and each having an information recirculation loop operatively associated therewith and including an adder, said sign inspection circuit means being selectively connectible to any accumulator information storage line or to any of the other information storage lines of said movable information carrier.

9. A general purpose digital computer comprising a movable memory having a magnetizable surface, a magnetic induction writing head operatively associated with said memory to magnetize discrete areas in said magnetizable surface in sequence as desired, whereby data may be stored in said memory as a sequence of discrete areas magnetized or nonmagnetized as desired to represent yes or no bits of information, a magnetic induction reading head operatively associated with said memory to read said discrete areas in sequence, said reading head producing electrical pulses in a pattern corresponding to the pattern of the bits of information represented by the magnetized discrete areas in the sequence of discrete areas, a sign electronic flipflop electrically connected between said reading head and said writing head to transmit pulses produced by said reading head to said writing head via said flipflop, two sign control electronic flipflops having four combinations of states, a source of control pulses connected to said two sign control electronic flipflops, the latter being responsive to any one of four combinations of pulses fed from said source to assume one of said four combinations of states corresponding to the source pulse combination fed into said two sign control electronic flipflops, and gate means connected between said two sign control electronic flipflops and said sign electronic flipflop, said gate means being controlled by said two sign control electronic flipflops, and said gate means controlling transmission of pulses from said reading head to said sign electronic flipflop.

10. An apparatus useful for high speed general purpose computing, said apparatus comprising means to store data as consecutive groups of signals representing sequential bits of information according to the binary number system, the first signal in each group being the sign signal for the group, means operatively associated with said storage means to interpret signals in one of said groups, an accumulator, and means connected to and controlled by said interpreting means to either transfer a plurality of said groups of signals from said storage means to said accumulator in continuous sequence starting immediately following the interpreting by said interpreting means of signals in said one group of signals or to simply transfer one group of signals from said storage means to said accumulator after signals in said first mentioned one group of signals have been interpreted by said interpreting means, said interpreted signals in said one group of signals being a single command, and said accumulator being operative to sum said transferred plural groups of signals in continuous sequence in response to said single command.

11. A general purpose digital computer comprising a memory having a memory line capable of storing a number in binary form as a group of sequential yes or no signals with the first signal representing the sign of the number, signal writing and signal reading means operatively associated with said memory line, an adder connected between said writing means and said reading means, said reading means feeding into said adder and said adder feeding into said writing means, a source of first clock pulses also feeding into said adder, said first clock pulse source being operative to feed a first clock pulse into said adder each time that said reading means reads a yes signal from said memory line, said adder being operative to actuate said writing means to write a signal into said memory line each time that a first clock pulse is fed into said adder whereby signals in said memory line may recirculate from said memory line back to said memory line via said reading means, adder, and writing means, means connected to said adder to feed in response to a single command one or more groups of sequential yes or no signals representing numbers in binary form into said adder to combine each incoming signal group with a signal group already present in said memory line whereby a plurality of consecutive numbers can be summed, a source of second clock pulses connected to said adder feeder means, each signal of an incoming group being fed into said adder in step with a corresponding signal already present in said memory line but at a second clock pulse time offset timewise from the time when each first clock pulse occurs, said adder including means to produce carry signals and means to suppress any carry signal resulting from combining the sign signals of two signal groups being combined, said adder also including means to combine any carry signal produced by combining the last signals of two groups of signals being combined with the sum obtained by combining the sign signals of said groups, said carry suppression means being operative to suppress any further carry signal produced by said last mentioned combining, and said last mentioned combining occurring at a first clock pulse time whereby an incoming sign signal of a new group of signals being fed to said adder can enter said adder at said second clock pulse time without interfering with said carry signal combining to enable said adder and memory line to accomplish end around carry while a plurality of consecutive numbers are being summed by said adder.

12. A general purpose digital computer comprising a memory capable of storing a plurality of sequential groups of sequential signals, each group of signals representing a command word, reading means operatively associated with said memory to read said command words in sequence, a counter, means connecting said reading means to said counter to feed signals into said counter when said reading means is reading a group of sequential signals representing a command word, a source of absolute address correction signals, there being one or more correction signals in said source corresponding to each command word stored in said memory, means connecting said correction signal source to said counter to feed one or more correction signals into said counter whenever said reading means is reading a group of signals representing a command word, a source of word counting signals, means connecting said word counting signal source to said counter to enter a signal in said counter during each time interval corresponding to the time taken to read a group of sequential signals representing a command word whereby the number of counting signals corresponds to the number of word times involved in a particular count, said counter being operative to sum command word, correction, and word counting signals fed to it and produce an output signal at a time predetermined to cause a selected command word to be read as the next command word, and means connected to said counter and operable in response to said output signal to actuate said reading means to read said selected command word whereby said computer may operate in the absolute address mode.

13. A general purpose digital computer comprising a memory capable of storing a plurality of words in consecutive word positions whereby a word to be transferred may be designated by its numerical position in the word sequence, each word being represented by a group of sequential signals with each signal representing a bit of yes or no information, transfer control circuitry connected to said memory and responsive to signals representing a command word to select one of said consecutive words for transfer, said transfer control circuitry including means to count consecutive word positions until the word position during which transfer is to occur is reached, a source of signals representing absolute address correction numbers, said source containing at least one correction number signal for each of said word positions whereby at least one correction number signal may be made available during each word time, means connected to said control circuitry to feed command word signals into said control circuitry counting means, means connecting said correction number signal source to said control circuitry counting means to feed one or more correction number signals into said counting means during a word time during which command word signals are fed into said counting means, a source of word time counting signals, means connecting said last named source to said control circuitry counting means to feed a word time counting signal into said counting means during each word time, said control circuitry counting means being operative to sum said command word signals, correction number signals, and word counting signals to produce a transfer initiating output signal, a transfer circuit connected to said memory, said transfer circuit being operable when actuated to transfer one or more words from said memory, means connecting said transfer circuit to said transfer control circuit, and means in said transfer control circuit connected to said counter and operable in response to said transfer initiating output signal to actuate said transfer circuit to cause one or more words to be transferred from said memory, the word or words so selected for transfer being selected according to their absolute addresses.

14. A general purpose digital computer comprising a memory capable of storing a plurality of words in consecutive word positions whereby a word to be transferred and a word to be read as a command word may both be designated by their numerical positions in the word sequence, each word being represented by a group of sequential signals, a transfer circuit connected to said memory for transferring one or more words from said memory to a selected destination, a transfer control circuit connected to said memory to select command words to be read, to read said command words, and to interpret said command words whereby a given command may be excuted and the next command selected for execution, a counter located in said transfer control circuit, means in said control circuit to feed a group of signals representing a command word being read to said counter, a source of absolute address correction number signals connected to said counter, said source containing two groups of correction number signals for each of said word positions with each group containing at least one correction number signal, said source feeding two groups of correction number signals to said counter during each word time during which command word signals are fed into said counter, two sources of word time counting signals connected to said counter, each of said word time counting signal sources feeding a word time counting signal into said counter during a portion of each word time, said counter being operative to sum said command word signals, correction number signals, and word counting signals to produce two output signals, means connected to said counter and actuated by one of said output signals to actuate said transfer means to cause one or more words to transfer from said memory, and means connected to said counter and actuated by the other of said output signals to cause the next command word to be fed into said control circuit.

References Cited in the file of this patent

UNITED STATES PATENTS

| | | |
|---|---|---|
| 2,658,681 | Palmer | Nov. 10, 1953 |
| 2,679,638 | Bensky et al. | May 25, 1954 |
| 2,686,632 | Wilkinson | Aug. 17, 1954 |
| 2,694,521 | Newman et al. | Nov. 16, 1954 |
| 2,698,427 | Steele | Dec. 28, 1954 |
| 2,787,416 | Hansen | Apr. 2, 1957 |
| 2,799,449 | Turing | July 16, 1957 |
| 2,803,401 | Nelson | Aug. 20, 1957 |
| 2,810,516 | Tootill et al. | Oct. 22, 1957 |
| 2,831,179 | Wright et al. | Apr. 15, 1958 |
| 2,834,543 | Burkhart | May 13, 1958 |
| 2,840,304 | Williams | June 24, 1958 |
| 2,840,305 | Williams | June 24, 1958 |
| 2,846,142 | Strachey | Aug. 5, 1958 |
| 2,850,232 | Hagen | Sept. 2, 1958 |
| 2,852,187 | Beck | Sept. 16, 1958 |
| 2,863,604 | Leclerc | Dec. 9, 1958 |
| 2,954,166 | Eckdahl et al. | Sept. 27, 1960 |

FOREIGN PATENTS

| | | |
|---|---|---|
| 503,357 | Belgium | June 15, 1951 |
| 523,751 | Belgium | Apr. 23, 1954 |
| 526,231 | Belgium | Aug. 4, 1954 |
| 1,077,057 | France | Apr. 28, 1954 |
| 1,084,147 | France | June 30, 1954 |
| 868,226 | Germany | Feb. 23, 1953 |
| 719,066 | Great Britain | Nov. 24, 1954 |

OTHER REFERENCES

Hartree: Calculating Instruments and Machines. U. of Illinois Press. 1949. Pages 102, 105–108 relied on.

Williams: Proc. of the Inst. of EE, Part III (British), March 1949. "A Storage System for use with Binary-Digital Computing Machines," by Williams et al., pages 81–100.

"A Functional Description of the EDVAC," Moore School of EE, Univ. of Pennsylvania, copy filed in U.S. Patent Office May 3, 1951, vol. I, pages 4–18 to 4–20, vol. II Fig. 104–3LD–2 (total 4 pages).

"Proceedings of Conference on Automatic Computing Machines." Published by Commonwealth Scientific and Industrial Research Organization in Conjunction with the Department of Electrical Engineering of the University of Sydney, Melbourne, April 1952. Pages 127–138 and accompanying Figures 1–3.

Williams et al.: "Universal High Speed Computers: Serial Computing Circuits." Proceedings Institute of Electrical Engineers Pt. II, April 1952. Pages 113 and 119 relied on.

Beard et al.: "An Electronic Computer," Journal of Scientific Instruments, October 1952. Pages 305–311. Pages 307 and 309 relied on.

De Turk et al.: "Basic Circuitry of the Midac and MidSac," University of Michigan Engineering Research Institute, May 1954. Pages II–12 and III–4 relied on.